US012154709B2

(12) United States Patent
Yoshioka et al.

(10) Patent No.: US 12,154,709 B2
(45) Date of Patent: Nov. 26, 2024

(54) SURFACE-MOUNT PASSIVE COMPONENT

(71) Applicant: Murata Manufacturing Co., Ltd., Kyoto-fu (JP)

(72) Inventors: Yoshimasa Yoshioka, Nagaokakyo (JP); Tatsuya Funaki, Nagaokakyo (JP); Shunsuke Abe, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 736 days.

(21) Appl. No.: 17/350,624

(22) Filed: Jun. 17, 2021

(65) Prior Publication Data

US 2021/0398730 A1 Dec. 23, 2021

(30) Foreign Application Priority Data

Jun. 22, 2020 (JP) ................................ 2020-106718

(51) Int. Cl.
*H01F 27/28* (2006.01)
*H01F 27/06* (2006.01)
(Continued)

(52) U.S. Cl.
CPC ......... *H01F 27/06* (2013.01); *H01F 27/2804* (2013.01); *H01F 27/327* (2013.01);
(Continued)

(58) Field of Classification Search
CPC .... H01F 27/06; H01F 27/2804; H01F 27/327; H01F 41/041; H01F 41/12;
(Continued)

(56) References Cited

U.S. PATENT DOCUMENTS

2010/0002401 A1* 1/2010 Tsujimura .............. H05K 3/288 29/841
2012/0020041 A1* 1/2012 Hosokawa .......... H01L 23/3128 361/748
(Continued)

FOREIGN PATENT DOCUMENTS

CN 101621892 A 1/2010
CN 107818864 A 3/2018
(Continued)

*Primary Examiner* — Shawki S Ismail
*Assistant Examiner* — Kazi S Hossain
(74) *Attorney, Agent, or Firm* — Studebaker & Brackett PC

(57) ABSTRACT

A surface-mount passive component includes a passive element and a size conversion unit on which the passive element is mounted. The size conversion unit has a body, a plurality of first external terminals each of which is exposed on an element mount surface of the body and is electrically connected to a corresponding one of passive element external terminals of the passive element, a plurality of second external terminals exposed on a board-side mount surface of the body, and connection wires that electrically connect the first external terminals and the second external terminals. An area of the board-side mount surface is larger than an area of a first main surface of the passive element, and a total area of the plurality of second external terminals on the board-side mount surface is larger than a total area of the passive element external terminals on the first main surface.

21 Claims, 32 Drawing Sheets

(51) Int. Cl.
*H01F 27/32* (2006.01)
*H01F 41/04* (2006.01)
*H01F 41/12* (2006.01)

(52) U.S. Cl.
CPC ........... *H01F 41/041* (2013.01); *H01F 41/12* (2013.01); *H01F 2027/065* (2013.01)

(58) Field of Classification Search
CPC ....... H01F 2027/065; H01F 2017/0066; H01F 17/0013; H01F 27/292; H01F 17/04; H01C 1/01; H01C 1/14
USPC .......................................... 336/200, 232, 198
See application file for complete search history.

(56) References Cited

U.S. PATENT DOCUMENTS

| | | | | |
|---|---|---|---|---|
| 2018/0075965 | A1* | 3/2018 | Yoshioka | H01F 27/2823 |
| 2019/0066900 | A1* | 2/2019 | Nakajima | H01F 41/041 |

FOREIGN PATENT DOCUMENTS

| | | | |
|---|---|---|---|
| CN | 110600461 | A | 12/2019 |
| JP | 2002-124848 | A | 4/2002 |
| JP | 2004-327554 | A | 11/2004 |
| JP | 2006-186142 | A | 7/2006 |
| JP | 2010-034550 | A | 2/2010 |
| JP | 2011-029389 | A | 2/2011 |
| JP | 2012-089590 | A | 5/2012 |
| JP | 2018-046051 | A | 3/2018 |
| JP | 2019-102524 | A | 6/2019 |
| WO | WO-2017188062 | A1 * | 11/2017 |

* cited by examiner

SURFACE-MOUNT PASSIVE COMPONENT

CROSS-REFERENCE TO RELATED APPLICATION

This application claims benefit of priority to Japanese Patent Application No. 2020-106718, filed Jun. 22, 2020, the entire content of which is incorporated herein by reference.

BACKGROUND

Technical Field

The present disclosure relates to a surface-mount passive component.

Background Art

Recently, a size of a passive element mounted on a circuit board in an information terminal such as a smartphone or a tablet terminal is becoming increasingly small. Japanese Unexamined Patent Application Publication No. 2019-102524 discloses an inductor component as an example of such a small-size passive element.

SUMMARY

As a size of a passive element such as an inductor component becomes smaller, it becomes more difficult to mount the passive element on a circuit board.

A surface-mount passive component according to an aspect of the present disclosure includes a passive element that has a first main surface and a second main surface located on a side opposite to the first main surface and has a plurality of passive element external terminals exposed on the first main surface; and a size conversion unit on which the passive element is mounted. The passive element is mounted on the size conversion unit so that the first main surface is located closer to the size conversion unit than the second main surface. The size conversion unit has a body having an element mount surface, which is a main surface on which the passive element is mounted, and a board-side mount surface, which is a main surface located on a side opposite to the element mount surface, a plurality of first external terminals each of which is exposed on the element mount surface and is electrically connected to a corresponding one of the plurality of passive element external terminals, a plurality of second external terminals exposed on the board-side mount surface, and connection wires that electrically connect the first external terminals and the second external terminals. An area of the board-side mount surface is larger than an area of the first main surface, and a total area of the plurality of second external terminals on the board-side mount surface is larger than a total area of the plurality of passive element external terminals on the first main surface.

According to the configuration, a component to be mounted on a circuit board, that is, a surface-mount passive component can be increased in size without changing a size of a passive element. It is therefore possible to prevent difficulty of mounting the passive element on the circuit board from becoming high.

According to the surface-mount passive component, it is possible to prevent difficulty of mounting a passive element on a circuit board from becoming high.

Other features, elements, characteristics and advantages of the present disclosure will become more apparent from the following detailed description of preferred embodiments of the present disclosure (with reference to the attached drawings).

DETAILED DESCRIPTION

First Embodiment

An embodiment of a surface-mount passive component is described with reference to FIGS. 1 through 4. In some drawings, constituent elements are illustrated in enlarged sizes for easier understanding. Dimensional ratios among constituent elements are sometimes different from actual ones or ones in other drawings. Although hatching is illustrated in cross-sectional views, hatching of some constituent elements are sometimes omitted for easier understanding.

Figure 1:
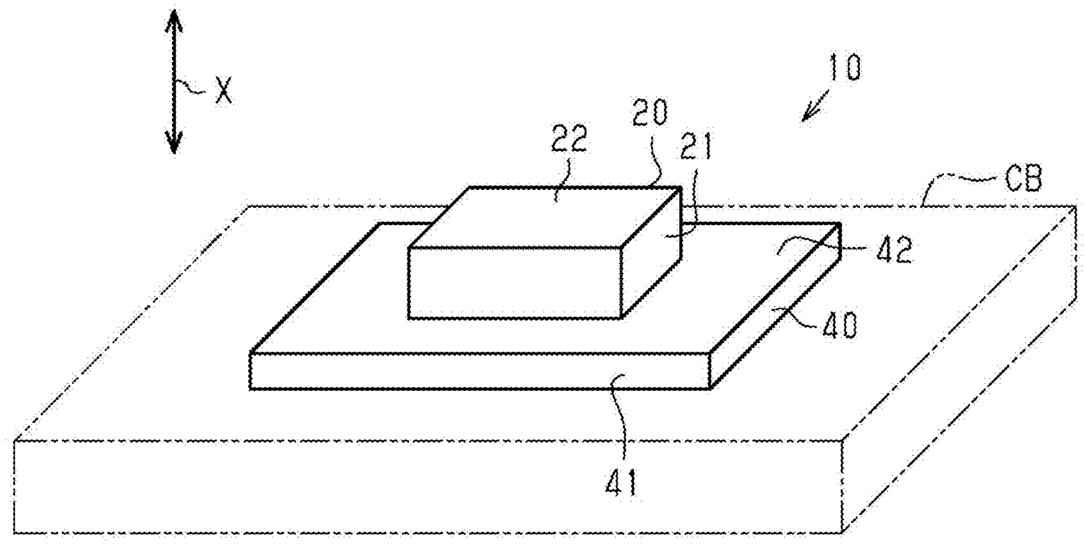
FIG. 1 is a perspective view schematically illustrating a surface-mount passive component according to a first embodiment.

As illustrated in FIG. 1, a surface-mount passive component 10 according to the present embodiment is mounted on a circuit board CB indicated by the line with alternate long and two short dashes. The surface-mount passive component 10 includes a passive element 20 and a size conversion unit 40 on which the passive element 20 is mounted. A passive element is an element that has passive functions such as consuming, accumulating, and discharging supplied electric power. That is, a passive element does not have active functions such as amplifying and rectifying supplied power. Examples of a passive element include a resistor, an inductor, and a capacitor.

Figure 2:
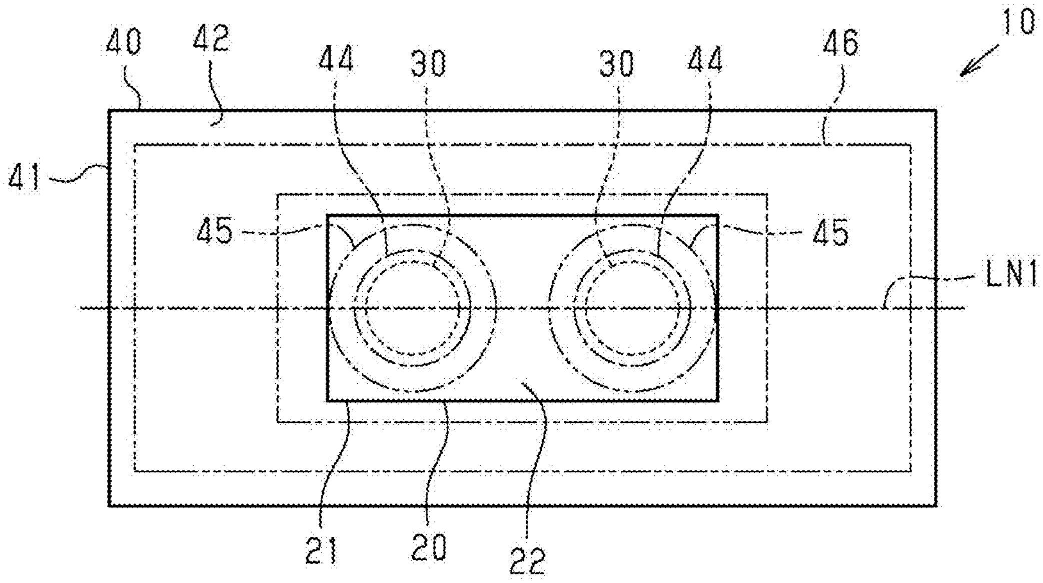
FIG. 2 is a plan view of the surface-mount passive component.

In a case where a direction in which the circuit board CB, the size conversion unit 40, and the passive element 20 are aligned is referred to as a "laminating direction X", FIG. 2 is a plan view of the surface-mount passive component 10 viewed from a passive element 20 side in the laminating direction X. As illustrated in FIG. 2, a size of the size conversion unit 40 in a direction orthogonal to the laminating direction X is larger than a size of the passive element 20 in a direction orthogonal to the laminating direction X. That is, areas of main surfaces 42 and 43 of the size conversion unit 40 are larger than areas of main surfaces 22 and 23 of the passive element 20. The passive element 20 is located inside a peripheral edge of the size conversion unit 40 on a plane orthogonal to the laminating direction X.

Figure 3:
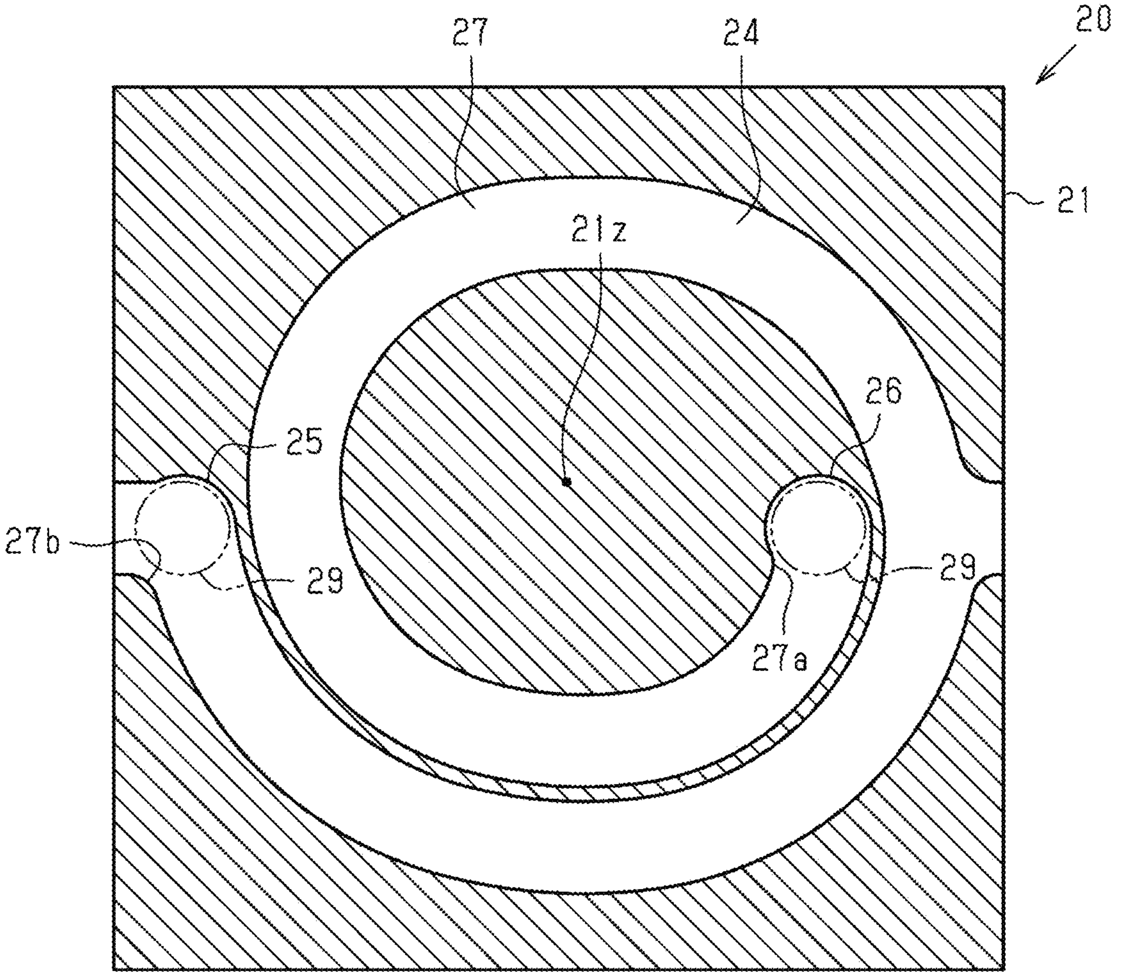
FIG. 3 is a cross-sectional view of a passive element of the surface-mount passive component.
Figure 4:
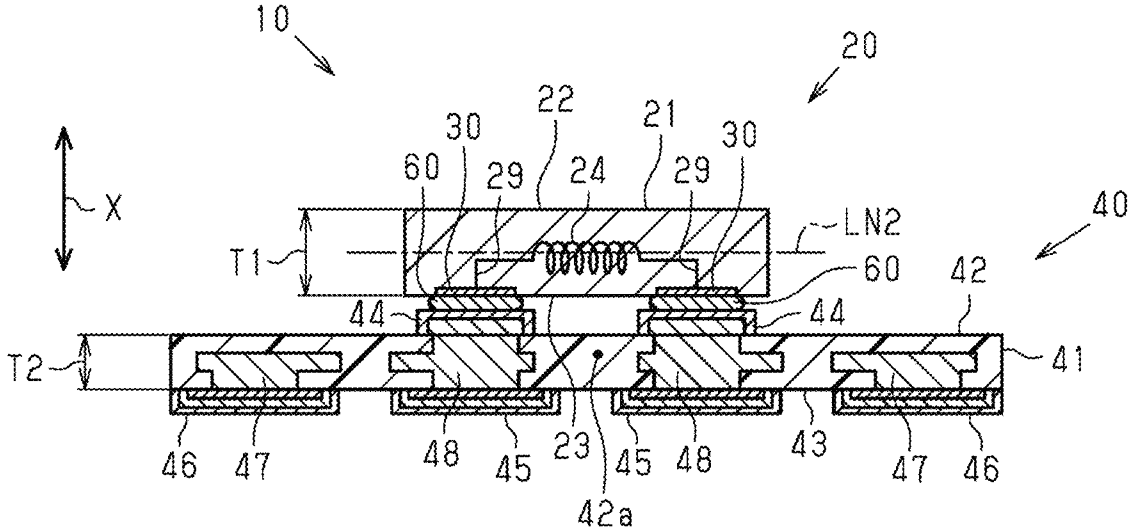
FIG. 4 is a cross-sectional view of the surface-mount passive component.

FIG. 4 is a cross-sectional view of the surface-mount passive component 10 taken along a direction orthogonal to the line LN1 with alternate long and short dashes in FIG. 2. FIG. 3 is a cross-sectional view of the passive element 20 taken along a direction orthogonal to the line LN2 with alternate long and short dashes in FIG. 4.

Passive Element

As illustrated in FIG. 3, the passive element 20 is an inductor. A body 21 of the passive element 20 has a magnetic layer made of a magnetic material. The body 21 may be constituted by a single magnetic layer or may be constituted by a plurality of magnetic layers laminated in the laminating direction X. The magnetic layer is, for example, made of a resin containing metal magnetic powder. Examples of the metal magnetic powder include iron, nickel, chromium, copper, aluminum, and alloys thereof. The resin containing metal magnetic powder is, for example, a resin material such as an epoxy resin.

An upper one of main surfaces of the body 21 in FIG. 4, that is, a top surface of the body 21 is referred to as a "second main surface 22", and a lower one of the main surfaces of the body 21 in FIG. 4, that is, a bottom surface of the body 21 is referred to as a "first main surface 23". That is, the first main surface 23 is disposed on a side opposite to the second main surface 22 in the laminating direction X. In a state where the passive element 20 is mounted on the size conversion unit 40, the first main surface 23 is located closer to the size conversion unit 40 than the second main surface 22. Furthermore, an area of the first main surface 23 is smaller than an area of a board-side mount surface 43 (described later) of the size conversion unit 40.

As illustrated in FIGS. 3 and 4, the passive element 20 has an inductor wire 24 provided in the body 21, passive element external terminals 30, which are external terminals of the passive element 20, and vertical wires 29 that electrically connects the inductor wire 24 and the passive element external terminals 30. The passive element external terminals 30 are exposed on the first main surface 23. That is, the passive element external terminals 30 are exposed to an outside in a state where the first main surface 23 is exposed to an outside, for example, in a state where the passive element 20 has not been mounted on the size conversion unit 40 yet. However, in a case where the passive element 20 is mounted on the size conversion unit 40 as illustrated in FIG. 4 and the first main surface 23 is not exposed to an outside, the passive element external terminals 30 are not exposed to an outside. That is, in a case where an expression "a part (e.g., the passive element external terminals 30) is exposed on a surface (e.g., the first main surface 23)" is used herein, it is only necessary that this part is exposed with respect to this surface. Accordingly, this part need not be exposed to an outside, and for example, the passive element external terminals 30, which are an example of this part, may be covered with connection parts 60 as illustrated in FIG. 4. The vertical wires 29 extend from portions thereof for connection with the inductor wire 24 toward the first main surface 23. In this example, a vertical wire 29 connected to a first pad 25 of the inductor wire 24, which will be described in detail later, and a vertical wire 29 connected to a second pad 26 of the inductor wire 24 are provided. Furthermore, a passive element external terminal 30 electrically connected to the first pad 25 with the vertical wire 29 interposed therebetween, and a passive element external terminal 30 electrically connected to the second pad 26 with the vertical wire 29 interposed therebetween are provided.

The inductor wire 24 is made of an electrically conductive material. The inductor wire 24 contains, for example, at least one of copper, silver, gold, and aluminum as the electrically conductive material. Alternatively, for example, the inductor wire 24 may contain an alloy containing at least one of copper, silver, gold, and aluminum as the electrically conductive material.

The inductor wire 24 has the first pad 25, the second pad 26, and a wire body 27 that connects the first pad 25 and the second pad 26. The pads 25 and 26 are parts of the inductor wire 24 for connection with the vertical wires 29. The wire body 27 has a substantially spiral shape spiraling about a central axis 21*z* of the body 21 extending in the laminating direction X. Specifically, the wire body 27 is wound in a spiral shape in counterclockwise direction in FIG. 3 from an outer circumferential end 27*b* on an outer side in a radial direction toward an inner circumferential end 27*a* on an inner side in the radial direction in top view.

The number of turns of an inductor wire is decided on the basis of a virtual vector. A start point of the virtual vector is disposed on a virtual central line extending in a direction in which the inductor wire extends while passing a center of a width of the inductor wire. The virtual vector is in contact with the virtual central line extending in the direction in which the inductor wire extends when viewed from a thickness direction of the body of the passive element. In a case where an angle by which a direction of the virtual vector rotates is "360 degrees" when the start point of the virtual vector is moved from one end of the virtual central line to the other end of the virtual central line, the number of turns is "1.0 turn". Accordingly, for example, in a case where the angle is 180 degrees, the number of turns is "0.5 turns".

In the present embodiment, the direction of the virtual vector virtually disposed on the wire body 27 of the inductor wire 24 is rotated by "540 degrees" when the start point is moved from the outer circumferential end 27*b* on an outer side in the radial direction to the inner circumferential end 27*a* on an inner side in the radial direction. Accordingly, the number of turns of the wire body 27 in the present embodiment is "1.5 turns".

Note that the number of turns of the inductor wire 24 may be larger than "1.5 turns" or may be smaller than "1.5 turns" as long as the passive element 20 can function as an inductor. That is, an element having an inductor wire whose number of turns is less than "1.0 turn" may be used as the passive element 20.

Size Conversion Unit

As illustrated in FIG. 4, the size conversion unit 40 has an element mount surface 42 and the board-side mount surface 43 as main surfaces thereof. The element mount surface 42 is an upper surface in FIG. 4, that is, a top surface of the size conversion unit 40. The passive element 20 is mounted on the element mount surface 42, and the element mount surface 42 faces the first main surface 23 of the passive element 20. The board-side mount surface 43 is a lower surface in FIG. 4, that is, a bottom surface of the size conversion unit 40. That is, the board-side mount surface 43 is disposed on a side opposite to the element mount surface 42 in the laminating direction X. Accordingly, in a case where the surface-mount passive component 10 is mounted on the circuit board CB, the board-side mount surface 43 faces a mount surface of the circuit board CB. In a case where a direction orthogonal to the board-side mount surface 43 is defined as a "predetermined direction", the laminating direction X corresponds to the predetermined direction in the present embodiment.

A body 41 of the size conversion unit 40 includes an insulating layer. The body 41 may be constituted by a single insulating layer or may be a multilayer body constituted by a plurality of insulating layers laminated in the laminating direction X.

In a case where a dimension of the body 21 of the passive element 20 in the laminating direction X is a thickness T1, an interval between the first main surface 23 and the second main surface 22 of the body 21 corresponds to the thickness T1 of the body 21. In a case where a dimension of the body 41 of the size conversion unit 40 in the laminating direction X is a thickness T2 of the body 41, an interval between the element mount surface 42 and the board-side mount surface 43 corresponds to the thickness T2 of the body 41. In this case, the thickness T2 of the body 41 is smaller than the thickness T1 of the body 21. Note that the thickness T2 of the body 41 may be equal to the thickness T1 of the body 21 or the thickness T2 of the body 41 may be larger than the thickness T1 of the body 21.

DC electric resistivity of the body 41 is preferably, for example, about "1 MΩ·cm" or more. The insulating layer that constitutes the body 41 contains, for example, a polyimide resin, an acrylic resin, an epoxy resin, a phenolic resin, or a liquid crystal polymer. The insulating layer may contain an insulating filler such as a silica filler or a magnetic filler made of an iron alloy so that insulation performance of the insulating layer improves. The insulating layer may be, for example, ceramics such as ferrite.

In the example illustrated in FIG. 4, a plurality of dummy internal conductors 47 and a plurality of connection wires 48 are provided as conductors in the size conversion unit 40. This will be described in detail later. In a case where a portion where an interval between connection wires 48 adjacent in a direction (a left-right direction in FIG. 4) orthogonal to the laminating direction X is minimum is a minimum interval portion 42*a*, the body 41 is configured so that DC electric resistance of the minimum interval portion 42*a* becomes "1000 times" as high as DC electric resistance of the inductor (the passive element 20) or higher. Note that there are cases where an interval between a connection wire 48 and a dummy internal conductor 47 that are adjacent to each other is smaller than an interval between adjacent connection wires 48. In such cases, in a case where a portion where an interval between a connection wire 48 and a dummy internal conductor 47 that are adjacent to each other is minimum is a predetermined portion, the body 41 is desirably configured so that DC electric resistance of the predetermined portion becomes "1000 times" as high as DC electric resistance of the inductor (the passive element 20) or higher.

The size conversion unit 40 has a first external terminal 44 exposed on the element mount surface 42 and a second external terminal 45 exposed on the board-side mount surface 43 as external terminals. In the example illustrated in FIG. 4, a plurality of (two) first external terminals 44 are provided on the element mount surface 42, and a plurality of (two) second external terminals 45 are provided on the board-side mount surface 43. The first external terminals 44 are electrically connected to the passive element external terminals 30 of the passive element 20. For example, the connection parts 60 made of an electrically conductive material such as solder are interposed between the first external terminals 44 and the passive element external terminals 30.

Assume that an area of each first external terminal 44 viewed from the laminating direction X is a "size of each first external terminal 44", an area of each second external terminal 45 viewed from the laminating direction X is a "size of each second external terminal 45", and an area of each passive element external terminal 30 viewed from the laminating direction X is a "size of each passive element external terminal 30". In this case, as illustrated in FIG. 2, the size of each second external terminal 45 is larger than the size of each passive element external terminal 30. That is, assuming that a total area of the second external terminals 45 on the board-side mount surface 43 is a total area of the second external terminals 45 and that a total area of the passive element external terminals 30 of the passive element 20 on the first main surface 23 is a total area of the passive element external terminals 30, the total area of the second external terminals 45 is larger than the total area of the passive element external terminals 30 in the present embodiment.

In this case, the size of each first external terminal 44 is desirably set larger than the size of each passive element external terminal 30. In the example illustrated in FIG. 2, the size of each first external terminal 44 is smaller than each second external terminal 45, but the size of each first external terminal 44 is larger than the size of each passive element external terminal 30. That is, an area of a portion of each first external terminal 44 exposed on the element mount surface 42 is smaller than an area of a portion of each second external terminal 45 exposed on the board-side mount surface 43 but is larger than an area of a portion of each passive element external terminal 30 exposed on the first main surface 23.

As illustrated in FIGS. 2 and 4, the size conversion unit 40 may have a dummy conductor. The dummy conductor contains an electrically conductive material but is not electrically connected to the passive element external terminals 30. In the example illustrated in FIGS. 2 and 4, the size conversion unit 40 has the dummy internal conductors 47 and dummy external terminals 46 as dummy conductors. The dummy external terminals 46 are terminals that are not electrically connected to the first external terminals 44 among external terminals exposed on the board-side mount surface 43. In the example, each of the dummy external terminals 46 has a substantially annular shape so as to surround the second external terminals 45. The dummy internal conductors 47 are conductors that are electrically connected to the dummy external terminals 46 among conductors provided in the body 41. The dummy internal conductors 47 are not electrically connected to the first external terminals 44 nor the second external terminals 45.

The size conversion unit 40 has the connection wires 48 that electrically connect the first external terminals 44 and the second external terminals 45. In the example illustrated in FIG. 4, the size conversion unit 40 has a connection wire 48 that electrically connects a left one of the first external terminals 44 in FIG. 4 and a left one of second external terminals 45 in FIG. 4. Furthermore, the size conversion unit 40 has a connection wire 48 that electrically connects a right one of the first external terminals 44 in FIG. 4 and a right one of second external terminals 45 in FIG. 4. That is, each of the connection wires 48 is a conductor for electrically connecting a first external terminal 44 and a second external terminal 45 that correspond to each other. In a case where a connection wire that penetrates the body 41 is defined as an "internal connection wire", each of the connection wires 48 corresponds to the internal connection wire that penetrates the body 41 in the laminating direction X. In the example illustrated in FIG. 4, the connection wires 48 are configured so that the first external terminals 44 and the second external terminals 45 are electrically connected to each other by a shortest path. As illustrated in FIGS. 2 and 4, the first external terminals 44 and the second external terminals 45 that are electrically connected to each other by the connection wires 48 overlap each other when viewed from the laminating direction X. Accordingly, by providing the connection wires 48 that extend in the laminating direction X in the size conversion unit 40, the first external terminals 44 and the second external terminals 45 can be electrically connected to each other by a shortest path.

In a case where the size conversion unit 40 has dummy conductors as illustrated in FIG. 4, the connection wires 48 are not electrically connected to the dummy conductors.

DC electric resistivity of the connection wires 48 is preferably set lower than DC electric resistivity of a conductor (e.g., the first external terminals 44) exposed on the element mount surface 42 and DC electric resistivity of a conductor (e.g., the second external terminals 45) exposed on the board-side mount surface 43. In this case, conductors containing copper can be used as the connection wires 48, and the first external terminals 44 and the second external terminals 45 can be made of an electrically conductive material having higher DC electric resistivity than copper. For example, the first external terminals 44 and the second external terminals 45 each may be a multilayer structure constituted by a plurality of electrically conductive layers that are laminated on one another. The multilayer body functioning as an external terminal may be a multilayer body in which a layer containing copper, a layer containing nickel, and a layer containing gold are laminated or may be multilayer body in which a layer containing nickel and tin, a layer containing silver, and a layer containing copper are laminated. Alternatively, the multilayer body may be a multilayer body in which a layer containing nickel and a layer containing tin are laminated.

Effects

Effects of the present embodiment are described below.

(1-1) A component to be mounted on the circuit board CB, that is, the surface-mount passive component 10 can be increased in size without changing the size of the passive element 20 itself. This can prevent difficulty in mounting the passive element 20 on the circuit board CB from becoming high.

One method for preventing difficulty in mounting the passive element 20 on the circuit board CB from becoming high without mounting the passive element 20 on the size conversion unit 40 is to increase the size of the passive element 20 itself. In this case, a passive element manufacturer needs to prepare plural kinds of passive elements having different sizes for respective manufacturers that need passive elements.

Meanwhile, in the present embodiment, the passive element 20 is mounted on the size conversion unit 40. It is therefore unnecessary for the manufacturer to prepare plural kinds of passive elements 20 having different sizes.

(1-2) A total area of the second external terminals 45 on the board-side mount surface 43 of the size conversion unit 40 is larger than a total area of the passive element external terminals 30 on the first main surface 23 of the passive element 20. Therefore, it is easier to bring the second external terminals 45 into contact with electrodes of the circuit board CB than a case where the passive element external terminals 30 of the passive element 20 are brought into contact with the electrodes of the circuit board CB. Also in this respect, the passive element 20 can be more easily mounted on the circuit board CB.

(1-3) As the connection wires 48 become longer, a parasitic component caused due to the size conversion unit 40 interposed between the passive element 20 and the circuit board CB becomes larger. This parasitic component is parasitic resistance or parasitic inductance. In this respect, in the present embodiment, the connection wires 48 are configured so that the first external terminals 44 and the second external terminals 45 are electrically connected to each other by a shortest path. This can suppress an increase in parasitic component caused due to the size conversion unit 40 interposed between the passive element 20 and the circuit board CB.

Electrically connecting the first external terminal 44 and the second external terminal 45 by a shortest path means, in a narrow sense, connecting the first external terminal 44 and the second external terminal 45 by a single straight connection wire 48. Electrically connecting the first external terminal 44 and the second external terminal 45 by a shortest path means, in a broad sense, connecting the first external terminal 44 and the second external terminal 45 by one or more straight connection wires 48 extending from the first external terminal 44 not away from but toward the second external terminal 45.

(1-4) By making the thickness T2 of the size conversion unit 40 smaller than the thickness T1 of the passive element 20, the connection wires 48 can be shortened. This can suppress an increase in parasitic resistance caused due to the connection wires 48 in electric conduction paths between the passive element external terminals 30 of the passive element 20 and the electrodes of the circuit board CB.

(1-5) In the present embodiment, the number of turns of the first external terminals 44 provided on the element mount surface 42 is less than 1 as illustrated in FIG. 2. Similarly, the number of turns of the second external terminals 45 provided on the board-side mount surface 43 is less than 1 turn. The definition of the "number of turns" is identical to the above definition of the number of turns of the inductor wire. This can suppress occurrence of unnecessary parasitic inductance, parasitic resistance, and parasitic capacitance in the size conversion unit 40.

(1-6) It is preferable to make DC electric resistivity of the connection wires 48 lower than DC electric resistivity of the first external terminals 44 and the second external terminals 45. By thus making the DC electric resistivity of the connection wires 48 low, electric resistance for an electric current flowing in the size conversion unit 40 can be made small.

Furthermore, the following effects can be expected by using multilayer bodies as the first external terminals 44 and the second external terminals 45.

An outermost one of a plurality of layers that constitute the external terminals 44 and 45 can be used as a solder compatible layer that improves wettability. The solder compatible layer can be a layer containing gold or tin. Alternatively, the solder compatible layer can be a layer containing at least one of an alloy containing gold and an alloy containing tin.

An intermediate one of the plurality of layers that constitute the external terminals 44 and 45 can be used as a corrosion suppression layer. The corrosion suppression layer can be, for example, a layer containing nickel or an alloy containing nickel. This can increase resistance to electrochemical migration of the external terminals 44 and 45.

By using a layer that contains copper or an alloy containing copper as at least one of the plurality of layers that constitute the external terminals 44 and 45, DC electric resistivity of the external terminals 44 and 45 can be made low.

(1-7) By making DC electric resistivity of the body 41 equal to or higher than about "1 MΩ·cm", that is, by increasing insulation performance in the body 41, occurrence of short circuit between conductors can be suppressed in the body 41.

(1-8) By configuring the body 41 so that the DC electric resistance of the minimum interval portion becomes "1000 times" as high as the DC electric resistance of the inductor (the passive element 20) or higher, influence of a leakage current can be minimized even in a case where a leakage current occurs in the size conversion unit 40. This is because even in a case where a leakage current occurs in the size conversion unit 40, the leakage current flows to the passive element 20 side in accordance with the Ohm's law.

(1-9) By providing the dummy conductors in the size conversion unit 40, heat release performance of the size conversion unit 40 can be increased. This is because the dummy conductors are made of an electrically conductive material such as a metal, and heat transfer of the electrically conductive material is higher than heat transfer of an insulating material.

Furthermore, in a case where the dummy external terminals 46 are provided as dummy conductors on the board-side mount surface 43, the dummy external terminals 46 can be fixed to electrodes of the circuit board CB with connection parts such as solder interposed therebetween. This can increase strength of fixation of the surface-mount passive component 10 to the circuit board CB when the surface-mount passive component 10 is mounted on the circuit board CB as compared with a case where the size conversion unit 40 is not provided with the dummy external terminals 46.

Second Embodiment

Next, the second embodiment of a surface-mount passive component is described with reference to FIGS. 5 through 17. The following mainly describes differences from the first embodiment. Members that are identical to or corresponding to those in the first embodiment are given identical reference signs, and repeated description thereof is omitted.

Figure 5:
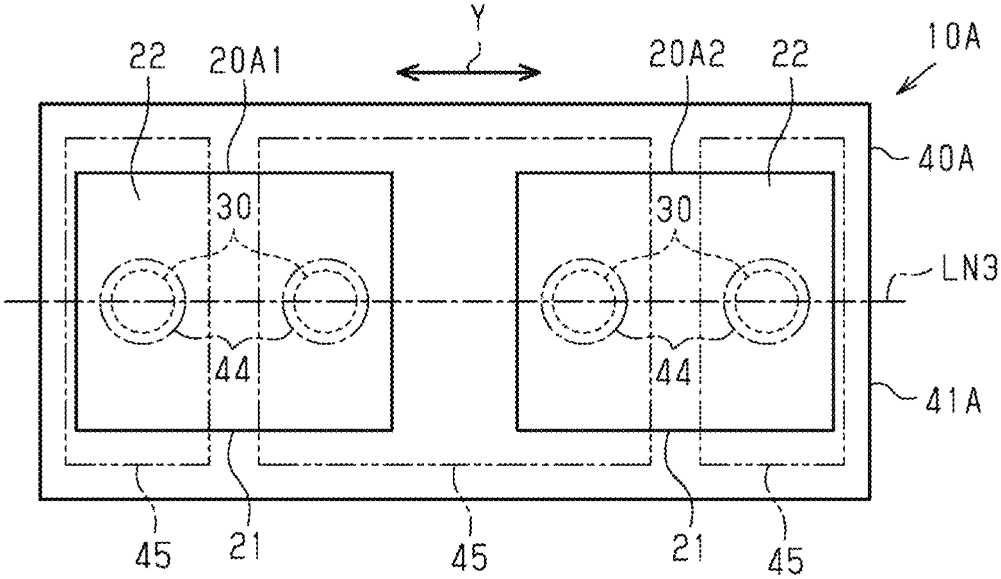
FIG. 5 is a plan view of a surface-mount passive component according to a second embodiment.
Figure 6:
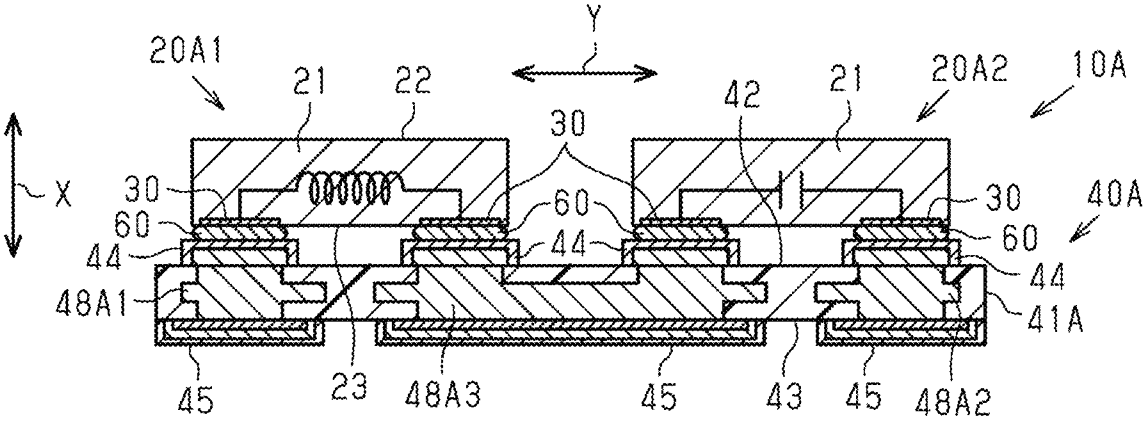
FIG. 6 is a cross-sectional view of the surface-mount passive component.

FIG. 6 illustrates a cross section of a surface-mount passive component 10A according to the present embodiment taken along a direction orthogonal to the line LN3 with alternate long and short dashes in FIG. 5. In FIG. 6, detailed structures of passive elements 20A1 and 20A2, which will be described later, are omitted for convenience of description.

As illustrated in FIGS. 5 and 6, the surface-mount passive component 10A includes the plurality of passive elements 20A1 and 20A2 and a size conversion unit 40A on which the passive elements 20A1 and 20A2 are mounted.

Passive Element

The passive elements 20A1 and 20A2 are mounted on an element mount surface 42 of the size conversion unit 40A. A left-right direction in FIG. 5, in which the passive elements 20A1 and 20A2 are aligned, is referred to as a "parallel direction Y". For example, in the example illustrated in FIGS. 5 and 6, one of the passive elements that is located in a first direction (a left side in FIGS. 5 and 6) in the parallel direction Y is referred to as a "passive element 20A1", and one of the passive elements that is located in a second direction (a right side in FIGS. 5 and 6) in the parallel direction Y is referred to as a "passive element 20A2". In this case, an interval between adjacent passive elements 20A1 and 20A2 among the passive elements is preferably set equal to or larger than about "10 μm" and equal to or less than about "500 μm" (i.e., from about "10 μm" to about "500 μm"). Upper surfaces of the passive elements 20A1 and 20A2 in FIG. 6, which are top surfaces of the passive elements 20A1 and 20A2, are referred to as "second main surfaces 22", and lower surfaces of the passive elements 20A1 and 20A2 in FIG. 6, which are bottom surfaces of the passive elements 20A1 and 20A2, are referred to as "first main surfaces 23".

Assuming that areas of the passive elements 20A1 and 20A2 viewed from the laminating direction X are "sizes of the passive elements 20A1 and 20A2", the size of the passive element 20A1 is preferably set identical to the size of the passive element 20A2. This can make the area of the first main surface 23 of the passive element 20A1 identical to the area of the first main surface 23 of the passive element 20A2. Even in a case where the areas of the first main surfaces 23 are different within allowable manufacturing tolerances of the passive elements 20A1 and 20A2, it is regarded that the areas of the first main surfaces 23 are identical.

Furthermore, the thickness of a body 21 of the passive element 20A1 is preferably set identical to the thickness of a body 21 of the passive element 20A2. Even in a case where the thicknesses of the bodies 21 are different within allowable manufacturing tolerances of the passive elements 20A1 and 20A2, it is regarded that the thicknesses of the bodies 21 are identical.

The passive elements 20A1 and 20A2 are located inside a peripheral edge of the size conversion unit 40A. That is, in a case where one of the passive elements 20A1 and 20A2 that is smallest in areas of the main surfaces 22 and 23 is referred to as a "minimum passive element", areas of the main surfaces 42 and 43 of the size conversion unit 40A are "two times" as large as the area of the first main surface 23 of the minimum passive element or larger. In the example illustrated in FIGS. 5 and 6, the area of the first main surface 23 of the passive element 20A1 is identical to the area of the first main surface 23 of the passive element 20A2. It can therefore be said that both of the passive elements 20A1 and 20A2 are minimum passive elements.

For example, in the example illustrated in FIG. 6, the passive element 20A1 is an inductor, and the passive element 20A2 is a capacitor. As in this example, the passive elements 20A1 and 20A2 may be passive elements having different passive functions. For example, one of the passive elements 20A1 and 20A2 may be a resistor, and the other one of the passive elements 20A1 and 20A2 may be an inductor or a capacitor.

Meanwhile, both of the passive elements 20A1 and 20A2 may be passive elements having the same passive function. That is, the passive elements 20A1 and 20A2 may be inductors, may be capacitors, or may be resistors.

In the present example, the passive element 20A1 includes two passive element external terminals 30 exposed on the first main surface 23, and the passive element 20A2 includes two passive element external terminals 30 exposed on the first main surface 23. Each of the passive element external terminals 30 is electrically connected to a first external terminal 44 of the size conversion unit 40A with a connection part 60 interposed therebetween. The connection part 60 contains an electrically conductive material such as solder. The connection part 60 may contain a material identical to an electrically conductive material contained in the passive element external terminal 30 or may contain a material that is not identical to the electrically conductive material contained in the passive element external terminal 30. The connection part 60 may contain a material identical to an electrically conductive material contained in the first external terminal 44 or may contain a material that is not identical to the electrically conductive material contained in the first external terminal 44.

Size Conversion Unit

As illustrated in FIG. 6, a body 41A of the size conversion unit 40A has an insulating layer. The body 41A may be constituted by only a single insulating layer or may be a multilayer body constituted by a plurality of insulating layers laminated in the laminating direction X. The body 41A is desirably configured as follows.

In a case where a portion of the size conversion unit 40A where an interval between conductors provided in the size conversion unit 40A is minimum is a minimum interval portion, DC electric resistance of the minimum interval portion is "one time" as high as DC electric resistance of the capacitor (the passive element 20A2) mounted on the element mount surface 42 or higher. The "conductors provided in the size conversion unit 40A" are connection wires 48A1, 48A2, and 48A3, which will be described later.

As many first external terminals 44 as the passive element external terminals 30 are provided on the element mount surface 42 of the size conversion unit 40A. The first external terminals 44 are aligned along the parallel direction Y. That is, among the first external terminals 44, two first external terminals 44 located in a first direction (a left side in FIG. 6) in the parallel direction Y correspond to the passive element 20A1, and two first external terminals 44 located in a second direction (a right side in FIG. 6) in the parallel direction Y correspond to the passive element 20A2.

The size conversion unit 40A has the plurality of connection wires 48A1, 48A2, and 48A3. The connection wires 48A1, 48A2, and 48A3 penetrate the body 41A in the laminating direction X. In a case where a wire that penetrates the body 41A is defined as an "internal connection wire", the connection wires 48A1, 48A2, and 48A3 correspond to the internal connection wires. The connection wire 48A1 is electrically connected to one of the passive element external terminals 30 of the passive element 20A1 that is located farther away from the passive element 20A2 in the parallel direction Y. The connection wire 48A3 is electrically connected to one of the passive element external terminals 30 of the passive element 20A2 that is located farther away from the passive element 20A1 in the parallel direction Y. The connection wire 48A2 is electrically connected to both of one of the passive element external terminals 30 of the passive element 20A1 that is located closer to the passive element 20A2 in the parallel direction Y and one of the passive element external terminals 30 of the passive element 20A2 that is located closer to the passive element 20A1 in the parallel direction Y.

The size conversion unit 40A has as many second external terminals 45 as the connection wires 48A1, 48A2, and 48A3. Specifically, a second external terminal 45 electrically connected to the connection wire 48A1, a second external terminal 45 electrically connected to the connection wire 48A2, and a second external terminal 45 electrically connected to the connection wire 48A3 are disposed along the parallel direction Y Assume that an area of each second external terminal 45 viewed from the laminating direction X is a "size of each second external terminal 45" and that an area of each passive element external terminal 30 viewed from the laminating direction X is a "size of each passive element external terminal 30". That is, the size of each second external terminal 45 is the area of each second external terminal 45 on the board-side mount surface 43, and the size of each passive element external terminal 30 is the area of each passive element external terminal 30 on the first main surface 23. In this case, the size of each second external terminal 45 is preferably set larger than the size of each passive element external terminal 30. More specifically, in a case where one of the passive element external terminals 30 that has a largest size is referred to as a "maximum passive element external terminal", a size of each second external terminal is preferably set larger than a size of the maximum passive element external terminal. Furthermore, even in a case where the number of second external terminals 45 is smaller than the number of passive element external terminals 30, a total area of the second external terminals 45 on the board-side mount surface 43 is preferably set larger than a total area of the passive element external terminals 30 on the first main surface 23.

In the present embodiment, the following effects can be obtained in addition to effects equivalent to the effects (1-1) through (1-8) of the first embodiment.

(2-1) The plurality of passive elements 20A1 and 20A2 are mounted on the size conversion unit 40A. It is therefore possible to concurrently mount the passive elements 20A1 and 20A2 having a small size on the circuit board CB. This can lessen the trouble of mounting the passive elements 20A1 and 20A2 on the circuit board CB as compared with a case where the passive elements 20A1 and 20A2 are individually mounted on the circuit board CB.

(2-2) By configuring the body 41A so that DC electric resistance of the minimum interval portion becomes "1 time" as high as the DC electric resistance of the capacitor (the passive element 20A2) or higher, influence of a leakage current can be minimized even in a case where a leakage current is generated in the size conversion unit 40A.

(2-3) By setting the interval between the adjacent passive elements 20A1 and 20A2 equal to or less than about "500 μm", an increase in size of the size conversion unit 40A can be suppressed.

A component mounter that has a suction nozzle having a suction diameter of about "Φ150 μm" to about "Φ900 μm" is sometimes used as a component mounter that holds a passive element to be mounted on a circuit board. In this case, by setting the interval equal to or less than about "500 μm", the surface-mount passive component 10A can be sucked (held) by the component mounter even in a case where a gap is present between the passive elements 20A1 and 20A2.

Meanwhile, by setting the interval equal to or larger than about "10 μm", occurrence of short circuit between wires caused due to a too small interval between the passive elements 20A1 and 20A2 can be suppressed.

(2-4) By setting the areas of the first main surfaces 23 of the passive elements 20A1 and 20A2 mounted on the element mount surface 42 identical, it is possible to prevent manufacturing of the surface-mount passive component 10A from becoming complicated.

Manufacturing Method

Next, an example of a method for manufacturing the surface-mount passive component 10A is described with reference to FIGS. 7 through 17. The manufacturing method described below is a method using a semi-additive process to form the connection wires 48A1, 48A2, and 48A3.

Figure 7:
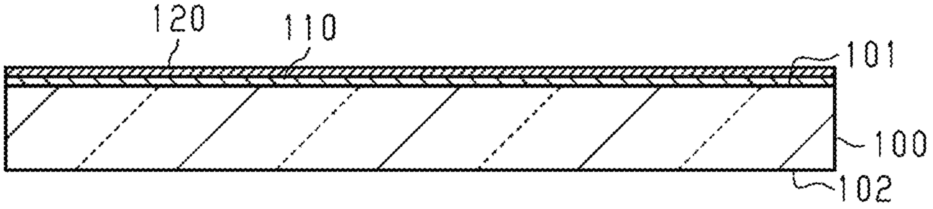
FIG. 7 is a view for explaining a method for manufacturing the surface-mount passive component.

The size conversion unit 40A is formed. As illustrated in FIG. 7, first, a release layer 110 is formed on a substrate 100. The substrate 100 has a substantially plate shape. The substrate 100 is, for example, made of a material such as ceramics. In FIG. 7, an upper surface of the substrate 100 is referred to as a front surface 101, and a lower surface of the substrate 100 is referred to as a rear surface 102. The release layer 110 is formed on the substrate 100 so as to cover the entire front surface 101 of the substrate 100. The release layer 110 is formed from a sheet-shaped member having an adhesive function such as a tape made of an infrared curing resin, an acrylic resin adhesive, or a polyimide adhesive. For example, the release layer 110 can be formed by attaching such a sheet-shaped member on the front surface 101 of the substrate 100.

Figure 8:
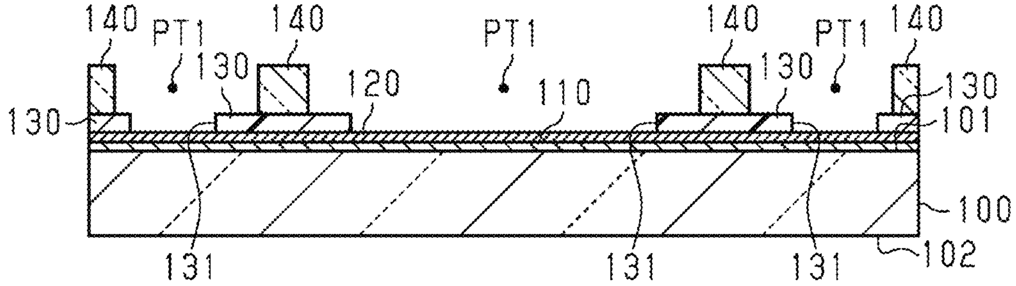
FIG. 8 is a view for explaining the method for manufacturing the surface-mount passive component.

Next, an electrically conductive layer made of an electrically conductive material is formed on the release layer 110. In FIG. 7, a copper layer 120 is formed as the electrically conductive layer. For example, a copper foil is attached as the copper layer 120 onto the release layer 110. Then, a first insulating layer 130 is formed so as to cover an entire front surface 101 of the copper layer 120, as illustrated in FIG. 8. For example, the first insulating layer 130 illustrated in FIG. 8 can be formed by patterning an insulating resin on the copper layer 120 by photolithography.

An example of a method for forming the first insulating layer 130 illustrated in FIG. 8 by photolithography is described below. Specifically, a temporary insulating layer is formed by attaching an insulating material on an entire surface of the copper layer 120. The insulating material can be, for example, one containing a polyimide resin, an acrylic resin, an epoxy resin, a phenolic resin, or a liquid crystal polymer. Next, a photoresist is applied onto the temporary insulating layer. For example, the photoresist is applied by spin coating. Then, exposure is performed by using an exposure device. This makes portions of the photoresist that correspond to position where the connection wires 48A1, 48A2, and 48A3 are to be formed removable by development processing (described later) and cures the other portions. Note that in a case where a negative type resist is used as the photoresist, portions of the photoresist that are exposed to light are cured, and the other portions become removable. Meanwhile, in a case where a positive type resist is used as the photoresist, portions of the photoresist that are exposed to light become removable, and the other portions are cured. Next, the portions of the photoresist that correspond to the position where the connection wires 48A1, 48A2, and 48A3 are to be formed are removed by development processing using a developer. The cured portions of the photoresist remain on the copper layer 120 as a first protection film. In this state, portions of the temporary insulating layer that are not covered with the first protection film are removed, for example, by wet etching. Then, when the first protection film is removed, the first insulating layer 130 is formed. Note that the first insulating layer 130 has a plurality of through-holes 131 extending in the up-down direction in FIG. 8. These through-holes 131 are arranged along the left-right direction in FIG. 8.

When the formation of the first insulating layer 130 is completed, a photoresist is applied onto a front surface 101 side of the substrate 100. As a result, portions of the copper layer 120 that are not covered with the first insulating layer 130 and the first insulating layer 130 are covered. Then, exposure using an exposure device is performed. This makes portions of the photoresist that correspond to the positions where the connection wires 48A1, 48A2, and 48A3 are to be formed removable by development processing (described later) and cures the other portions. The portions of the photoresist that correspond to the positions where the connection wires 48A1, 48A2, and 48A3 are to be formed are portions continuous with the through-holes 131 of the first insulating layer 130. Next, the portions of the photoresist that correspond to the positions where the connection wires 48A1, 48A2, and 48A3 are to be formed are removed by development processing using a developer, as illustrated in FIG. 8. The cured portions of the photoresist remain on the substrate 100 as a second protection film 140. By thus patterning the second protection film 140, a first wiring pattern PT1 is formed.

Figure 9:
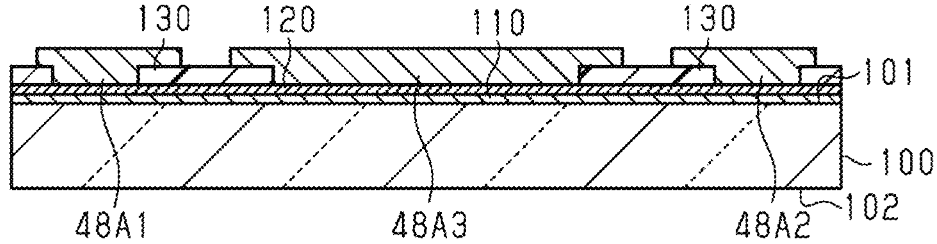
FIG. 9 is a view for explaining the method for manufacturing the surface-mount passive component.
Figure 10:
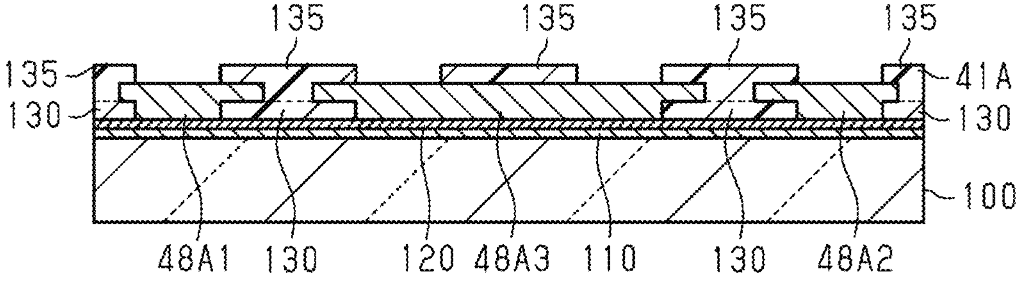
FIG. 10 is a view for explaining the method for manufacturing the surface-mount passive component.

When the formation of the first wiring pattern PT1 is completed, formation of the connection wires 48A1, 48A2, and 48A3 starts. For example, copper precipitates on the exposed portions of the copper layer 120 by electrolytic copper plating using a cupric sulfate solution. This forms a portion of the connection wire 48A1, a portion of the connection wire 48A2, and a portion of the connection wire 48A3, as illustrated in FIG. 9. In a case where a cupric sulfate solution is used to form the connection wires 48A1, 48A2, and 48A3, the connection wires 48A1, 48A2, and 48A3 contain a slight amount of sulfur. Then, the second protection film 140 is removed, for example, by wet etching.

When removal of the second protection film 140 is completed, a second insulating layer 135 is formed. For example, the second insulating layer 135 illustrated in FIG. 10 can be formed by patterning an insulating resin on the first insulating layer 130 by photolithography. In the present embodiment, the body 41A of the size conversion unit 40A is constituted by the first insulating layer 130 and the second insulating layer 135. That is, a surface of the second insulating layer 135 which is an upper surface in FIG. 10 corresponds to the element mount surface 42 of the body 41A. Then, positions of the second insulating layer 135 where the first external terminals 44 are to be formed are ground, for example, by irradiation of laser. This exposes upper ends of the connection wires 48A1, 48A2, and 48A3 in FIG. 10 to an outside.

Figure 11:
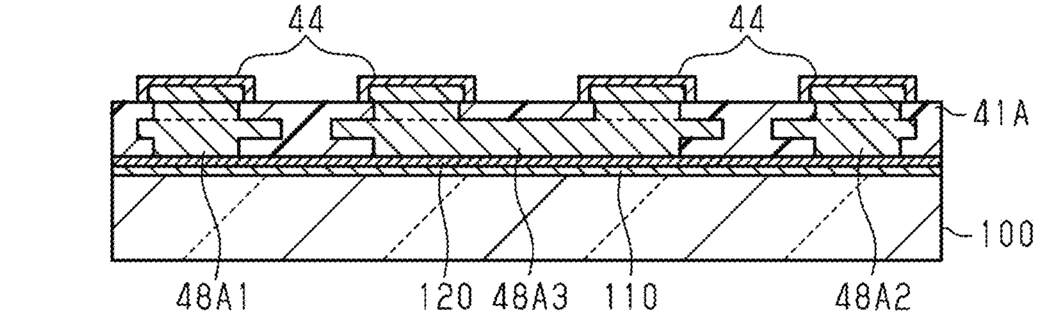
FIG. 11 is a view for explaining the method for manufacturing the surface-mount passive component.

Next, a remaining portion of the connection wire 48A1, a remaining portion of the connection wire 48A2, and a remaining portion of the connection wire 48A3 are formed. For example, copper precipitates by electrolytic copper plating using a cupric sulfate solution. This forms the remaining portion of the connection wire 48A1, the remaining portion of the connection wire 48A2, and the remaining portion of the connection wire 48A3, as illustrated in FIG. 11. As a result, formation of the connection wires 48A1, 48A2, and 48A3 is completed. In a case where a cupric sulfate solution is used to form the connection wires 48A1, 48A2, and 48A3, the connection wires 48A1, 48A2, and 48A3 contain a slight amount of sulfur. Next, the first external terminals 44 are formed. In the example illustrated in FIG. 11, multilayer bodies each including a plurality of layers are formed as the first external terminals 44.

Figure 12:
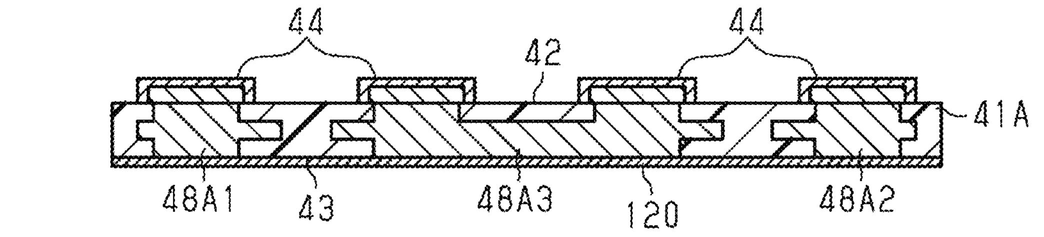
FIG. 12 is a view for explaining the method for manufacturing the surface-mount passive component.
Figure 13:
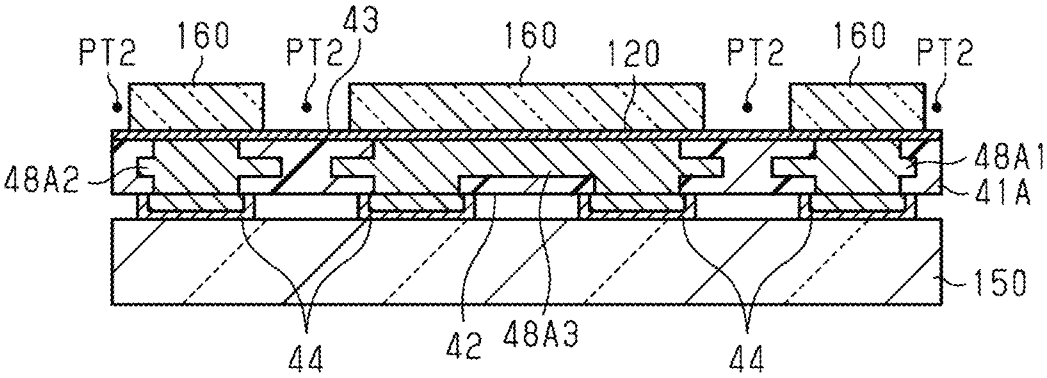
FIG. 13 is a view for explaining the method for manufacturing the surface-mount passive component.

When the formation of the first external terminals 44 is completed, the substrate 100 and the release layer 110 are removed, for example, by peeling, as illustrated in FIG. 12. Next, as illustrated in FIG. 13, a support substrate 150 is attached onto a board-side mount surface 43 side of the body 41A. A release layer may be formed on a front surface (upper surface in FIG. 12) of the support substrate 150. In a case where the body 41A is sufficiently thick, the step of attaching the support substrate 150 onto the body 41A may be omitted.

A photoresist is applied onto the copper layer 120 to form the second external terminals 45. Next, exposure using an exposure device is performed. This cures portions of the photoresist that correspond to positions where the second external terminals 45 are to be formed and makes the other portions removable by development processing (described later). The portions of the photoresist other than the portions that correspond to the positions where the second external terminals 45 are to be formed are removed by development processing using a developer, as illustrated in FIG. 13. The cured portions of the photoresist remain as a third protection film 160 on the copper layer 120. By thus patterning the third protection film 160, a terminal pattern PT2 is formed.

Figure 14:
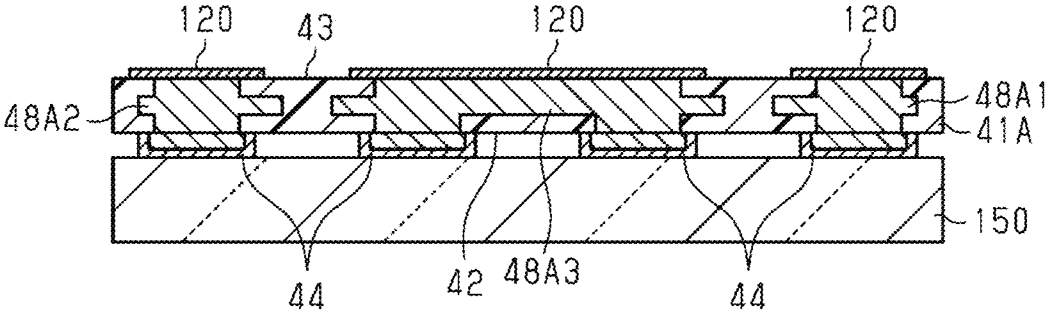
FIG. 14 is a view for explaining the method for manufacturing the surface-mount passive component.
Figure 15:
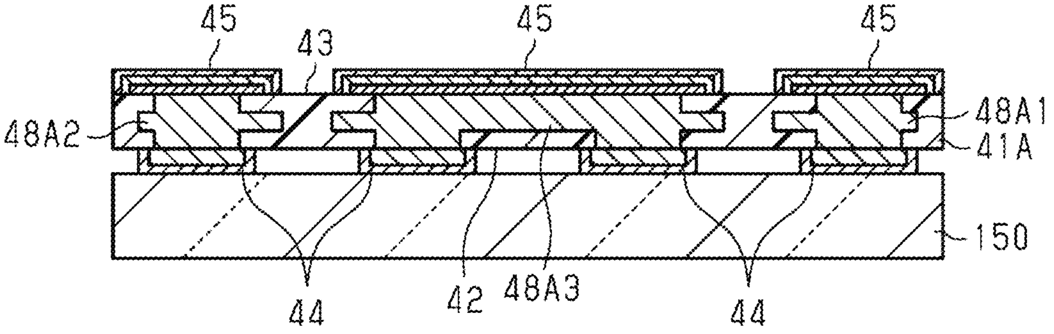
FIG. 15 is a view for explaining the method for manufacturing the surface-mount passive component.

When the formation of the third protection film 160 is completed, formation of the second external terminals 45 starts. First, portions of the copper layer 120 are removed. Specifically, portions of the copper layer 120 that are not covered with the third protection film 160 are removed, for example, by wet etching, as illustrated in FIG. 14. That is, the copper layer 120 remains only in the positions where the second external terminals 45 are to be formed, and the other portions of the copper layer 120 are removed. Next, the third protection film 160 is removed by wet etching. Then, multilayer bodies illustrated in FIG. 15 are formed as the second external terminals 45 by forming a plurality of layers on the remaining copper layer 120. In this case, the second external terminals 45 are multilayer bodies including a layer containing copper.

Figure 16:
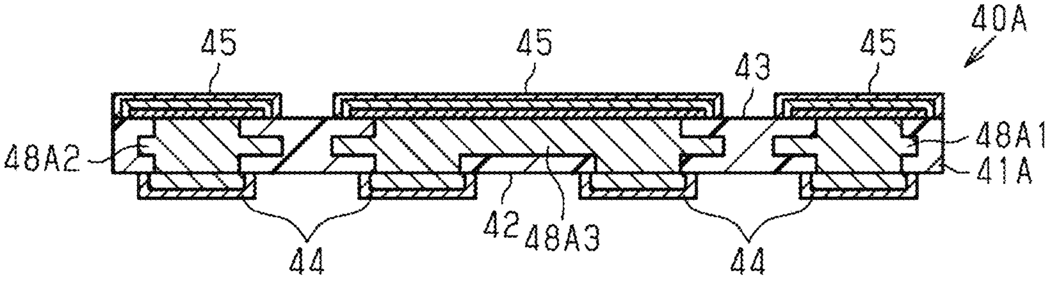
FIG. 16 is a view for explaining the method for manufacturing the surface-mount passive component.
Figure 17:
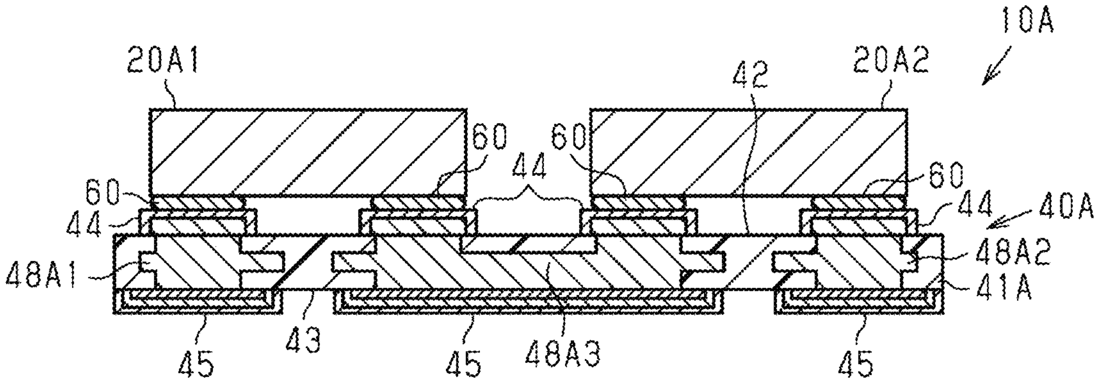
FIG. 17 is a view for explaining the method for manufacturing the surface-mount passive component.

When the formation of the second external terminals 45 is completed, the support substrate 150 is peeled from the body 41A, as illustrated in FIG. 16. This completes the size conversion unit 40A. Next, the passive elements 20A1 and 20A2 are mounted on the element mount surface 42 of the body 41A, as illustrated in FIG. 17. This finishes the series of processes that constitute the method for manufacturing the surface-mount passive component 10A.

The above manufacturing method is an example of a method for manufacturing the surface-mount passive component 10A one by one. However, the method for manufacturing the surface-mount passive component 10A is not limited to this. For example, a plurality of surface-mount passive components 10A may be manufactured concurrently by forming portions that will become a plurality of size conversion units 40A in rows and columns and creating individual pieces, for example, by dicing after mounting of passive elements.

Third Embodiment

Next, a third embodiment of a surface-mount passive component is described with reference to FIGS. 18 through 29. The following mainly describes differences from the second embodiment. Members identical or corresponding to those in the above embodiments are given identical reference signs, and repeated description thereof is omitted.

Figure 18:
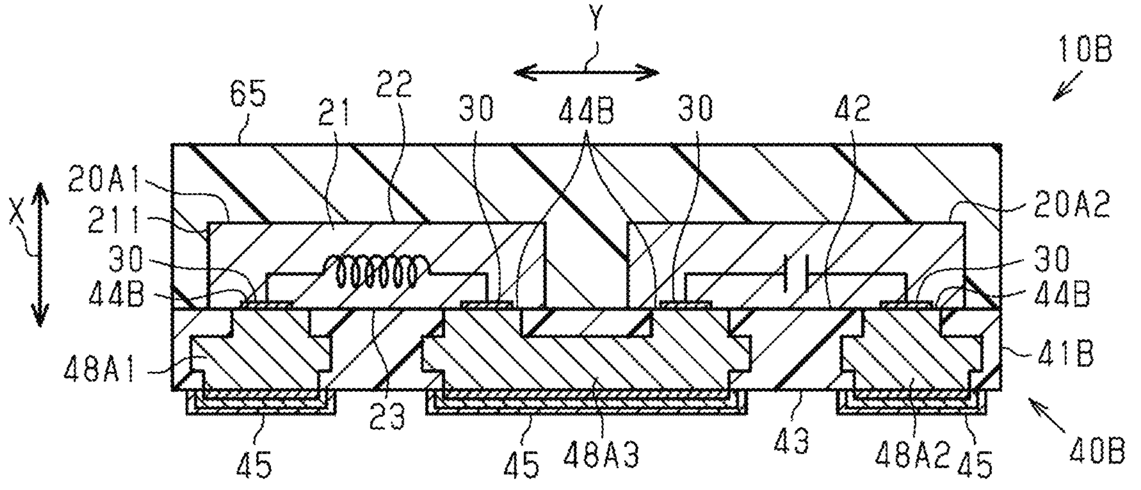
FIG. 18 is a cross-sectional view of a surface-mount passive component according to a third embodiment.

As illustrated in FIG. 18, a surface-mount passive component 10B according to the present embodiment includes a size conversion unit 40B and a plurality of passive elements 20A1 and 20A2. The passive elements 20A1 and 20A2 are mounted on an element mount surface 42 of a body 41B of the size conversion unit 40B. Note that passive element external terminals 30 of the passive elements 20A1 and 20A2 may be directly connected to first external terminals 44B of the size conversion unit 40B. In a case where a connection part such as solder is not interposed between the passive element external terminals 30 and the first external terminals 44B, end surfaces of connection wires 48A1, 48A2, and 48A3 function as the first external terminals 44B.

The surface-mount passive component 10B includes a sealing part 65 that seals the passive elements 20A1 and 20A2. The sealing part 65 contains a sealing resin. That is, the passive elements 20A1 and 20A2 may be sealed with a resin as in the surface-mount passive component 10B. The sealing resin may be, for example, a mold material, an undercoat material, or an underfill material. Specifically, the sealing resin may be one containing a resin such as an epoxy resin, a polyimide resin, an acrylic resin, a phenolic resin, or a liquid crystal polymer resin and an insulating filler such as silica.

The sealing part 65 is also in contact with the element mount surface 42. The sealing part 65 covers entire second main surfaces 22 (upper surfaces in FIG. 18) of the passive elements 20A1 and 20A2 and entire non-main surfaces 211 that connect the first main surfaces 23 and the second main surfaces 22.

In the present embodiment, the following effects can be obtained in addition to the effects equivalent to the effects (1-1) through (1-8) and (2-1) through (2-4) of the above embodiments.

(3-1) A strength of the surface-mount passive component 10B can be increased by sealing the passive elements 20A1 and 20A2 with a resin.

Furthermore, a coefficient of linear expansion of the sealing part 65 and a coefficient of linear expansion of the size conversion unit 40B can be combined, and the coefficient of linear expansion of the sealing part 65 and a coefficient of linear expansion of a circuit board CB can be combined. By thus combining coefficients of linear expansion, resistance of the surface-mount passive component 10B to stress can be increased.

Manufacturing Method

Next, an example of a method for manufacturing the surface-mount passive component 10B is described with reference to FIGS. 19 through 29. The manufacturing method described below is a method using a semi-additive process to form the connection wires 48A1, 48A2, and 48A3.

Figure 19:
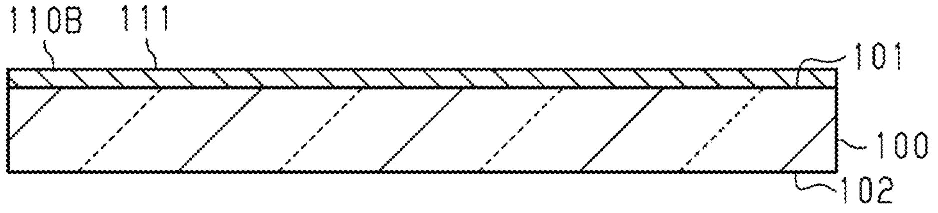
FIG. 19 is a view for explaining a method for manufacturing the surface-mount passive component.

The passive elements 20A1 and 20A2 are sealed with a resin. As illustrated in FIG. 19, first, a release layer 110B is formed on a substrate 100. The substrate 100 has a substantially plate shape. In FIG. 19, an upper surface of the substrate 100 is referred to as a front surface 101, and a lower surface of the substrate 100 is referred to as a rear surface 102. The release layer 110B is formed on the substrate 100 so as to cover the entire front surface 101 of the substrate 100. The release layer 110B is formed from a sheet-shaped member having an adhesive function such as a tape made of an infrared curing resin, an acrylic resin adhesive, or a polyimide adhesive. For example, the release layer 110B can be formed by attaching such a sheet-shaped member on the front surface 101 of the substrate 100.

Figure 20:
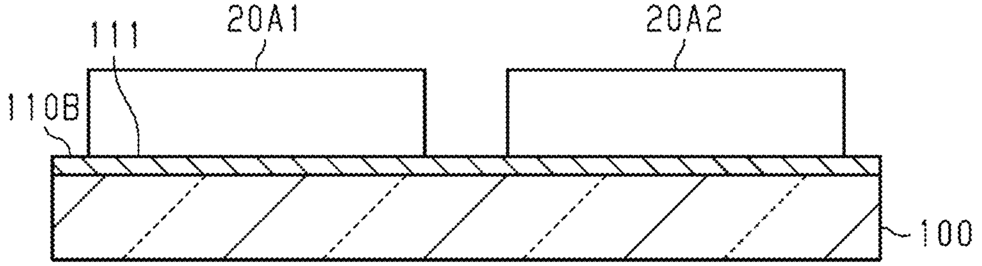
FIG. 20 is a view for explaining the method for manufacturing the surface-mount passive component.
Figure 21:
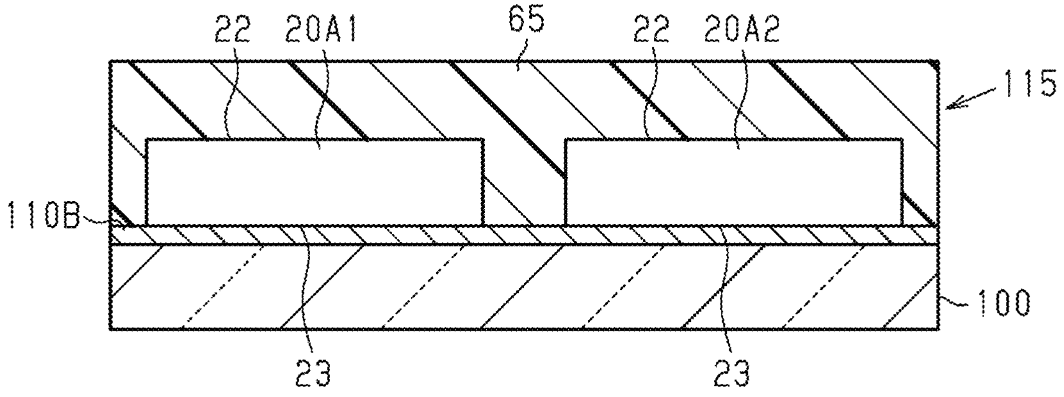
FIG. 21 is a view for explaining the method for manufacturing the surface-mount passive component.

When the formation of the release layer 110B is completed, the passive elements 20A1 and 20A2 are placed on the release layer 110B, as illustrated in FIG. 20. The passive elements 20A1 and 20A2 are placed on the release layer 110B in such a manner that the first main surfaces 23 face a front surface 111 of the release layer 110B. That is, passive element external terminals 30 of the passive elements 20A1 and 20A2 are in contact with the release layer 110B. Then, a sealing resin is supplied onto the substrate 100 so as to cover exposed portions of the front surface of the release layer 110B and entire side surfaces of the passive elements 20A1 and 20A2. For example, a sealing resin containing an epoxy resin material is desirably supplied onto the substrate 100. Alternatively, a sealing resin obtained by mixing a filler such as silica in such an epoxy resin material may be supplied onto the substrate 100. This forms the sealing part 65, as illustrated in FIG. 21.

Figure 22:
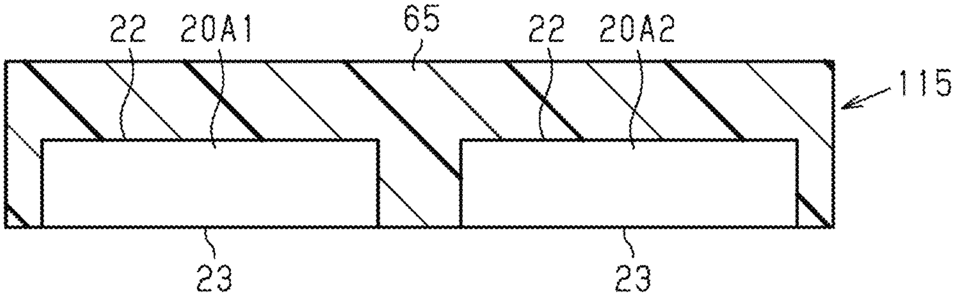
FIG. 22 is a view for explaining the method for manufacturing the surface-mount passive component.
Figure 23:
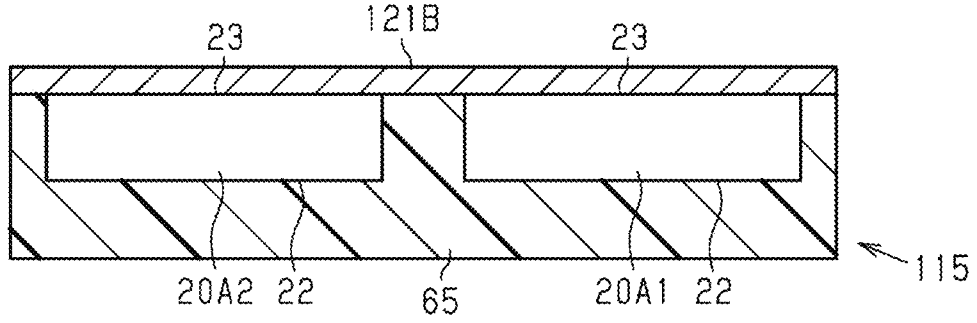
FIG. 23 is a view for explaining the method for manufacturing the surface-mount passive component.
Figure 24:
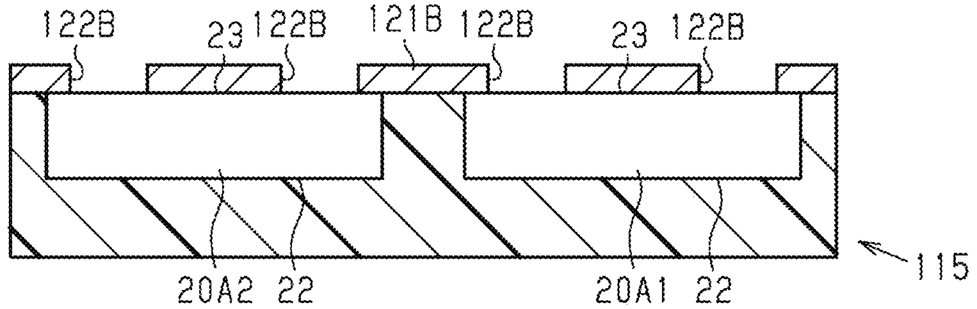
FIG. 24 is a view for explaining the method for manufacturing the surface-mount passive component.

When the formation of the sealing part 65 is completed, the release layer 110B and the substrate 100 are removed from an intermediate product 115, as illustrated in FIG. 22. The intermediate product 115 is constituted by the passive elements 20A1 and 20A2 and the sealing part 65. When the removal is completed, a first insulating layer 121B is formed so as to cover an entire upper surface of the intermediate product 115 in FIG. 23, that is, a surface on which the first main surfaces 23 of the passive elements 20A1 and 20A2 are exposed, as illustrated in FIG. 23. Next, through-holes 122B are formed in portions of the first insulating layer 121B that correspond to the passive element external terminals 30 of the passive elements 20A1 and 20A2 by laser irradiation or photolithography. This exposes the passive element external terminals 30 to an outside.

Figure 25:
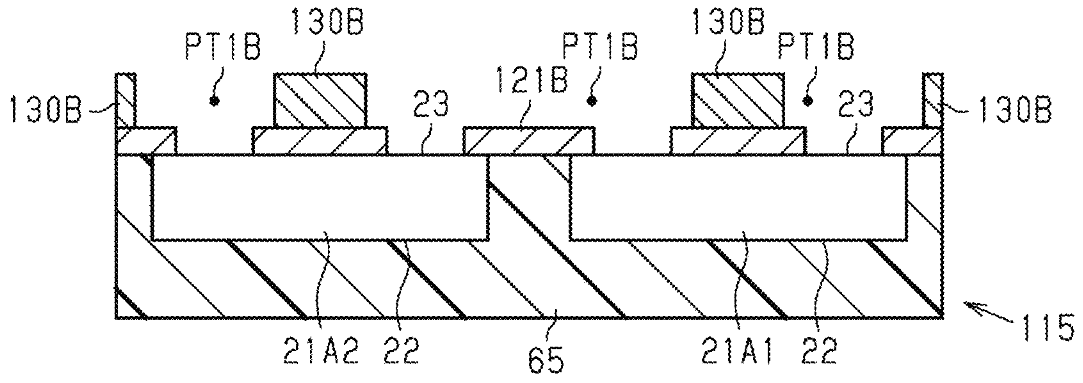
FIG. 25 is a view for explaining the method for manufacturing the surface-mount passive component.

Next, a photoresist is applied onto the intermediate product 115 so as to cover the first insulating layer 121B and the passive element external terminals 30. Then, exposure using an exposure device is performed. This makes portions of the photoresist that correspond to positions where the connection wires 48A1, 48A2, and 48A3 are to be formed removable by development processing (described later) and cures the other portions. Then, the portions of the photoresist that correspond to the positions where the connection wires 48A1, 48A2, and 48A3 are to be formed are removed by development processing using a developer, as illustrated in FIG. 25. The cured portions of the photoresist remain on the intermediate product 115 as the first protection film 130B. By thus patterning the first protection film 130B, a first wiring pattern PT1B is formed.

Figure 26:
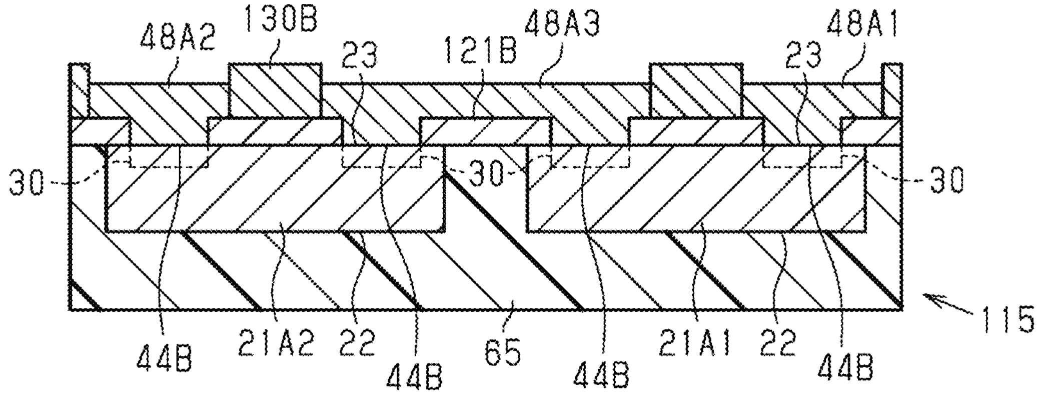
FIG. 26 is a view for explaining the method for manufacturing the surface-mount passive component.
Figure 27:
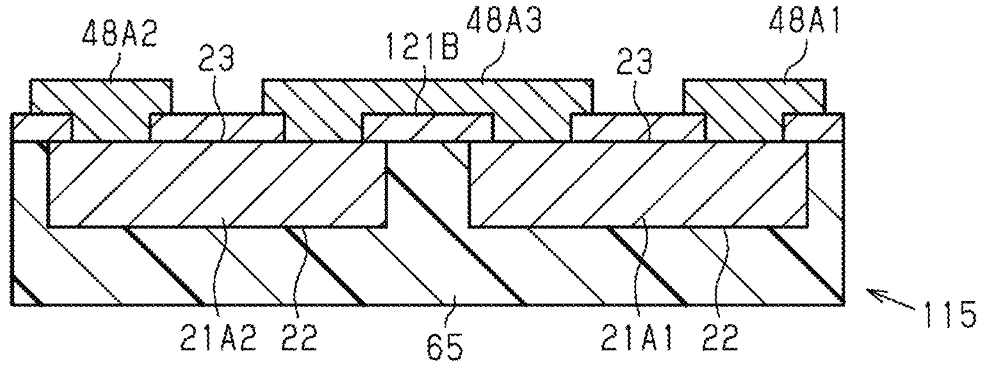
FIG. 27 is a view for explaining the method for manufacturing the surface-mount passive component.

When the formation of the first wiring pattern PT1B is completed, formation of the connection wires 48A1, 48A2, and 48A3 starts. For example, copper precipitates on the passive element external terminals 30 by electrolytic copper plating using a cupric sulfate solution. This forms a portion of the connection wire 48A1, a portion of the connection wire 48A2, and a portion of the connection wire 48A3, as illustrated in FIG. 26. In a case where a cupric sulfate solution is used to form the connection wires 48A1, 48A2, and 48A3, the connection wires 48A1, 48A2, and 48A3 contain a slight amount of sulfur. Then, the first protection film 130B is removed from the intermediate product 115, for example, by wet etching, as illustrated in FIG. 27.

Figure 28:
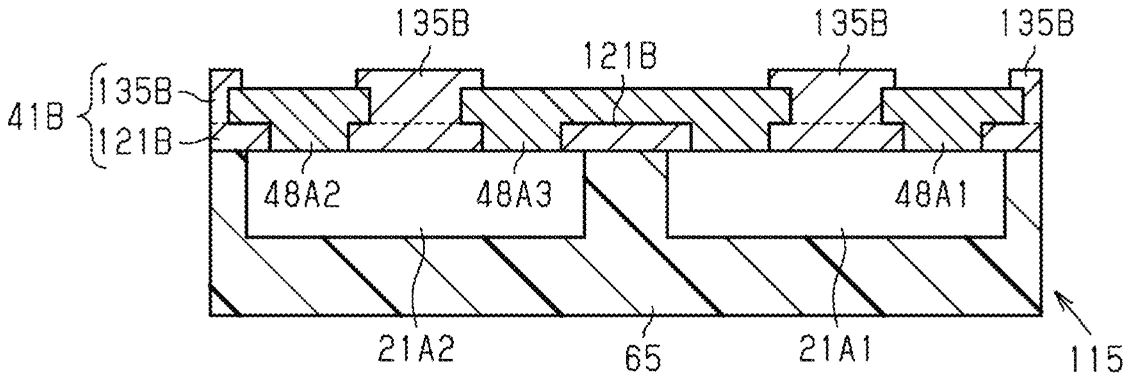
FIG. 28 is a view for explaining the method for manufacturing the surface-mount passive component.
Figure 29:
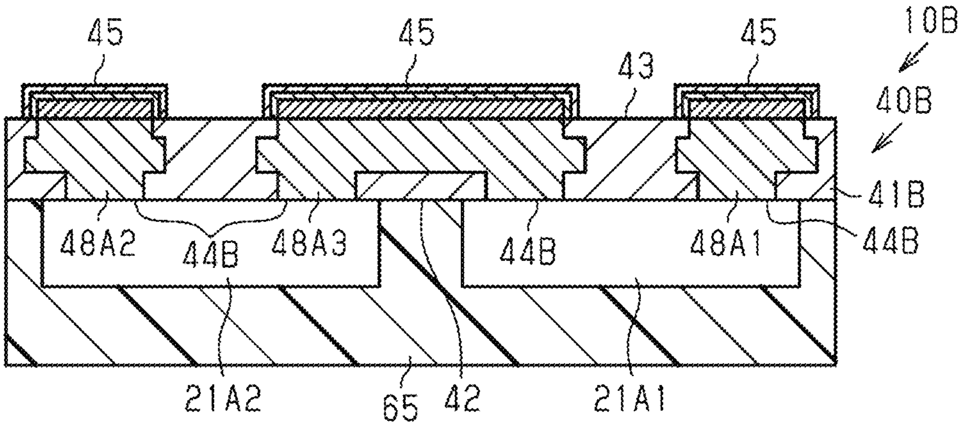
FIG. 29 is a view for explaining the method for manufacturing the surface-mount passive component.

When the removal of the first protection film 130B is completed, a second insulating layer 135B is formed, as illustrated in FIG. 28. That is, the body 41B of the size conversion unit 40B is formed by the first insulating layer 121B and the second insulating layer 135B. Next, a remaining portion of the connection wire 48A1, a remaining portion of the connection wire 48A2, and a remaining portion of the connection wire 48A3 are formed. For example, copper precipitates by electrolytic copper plating using a cupric sulfate solution. This completes formation of the connection wires 48A1, 48A2, and 48A3, as illustrated in FIG. 29. In a case where a cupric sulfate solution is used to form the connection wires 48A1, 48A2, and 48A3, the connection wires 48A1, 48A2, and 48A3 contain a slight amount of sulfur. After the formation of the connection wires 48A1, 48A2, and 48A3 is completed, the first external terminals 44B are formed. This finishes the series of processes that constitute the method for manufacturing the surface-mount passive component 10B. Note that formation of the second insulating layer 135B and the first external terminals 44B is similar to that in the manufacturing method according to the second embodiment, and therefore detailed description thereof is omitted.

The above manufacturing method is an example of a method for manufacturing the surface-mount passive component 10B one by one. However, the method for manufacturing the surface-mount passive component 10B is not limited to this. For example, a plurality of surface-mount passive components 10B may be manufactured concurrently by forming portions that will become a plurality of size conversion units 40B in rows and columns and creating individual pieces, for example, by dicing after mounting of passive elements.

Fourth Embodiment

Next, a fourth embodiment of a surface-mount passive component is described with reference to FIG. 30. The following mainly describes differences from the third embodiment. Members identical or corresponding to those in the above embodiments are given identical reference signs, and repeated description thereof is omitted.

Figure 30:
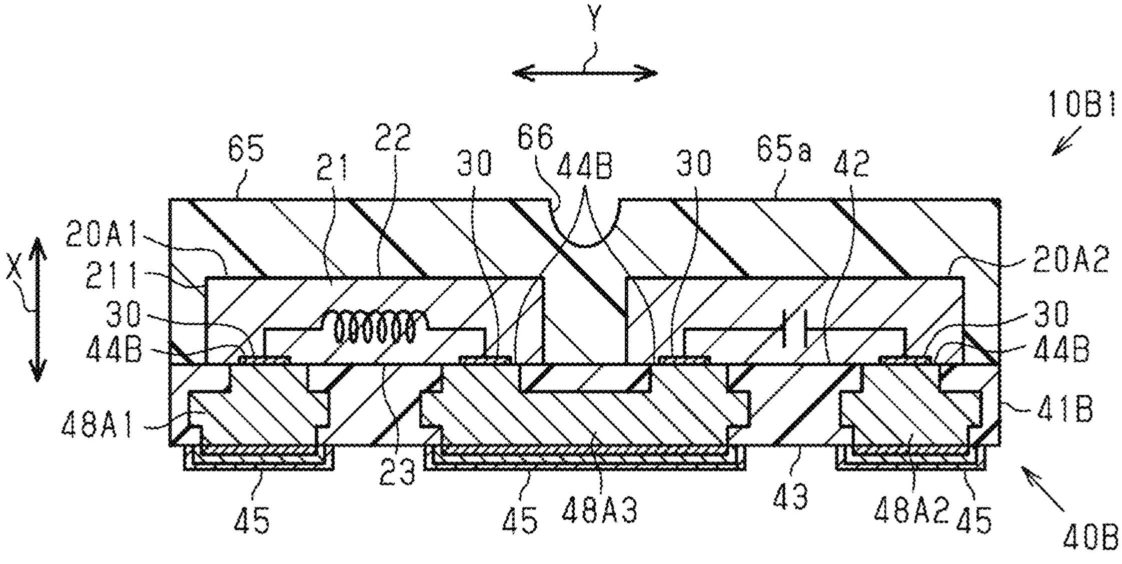
FIG. 30 is a cross-sectional view of a surface-mount passive component according to a fourth embodiment.

In a surface-mount passive component 10B1 according to the present embodiment, a sealing part 65 has a recess 66, as illustrated in FIG. 30. The recess 66 is opened on a top surface 65a of the sealing part 65, which is an upper surface of the sealing part 65 in FIG. 30. The recess 66 is disposed in a portion between passive elements 20A1 and 20A2 that are adjacent to each other in a parallel direction Y. In a case where a portion of the recess 66 that has a maximum dimension in the parallel direction Y is referred to as a maximum dimension portion, a dimension of the maximum dimension portion in the parallel direction Y is regarded as a width of the recess 66, and dimensions of the passive elements 20A1 and 20A2 in the parallel direction Y are regarded as widths of the passive elements 20A1 and 20A2. In the example illustrated in FIG. 30, the width of the passive element 20A1 is identical to the width of the passive element 20A2. The width of the recess 66 is preferably equal to or smaller than a half of the widths of the passive elements 20A1 and 20A2. Note that even in a case where the widths of the passive elements 20A1 and 20A2 are different within a range of tolerances, it is regarded that the widths of the passive elements 20A1 and 20A2 are identical.

In a case where a portion of the recess 66 that has a maximum dimension in the laminating direction X is referred to as a maximum portion, a dimension of the maximum portion in the laminating direction X is regarded as a depth of the recess 66. In this case, the depth of the recess 66 is preferably equal to or smaller than a half of thicknesses T1 of the passive elements 20A1 and 20A2.

In some cases, the widths of the two passive elements 20A1 and 20A2 located on both sides of the recess 66 in the parallel direction Y are different. In such cases, the width of the recess 66 may be set equal to or smaller than a half of a width of a narrow passive element, which is a narrower one of the two passive elements 20A1 and 20A2. The depth of the recess 66 may be set equal to or smaller than a half of a thickness of the narrow passive element.

In the present embodiment, the following effects can be obtained in addition to effects equivalent to the effects (1-1) through (1-8), (2-1) through (2-4), and (3-1) of the above embodiments.

(4-1) The surface-mount passive component 10B1 can be reduced in weight by providing the recess 66 in the sealing part 65. Furthermore, according to the configuration in which the sealing part 65 has the recess 66, it can be easily determined whether or not the sealing part 65 has been properly formed based on the presence or absence of the recess 66.

(4-2) In a case where the width of the recess 66 is too large, it may become hard to pick the surface-mount passive component 10B1 up when the surface-mount passive component 10B1 is mounted on a circuit board CB. In view of this, the width of the recess 66 is preferably set equal to or smaller than a half of the widths of the passive elements 20A1 and 20A2. In this case, the width of the recess 66 does not become too large, and therefore it is less likely that the surface-mount passive component 10B1 is hard to pick up.

(4-3) In a case where the depth of the recess 66 is too large, the sealing part 65 has a thin portion. This raises concerns about a decline in strength of the surface-mount passive component 10B1. In view of this, the depth of the recess 66 is preferably set equal to or smaller than a half of the thicknesses of the passive elements 20A1 and 20A2. In this case, the strength of the thin portion of the sealing part 65 does not become too low. It is therefore possible to suppress a decline in strength of the surface-mount passive component 10B1 caused by the presence of the recess 66 in the sealing part 65.

Fifth Embodiment

Next, a fifth embodiment of a surface-mount passive component is described with reference to FIG. 31. The following mainly describes differences from the third embodiment. Members identical or corresponding to those in the above embodiments are given identical reference signs, and repeated description thereof is omitted.

Figure 31:
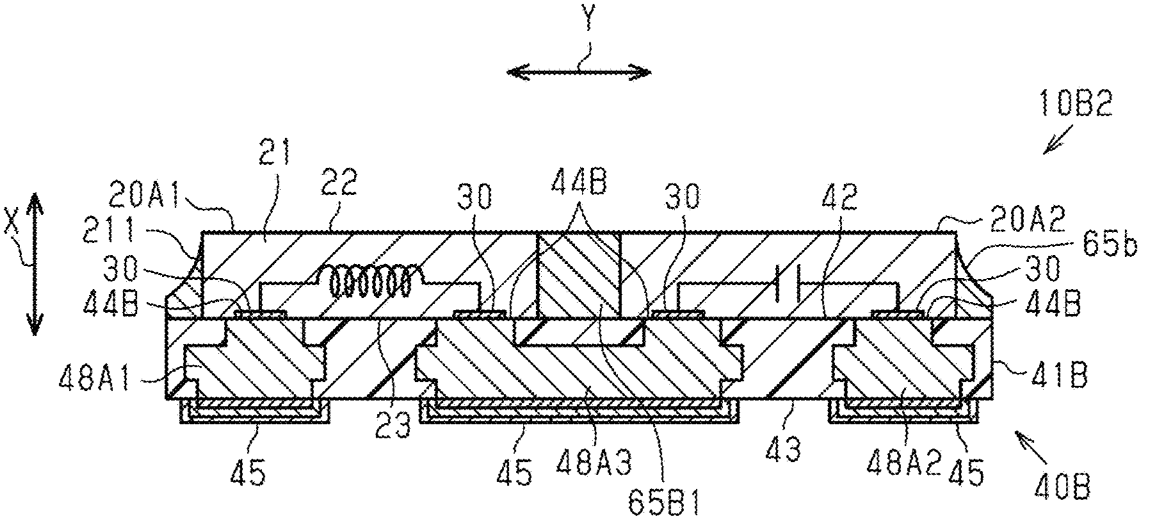
FIG. 31 is a cross-sectional view of a surface-mount passive component according to a fifth embodiment.

As illustrated in FIG. 31, a surface-mount passive component 10B2 according to the present embodiment includes a sealing part 65B1 that seals passive elements 20A1 and 20A2. This sealing part 65B1 is not in contact with second main surfaces 22 of the passive elements 20A1 and 20A2. That is, the second main surfaces 22 of the passive elements 20A1 and 20A2 are exposed to an outside from the sealing part 65B1. Furthermore, a portion of the sealing part 65B1 on an outer side of the passive element 20A1 in the parallel direction Y and a portion of the sealing part 65B1 on an outer side of the passive element 20A2 in the parallel direction Y are thickness-changing portions **65*b*** whose thicknesses become smaller towards outer sides in the parallel direction Y.

By thus making the thickness of the sealing part 65B1 smaller than the thickness of the sealing part 65 according to the third embodiment, the surface-mount passive component 10B2 can be reduced in weight. Furthermore, the surface-mount passive component 10B2 can be further reduced in weight by providing the thickness-changing portions **65*b* in the sealing part 65B1**.

Sixth Embodiment

Next, a sixth embodiment of a surface-mount passive component is described with reference to FIGS. 32 and 33. The following mainly describes differences from the second embodiment. Members identical or corresponding to those in the above embodiments are given identical reference signs, and repeated description thereof is omitted.

Figure 32:
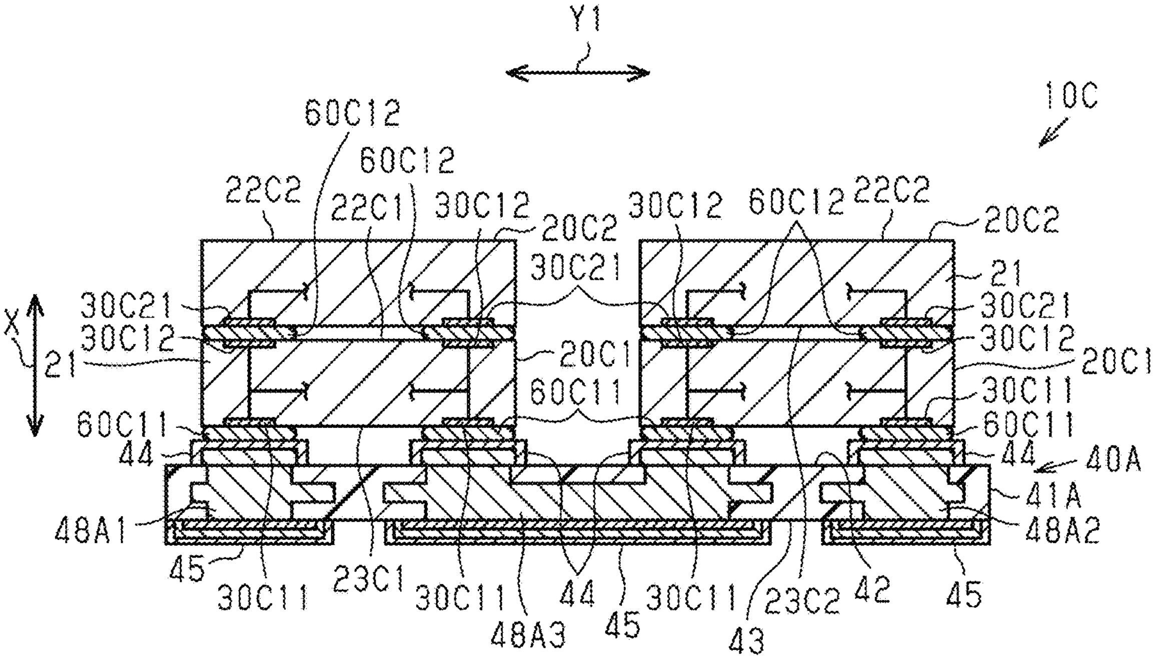
FIG. 32 is a cross-sectional view of a surface-mount passive component according to a sixth embodiment.
Figure 33:
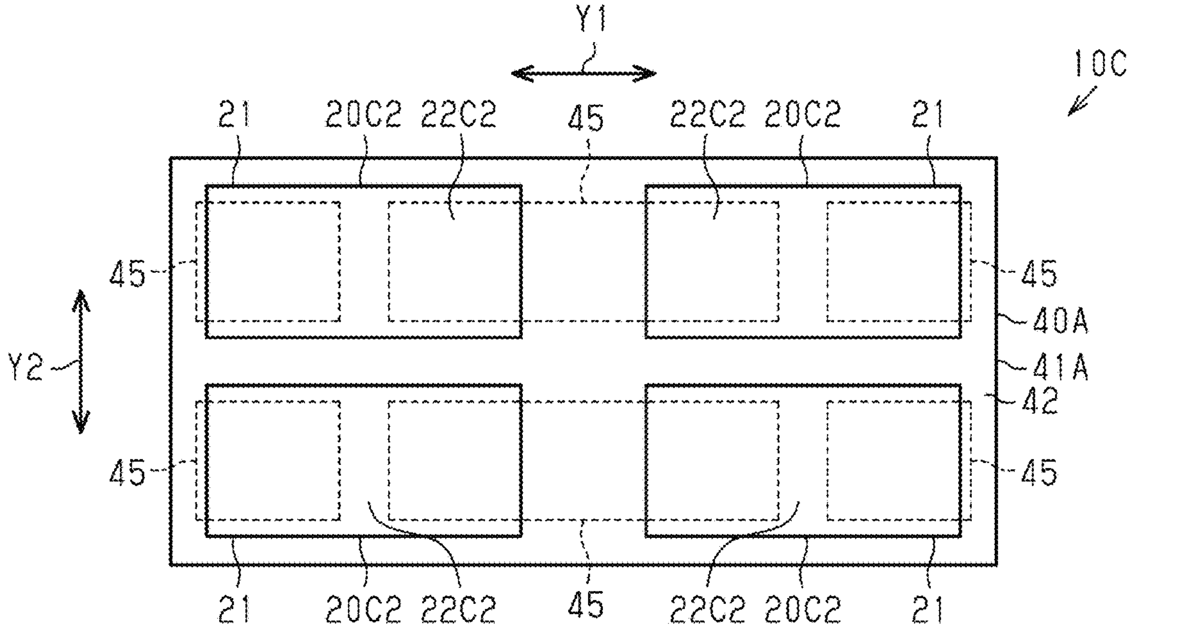
FIG. 33 is a plan view of the surface-mount passive component.

As illustrated in FIGS. 32 and 33, a surface-mount passive component 10C according to the present embodiment includes a size conversion unit 40A and a plurality of first passive elements 20C1 mounted on the size conversion unit 40A. Specifically, the first passive elements 20C1 are mounted on an element mount surface 42 of a body 41A of the size conversion unit 40A. In the example illustrated in FIGS. 32 and 33, four first passive elements 20C1 are mounted on the element mount surface 42. Among directions orthogonal to the laminating direction X, a left-right direction in FIGS. 32 and 33 is referred to as a "first parallel direction Y1", and an up-down direction in FIG. 33 is referred to as a "second parallel direction Y2". In this case, groups each made up of two first passive elements 20C1 arranged along the first parallel direction Y1 are arranged in the second parallel direction Y2.

As illustrated in FIG. 32, assuming that an area of each first passive element 20C1 viewed from the laminating direction X is a "size of each first passive element 20C1", sizes of the first passive elements 20C1 are preferably identical. This can make areas of first main surfaces 23C1 of the first passive elements 20C1 identical. Even in a case where the areas of the first main surfaces 23C1 are different within a range of tolerances, it is regarded that the areas of the first main surfaces 23C1 of the first passive elements 20C1 are identical. Furthermore, thicknesses of the first passive elements 20C1 are also desirably identical. Even in a case where the thicknesses of the first passive elements 20C1 are different in a range of tolerances, it is regarded that the thicknesses of the first passive elements 20C1 are identical.

In the present embodiment, each of the first passive elements 20C1 has a body 21 and both external terminals exposed on a first main surface 23C1 of the body 21 and external terminals exposed on a second main surface 22C1 of the body 21. The external terminals exposed on the first main surface 23C1 are referred to as "first passive element external terminals 30C11", and external terminals exposed on the second main surface 22C1 are referred to as "second passive element external terminals 30C12". In a case where the first passive elements 20C1 are mounted on the size conversion unit 40A, the first main surface 23C1 is located closer to the size conversion unit 40A than the second main surface 22C1.

On an element mount surface 42 of the size conversion unit 40A, a plurality of first external terminals 44 electrically connected to the first passive element external terminals 30C11 are exposed. In the example illustrated in FIG. 32, a connection part 60C11 such as solder is interposed between each first external terminal 44 and a corresponding one of the first passive element external terminals 30C11.

The surface-mount passive component 10C includes a plurality of second passive elements 20C2 mounted on the respective first passive elements 20C1. In a case where among main surfaces of a body 21 of each second passive element 20C2, a bottom surface is referred to a first main surface 23C2 and a top surface is referred to as a second main surface 22C2, the first main surface 23C2 of the second passive element 20C2 is located closer to the first passive element 20C1 than the second main surface 22C2 in a state where the second passive element 20C2 is mounted on the first passive element 20C1. Assuming that an area of each second passive element 20C2 viewed from the laminating direction X is a "size of each second passive element 20C2", sizes of the second passive elements 20C2 are preferably identical. This can make areas of the first main surfaces 23C2 of the second passive elements 20C2 identical. Even in a case where the areas of the first main surfaces 23C2 are different within a range of tolerances, it is regarded that the areas of the first main surfaces 23C2 of the second passive elements 20C2 are identical. Furthermore, in a case where the sizes of the second passive elements 20C2 are set identical to the sizes of the first passive elements 20C1, a single second passive element 20C2 can be disposed on a single first passive element 20C1.

Each of the second passive elements 20C2 has passive element external terminals 30C21, which are external terminals exposed on the first main surface 23C2. The passive element external terminals 30C21 are electrically connected to the second passive element external terminals 30C12 of a corresponding one of the first passive elements 20C1 with a connection part 60C12 such as solder interposed therebetween.

In the present embodiment, the following effects can be obtained in addition to effects equivalent to the effects (1-1) through (1-8) and (2-1) through (2-4) of the above embodiments.

(6-1) A larger number of passive elements can be mounted on a single size conversion unit 40A. This can prevent the surface-mount passive component on the circuit board CB from occupying a large area on the circuit board CB.

Seventh Embodiment

Next, a seventh embodiment of a surface-mount passive component is described with reference to FIG. 34. The following mainly describes differences from the sixth embodiment. Members identical or corresponding to those in the above embodiments are given identical reference signs, and repeated description thereof is omitted.

Figure 34:
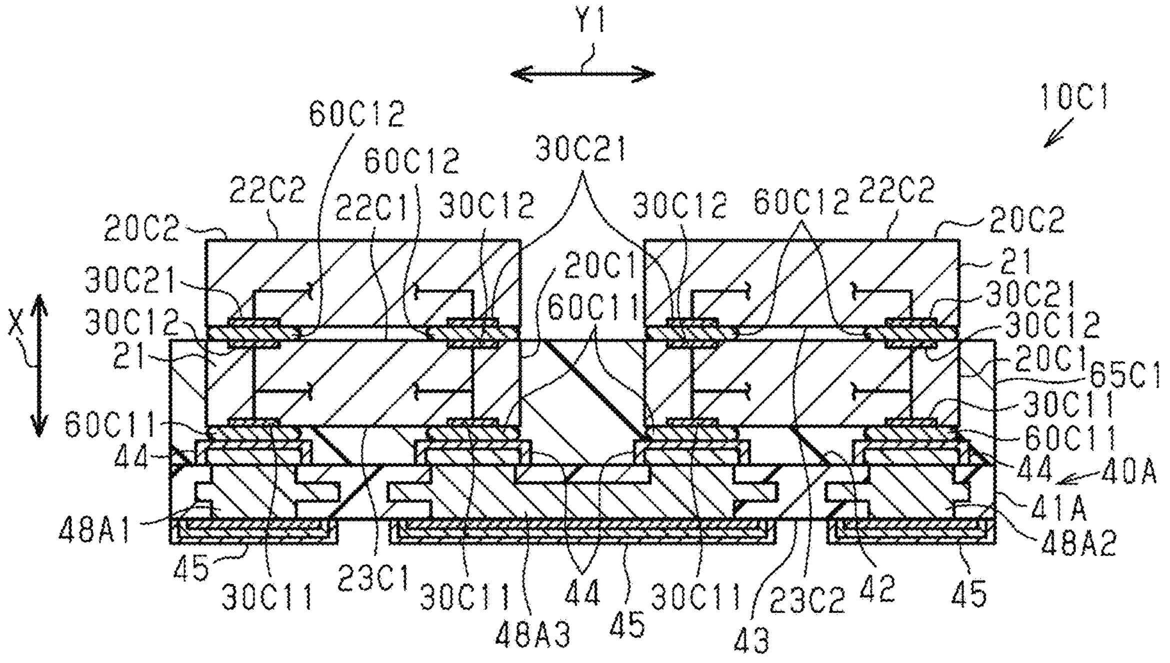
FIG. 34 is a cross-sectional view of a surface-mount passive component according to a seventh embodiment.

As illustrated in FIG. 34, a surface-mount passive component 10C1 according to the present embodiment has a sealing part 65C1 that seals first passive elements 20C1. The sealing part 65C1 contains a sealing resin similar to a sealing resin contained in the sealing part 65 described in the third embodiment. In the present embodiment, the sealing part 65C1 seals only some of the first passive elements 20C1 and second passive elements 20C2. In the example illustrated in FIG. 34, the sealing part 65C1 seals the first passive elements 20C1 but does not seal the second passive elements 20C2.

According to the above configuration, a smaller amount of sealing resin is needed than a case where all passive elements are sealed with a resin. This can suppress an increase in weight of the surface-mount passive component 10C1.

In this case, it is possible to employ a configuration in which passive elements on which large stress acts are sealed with a resin and other passive elements are not sealed with a resin. That is, it is possible to employ a configuration in which one or some of the first passive elements 20C1 on which large stress acts is(are) sealed with a resin and remaining first passive elements 20C1 are not sealed with a resin. Furthermore, it is possible to employ a configuration in which one or some of the second passive elements 20C2 on which large stress acts is(are) sealed with a resin and remaining second passive elements 20C2 are not sealed with a resin.

Eighth Embodiment

Next, an eighth embodiment of a surface-mount passive component is described with reference to FIG. 35. The following mainly describes differences from the seventh embodiment. Members identical or corresponding to those in the above embodiments are given identical reference signs, and repeated description thereof is omitted.

Figure 35:
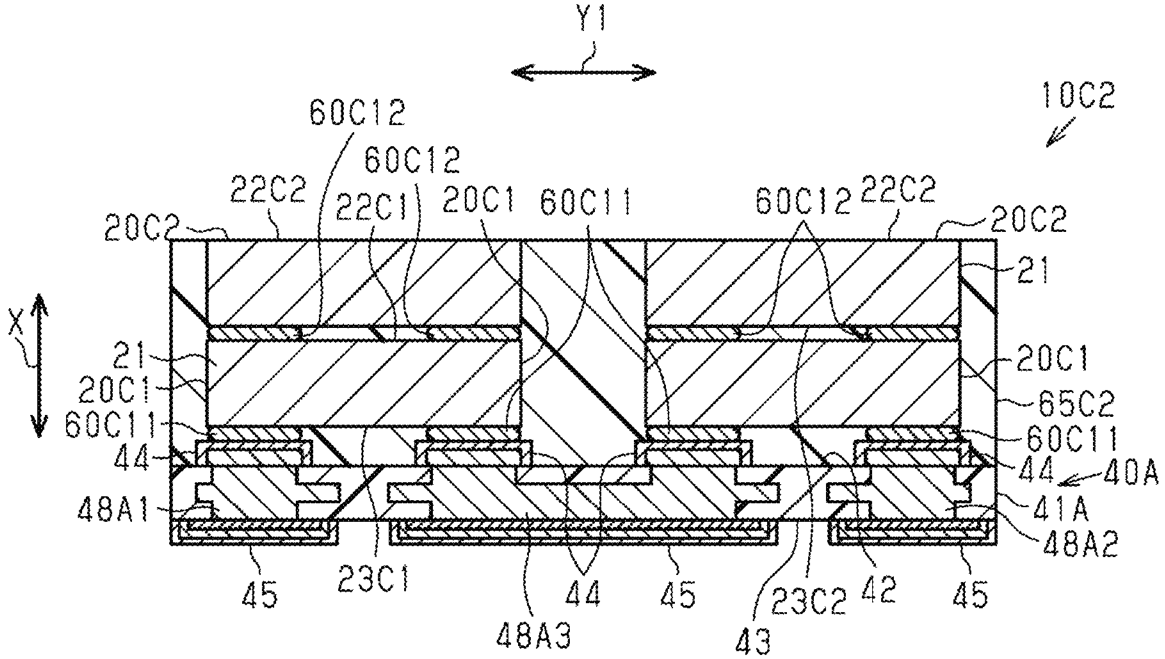
FIG. 35 is a cross-sectional view of a surface-mount passive component according to an eighth embodiment.

As illustrated in FIG. 35, a sealing part 65C2 of a surface-mount passive component 10C2 according to the present embodiment seals all passive elements 20C1 and 20C2. In the example illustrated in FIG. 35, second main surfaces 22C2 of the second passive elements 20C2 are exposed to an outside.

Although the second main surfaces 22C2 of the second passive elements 20C2 are exposed in the example illustrated in FIG. 35, the sealing part 65C2 may be provided so as to also cover the second main surfaces 22C2 of the second passive elements 20C2. Alternatively, the sealing part 65C2 may be provided so as to cover portions of the second main surfaces 22C2 but not to cover remaining portions of the second main surface 22C2.

According to the configuration, the strength of the surface-mount passive component 10C2 can be further increased by sealing all passive elements with a resin.

Ninth Embodiment

Next, a ninth embodiment of a surface-mount passive component is described with reference to FIGS. 36 through 38. The following mainly describes differences from the eighth embodiment. Members identical or corresponding to those in the above embodiments are given identical reference signs, and repeated description thereof is omitted.

Figure 36:
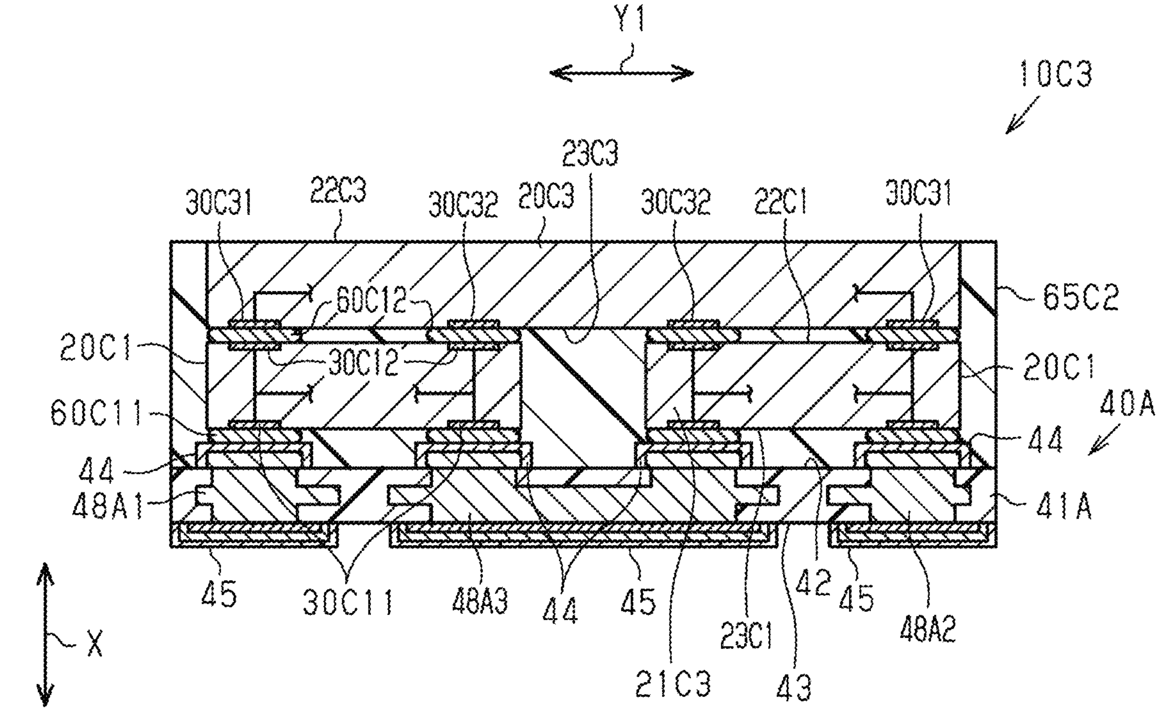
FIG. 36 is a cross-sectional view of a surface-mount passive component according to a ninth embodiment.
Figure 37:
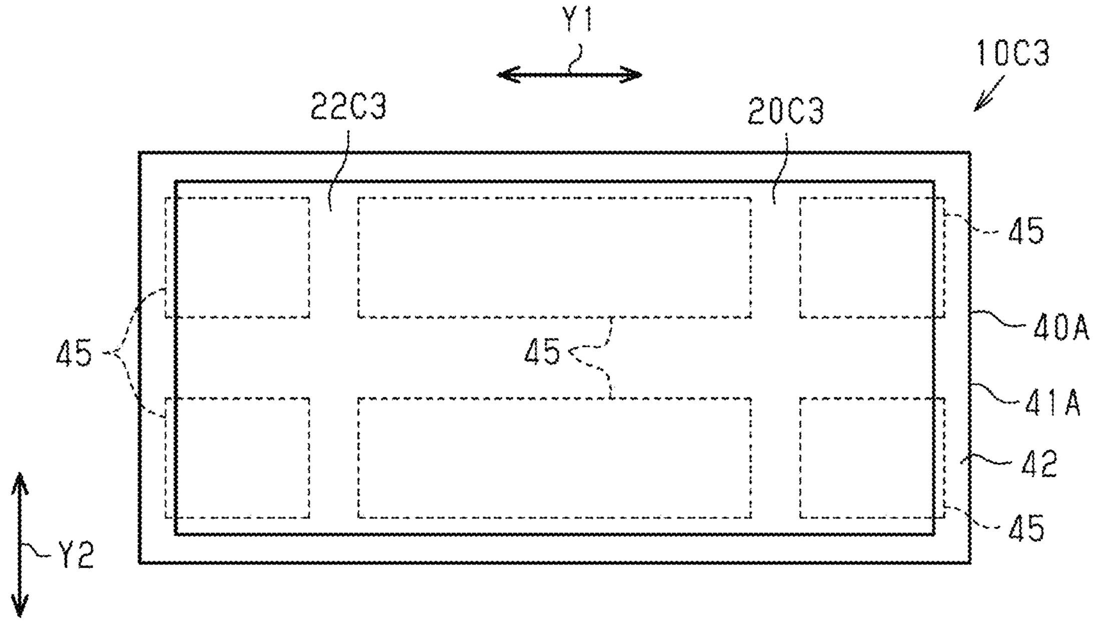
FIG. 37 is a plan view of the surface-mount passive component.

As illustrated in FIGS. 36 and 37, a surface-mount passive component 10C3 according to the present embodiment includes a size conversion unit 40A, first passive elements 20C1 mounted on an element mount surface 42, and a second passive element 20C3 mounted on the first passive elements 20C1. In the present embodiment, a size of the second passive element 20C2 is different from sizes of the first passive elements 20C1. In the example illustrated in FIGS. 36 and 37, the size of the second passive element 20C3 is larger than the sizes of the first passive elements 20C1. Specifically, a dimension of the second passive element 20C3 in the laminating direction X is identical to dimensions of the first passive elements 20C1 in the laminating direction X. Meanwhile, a dimension of the second passive element 20C3 in the first parallel direction Y1 is larger than dimensions of the first passive elements 20C1 in the first parallel direction Y1. Furthermore, a dimension of the second passive element 20C3 in the second parallel direction Y2 is larger than dimensions of the first passive elements 20C1 in the second parallel direction Y2. That is, an area of a first main surface 23C3 of the second passive element 20C3 is larger than areas of the first main surfaces 23C1 of the first passive elements 20C1. Even in this case, the first passive elements 20C1 and the second passive element 20C3 are located inside a peripheral edge of the size conversion unit 40A.

In the example illustrated in FIG. 36, the second passive element 20C3 has a plurality of passive element external terminals 30C31 exposed on the first main surface 23C3 of a body 21C3. Furthermore, a plurality of (two) dummy terminals 30C32 are provided on the first main surface 23C3. That is, a sum of the number of passive element external terminals 30C31 and the number of dummy terminals 30C32 is equal to the number of second passive element external terminals 30C12. Each of the passive element external terminals 30C31 is electrically connected to a corresponding one of the second passive element external terminals 30C12 with a connection part 60C12 such as solder interposed therebetween. Furthermore, each of the dummy terminals 30C32 is electrically connected to a corresponding one of the second passive element external terminals 30C12 with the connection part 60C12 such as solder interposed therebetween.

In the example illustrated in FIG. 36, a sealing part 65C2 is provided, but the second main surface 22C3 of the second passive element 20C3 is exposed. However, this is not restrictive. For example, the sealing part 65C2 may be provided so as to also cover the second main surface 22C3 or the sealing part 65C2 may be provided so as to cover a portion of the second main surface 22C3 but not to cover a remaining portion of the second main surface 22C3.

Figure 38:
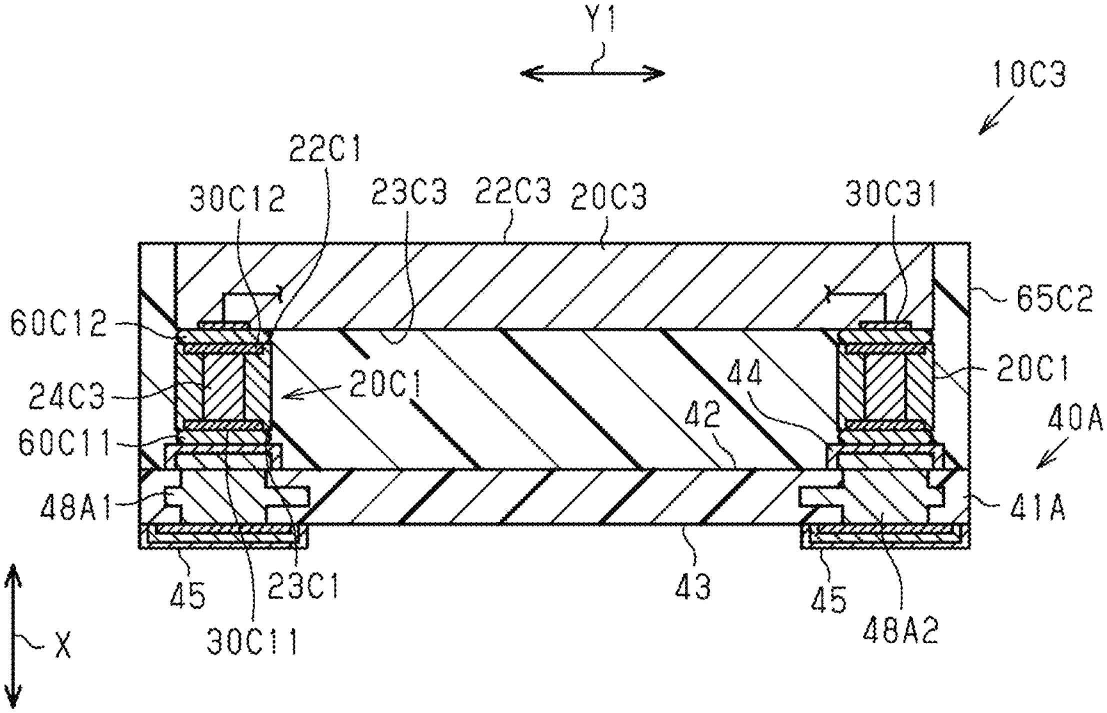
FIG. 38 is a cross-sectional view illustrating a modification of the surface-mount passive component according to the ninth embodiment.

In such a surface-mount passive component 10C3, the configuration illustrated in FIG. 38 may be employed as a configuration of the first passive elements 20C1. Each of the first passive elements 20C1 has a first passive element external terminal 30C11 exposed on a first main surface 23C1, a second passive element external terminal 30C12 exposed on a second main surface 22C1, and a wiring part 24C3 having a first end connected to the first passive element external terminal 30C11 and a second end connected to the second passive element external terminal 30C12. A body 21 of each first passive element 20C1 includes a magnetic layer made of a magnetic material. That is, the wiring part 24C3 is surrounded by the magnetic material. This allows each first passive element 20C1 to function as an inductor.

Tenth Embodiment

Next, a tenth embodiment of a surface-mount passive component is described with reference to FIGS. 39 through 41. The following mainly describes differences from the ninth embodiment. Members identical or corresponding to those in the above embodiments are given identical reference signs, and repeated description thereof is omitted.

Figure 39:
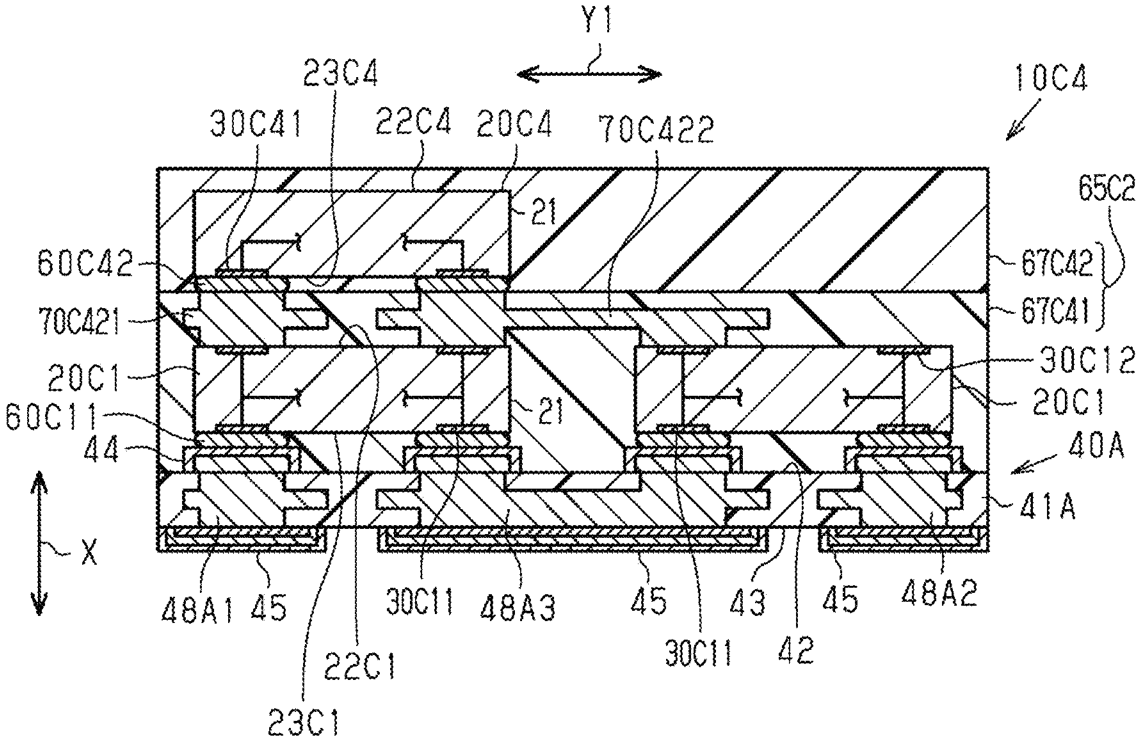
FIG. 39 is a cross-sectional view of a surface-mount passive component according to a tenth embodiment.
Figure 40:
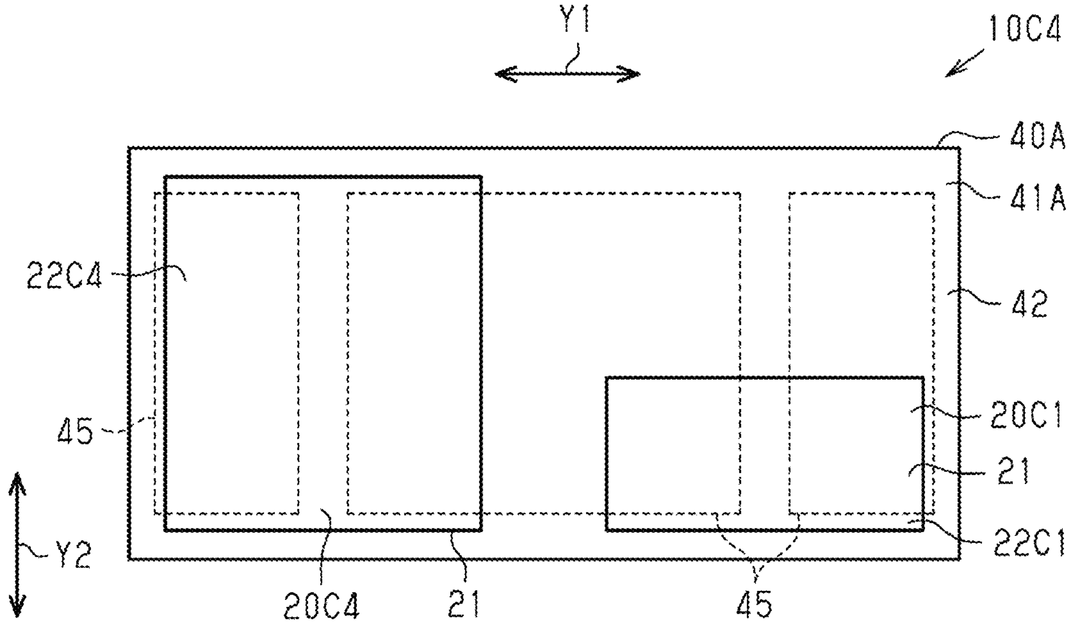
FIG. 40 is a plan view of the surface-mount passive component.

As illustrated in FIGS. 39 and 40, a surface-mount passive component 10C4 according to the present embodiment includes first passive elements 20C1 and a second passive element 20C4. A size of the second passive element 20C4 is larger than sizes of the first passive elements 20C1. Specifically, a dimension of the second passive element 20C4 in the first parallel direction Y1 is identical to dimensions of the first passive elements 20C1 in the first parallel direction Y1, but a dimension of the second passive element 20C4 in the second parallel direction Y2 is larger than dimensions of the first passive elements 20C1 in the second parallel direction Y2. That is, in a case where among main surfaces of a body 21 of the second passive element 20C4, a bottom surface is referred to as a first main surface 23C4 and a top surface is referred to as a second main surface 22C4, an area of the first main surface 23C4 of the second passive element 20C4 is larger than areas of first main surfaces 23C1 of the first passive elements 20C1.

Furthermore, the surface-mount passive component 10C4 includes a sealing part 65C2 that seals both of the first passive elements 20C1 and the second passive element 20C4. The sealing part 65C2 contains a sealing resin. In the present embodiment, the sealing part 65C2 has a first sealing part 67C41 and a second sealing part 67C42 that are laminated in the laminating direction X. The first sealing part 67C41 and the second sealing part 67C42 contain different sealing resins. In the example illustrated in FIG. 39, the first passive elements 20C1 are sealed by the first sealing part 67C41, and the second passive element 20C4 is sealed by the second sealing part 67C42. That is, a boundary between the first sealing part 67C41 and the second sealing part 67C42 is located between the first passive elements 20C1 and the second passive element 20C4 in the laminating direction X.

Furthermore, in the example illustrated in FIG. 39, the second main surface 22C4 of the second passive element 20C4 is also covered with the sealing part 65C2. In FIG. 40, the sealing part 65C2 is omitted for convenience of description.

The second passive element 20C4 has passive element external terminals 30C41, which are external terminals exposed on the first main surface 23C4. The passive element external terminals 30C41 are electrically connected to second passive element external terminals 30C12 of the first passive element 20C1 with a connection part 60C42 such as solder interposed therebetween.

A portion of the sealing part 65C2 located between the first passive element 20C1 and the second passive element 20C4 in the laminating direction X is provided with a plurality of connection wires that electrically connect the passive element external terminals 30C41 of the second passive element 20C4 and the second passive element external terminals 30C12 of the first passive element 20C1. Among the connection wires, a first connection wire 70C421 electrically connects the passive element external terminal 30C41 and the second passive element external terminal 30C12. A second connection wire 70C422 electrically connects the passive element external terminal 30C41 of the second passive element 20C4, the second passive element external terminal 30C12 of a right one of the first passive elements 20C1 in FIG. 39, and the second passive element external terminal 30C12 of a left one of the first passive elements 20C1 in FIG. 39. That is, the second connection wire 70C422 can also be regarded as a wire that electrically connects the second passive element external terminals 30C12 of the adjacent first passive elements 20C1.

According to the configuration, the connection wires 70C421 and 70C422 provided in the sealing part 65C2 can electrically connect external terminals of the passive elements 20C1 and 20C4. This can increase freedom of connection of passive elements, thereby increasing freedom of design of the surface-mount passive component 10C4.

Figure 41:
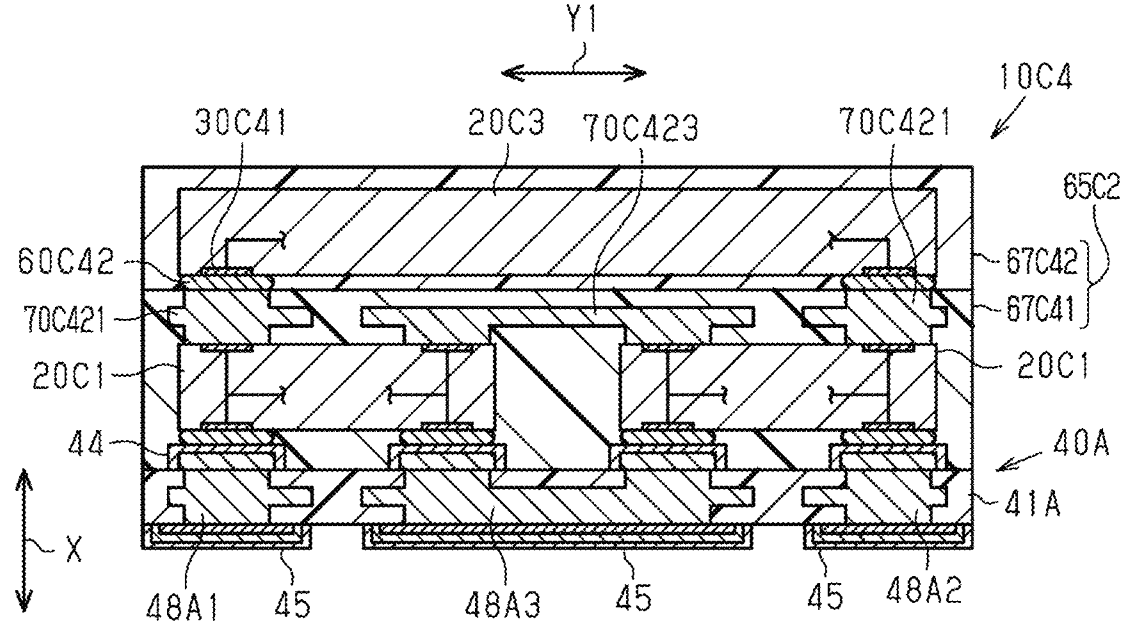
FIG. 41 is a cross-sectional view illustrating a modification of the surface-mount passive component according to the tenth embodiment.

In such a surface-mount passive component 10C4, a connection wire 70C423 illustrated in FIG. 41 may be provided in the sealing part 65C2. In the example illustrated in FIG. 41, a second passive element 20C3 is provided as a second passive element. In this case, the connection wire 70C423 may be provided instead of the second connection wire 70C422. The connection wire 70C423 electrically connects the second passive element external terminals 30C12 of adjacent first passive elements 20C1 but does not electrically connect the second passive element external terminals 30C12 and the passive element external terminal 30C21.

Eleventh Embodiment

Next, an eleventh embodiment of a surface-mount passive component is described with reference to FIG. 42. The following mainly describes differences from the eighth embodiment. Members identical or corresponding to those in the above embodiments are given identical reference signs, and repeated description thereof is omitted.

Figure 42:
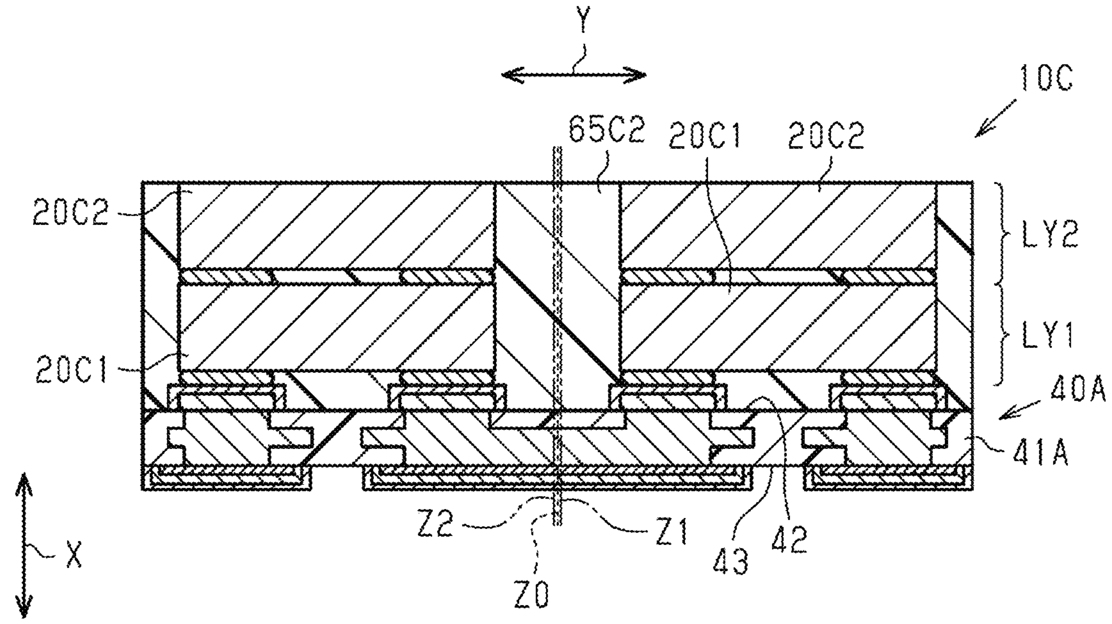
FIG. 42 is a cross-sectional view of a surface-mount passive component according to an eleventh embodiment.

As illustrated in FIG. 42, a surface-mount passive component 10C according to the present embodiment includes a size conversion unit 40A, a plurality of first passive elements 20C1, and a plurality of second passive elements 20C2.

In FIG. 42, a "predetermined axis line Z0", which is a straight line extending in the laminating direction X and passing a center of gravity of the size conversion unit 40A, is indicated by the broken line. Furthermore, a layer in which the first passive elements 20C1 are located in the laminating direction X is referred to as a "first mount layer LY1", and a layer in which the second passive elements 20C2 are located is referred to as a "second mount layer LY2". A straight line extending in the laminating direction X and passing a center of gravity of the first mount layer LY1 is referred to as a "first axis line Z1", and a straight line extending in the laminating direction X and passing a center of gravity of the second mount layer LY2 is referred to as a "second axis line Z2". In FIG. 42, the first axis line Z1 is indicated by the line with alternate long and short dashes, and the second axis line Z2 is indicated by the line with alternate long and two short dashes.

In the present embodiment, the center of gravity of the size conversion unit 40A is a center of a board-side mount surface 43. The center of gravity of the first mount layer LY1 is a position whose distances from centers of the first passive elements 20C1 included in the first mount layer LY1 are equal when the first mount layer LY1 is viewed from the laminating direction X. The center of gravity of the second mount layer LY2 is a position whose distances from centers of the second passive elements 20C2 included in the second mount layer LY2 are equal when the second mount layer LY2 is viewed from the laminating direction X.

In the example illustrated in FIG. 42, the first axis line Z1 and the second axis line Z2 overlap the predetermined axis line Z0. That is, the predetermined axis line Z0 passes both of the center of gravity of the first mount layer LY1 and the center of gravity of the second mount layer LY2.

According to the configuration, the center of gravity of the size conversion unit 40A, the center of gravity of the first mount layer LY1, and the center of gravity of the second mount layer LY2 overlap on a plane orthogonal to the laminating direction X. This makes it easier to pick the surface-mount passive component 10C up. As a result, it becomes easier to handle the surface-mount passive component 10C when the surface-mount passive component 10C is mounted on a circuit board CB.

Twelfth Embodiment

Next, a twelfth embodiment of a surface-mount passive component is described with reference to FIG. 43. The following mainly describes differences from the eleventh embodiment. Members identical or corresponding to those in the above embodiments are given identical reference signs, and repeated description thereof is omitted.

Figure 43:
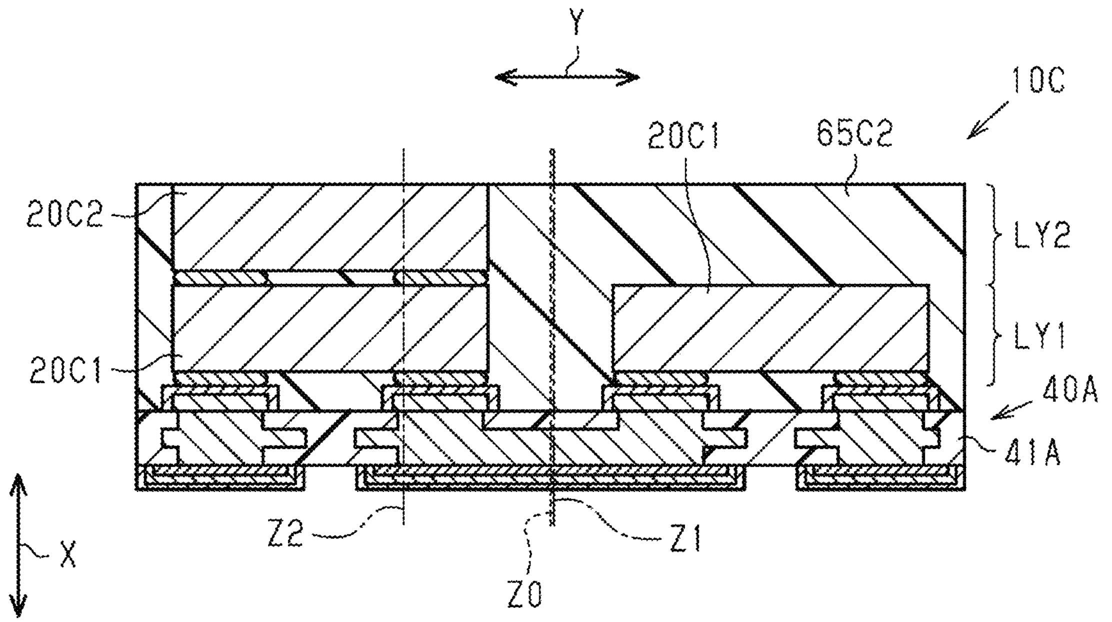
FIG. 43 is a cross-sectional view of a surface-mount passive component according to a twelfth embodiment.

As illustrated in FIG. 43, a surface-mount passive component 10C according to the present embodiment includes a size conversion unit 40A, a plurality of first passive elements 20C1, and a plurality of second passive elements 20C2.

In the example illustrated in FIG. 43, the first axis line Z1 overlaps the predetermined axis line Z0, but the second axis line Z2 does not overlap the predetermined axis line Z0. That is, the predetermined axis line Z0 passes a center of gravity of a first mount layer LY1 but does not pass a center of gravity of a second mount layer LY2.

Unlike the example illustrated in FIG. 43, the surface-mount passive component 10C may be configured such that the second axis line Z2 overlaps the predetermined axis line Z0 but the first axis line Z1 does not overlap the predetermined axis line Z0. In this case, the predetermined axis line Z0 passes the center of gravity of the second mount layer LY2 but does not pass the center of gravity of the first mount layer LY1. That is, the center of gravity of the first mount layer LY1 and the center of gravity of the second mount layer LY2 do not overlap when viewed from the laminating direction X. By thus causing the center of gravity of the second mount layer LY2, which is a topmost layer, and the center of gravity of the size conversion unit 40A, which is a lowermost layer, to match each other, it becomes easier to pick the surface-mount passive component 10C up.

Thirteenth Embodiment

Next, a thirteenth embodiment of a surface-mount passive component is described with reference to FIG. 44. The following mainly describes differences from the ninth embodiment. Members identical or corresponding to those in the above embodiments are given identical reference signs, and repeated description thereof is omitted.

Figure 44:
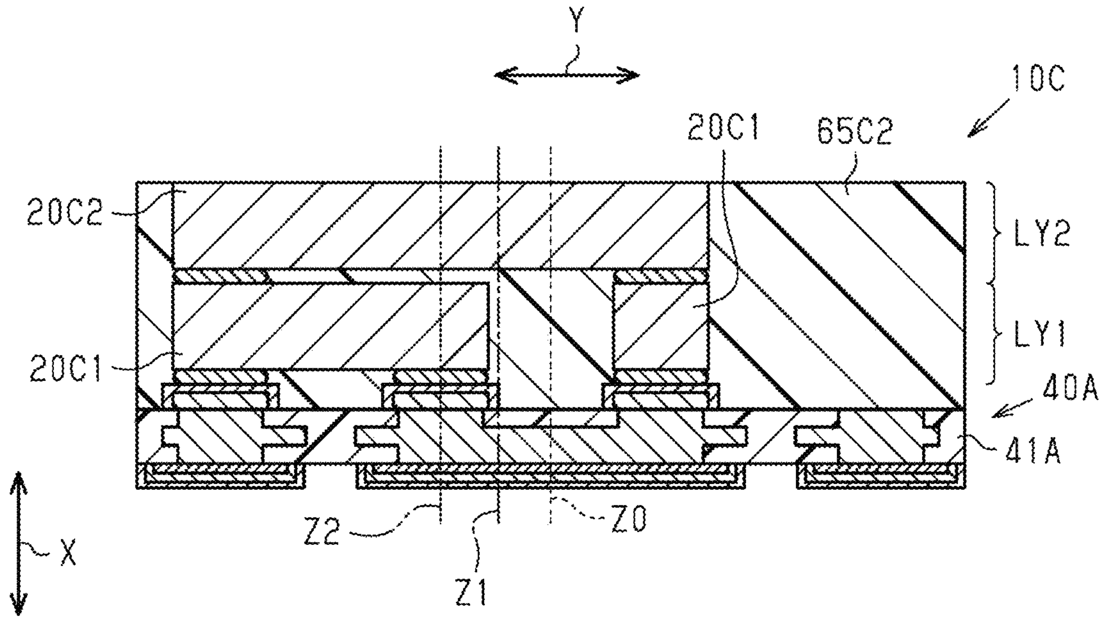
FIG. 44 is a cross-sectional view of a surface-mount passive component according to a thirteenth embodiment.

As illustrated in FIG. 44, a surface-mount passive component 10C according to the present embodiment includes a size conversion unit 40A, a plurality of first passive elements 20C1, and a plurality of second passive elements 20C2.

In the example illustrated in FIG. 44, the first axis line Z1 does not overlap the predetermined axis line Z0 nor the second axis line Z2. Furthermore, the second axis line Z2 does not overlap the predetermined axis line Z0. That is, the predetermined axis line Z0 does not pass a center of gravity of a first mount layer LY1 nor a center of gravity of a second mount layer LY2. Accordingly, the center of gravity of the first mount layer LY1 and the center of gravity of the second mount layer LY2 do not overlap when viewed from the laminating direction X.

By permitting the center of gravity of the size conversion unit 40A, the center of gravity of the first mount layer LY1, and the center of gravity of the second mount layer LY2 to be deviated from one another on a plane orthogonal to the laminating direction X, freedom of positions of passive elements on the size conversion unit 40A can be increased.

Fourteenth Embodiment

Next, a fourteenth embodiment of a surface-mount passive component is described with reference to FIGS. 45 through 63. Members identical or corresponding to those in the above embodiments are given identical reference signs, and repeated description thereof is omitted.

Figure 45:
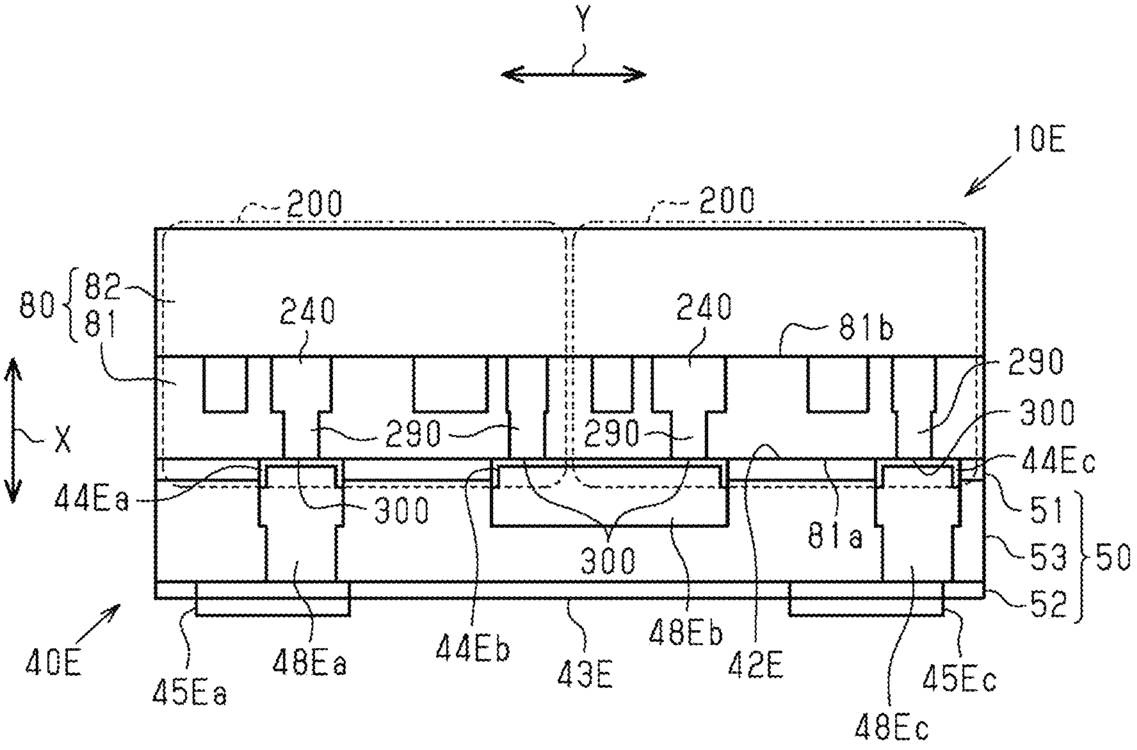
FIG. 45 is a cross-sectional view of a surface-mount passive component according to a fourteenth embodiment.
Figure 46:
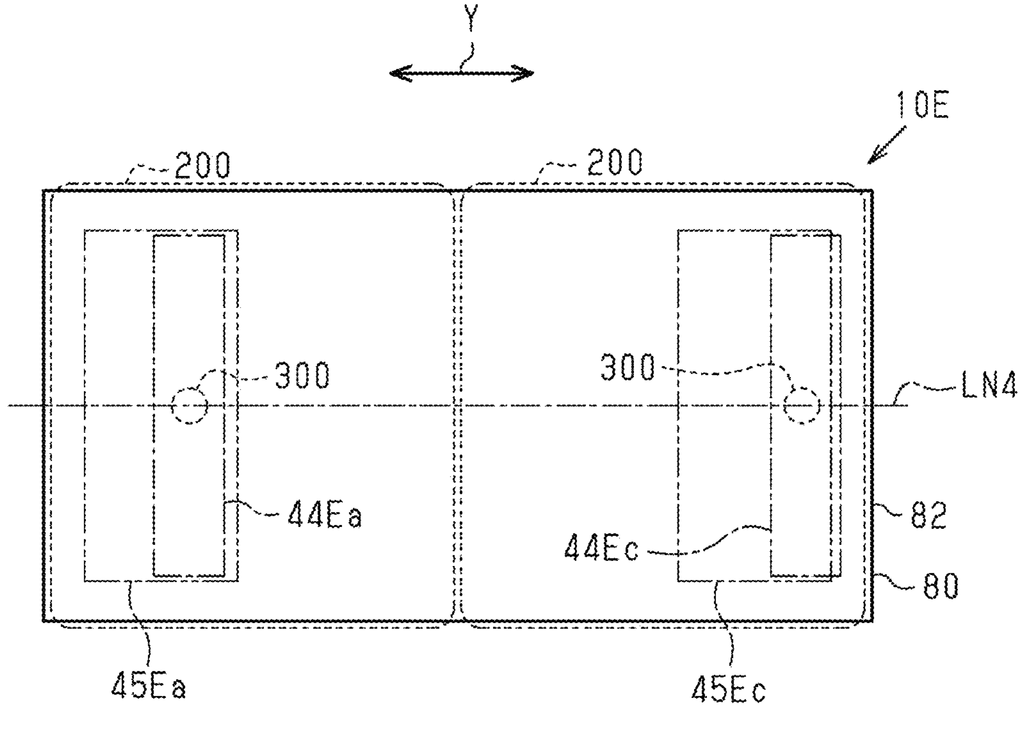
FIG. 46 is a plan view of the surface-mount passive component.

FIGS. 45 and 46 illustrate a surface-mount passive component 10E according to the present embodiment. FIG. 45 illustrates a cross section of the surface-mount passive component 10E taken along a direction orthogonal to the line LN4 with alternate long and short dashes in FIG. 46.

The surface-mount passive component 10E includes a size conversion layer 50 and a passive function layer 80 laminated on the size conversion layer 50. That is, the passive function layer 80 is mounted on a top surface (upper surface in FIG. 45) of the size conversion layer 50. In the present embodiment, an up-down direction in FIG. 45, which is a direction in which the size conversion layer 50 and the passive function layer 80 are laminated, corresponds to the laminating direction X. In a case where a part laminated on the size conversion layer 50 is defined as a "passive element body", the passive function layer 80 corresponds to the passive element body.

Passive Function Layer

The passive function layer 80 has a main function layer 81 and a cover layer 82 located on a side opposite to the size conversion layer 50 with the main function layer 81 interposed therebetween. Among main surfaces of the main function layer 81, a first function main surface 81*a*, which is a lower surface in FIG. 45, is in contact with the size conversion layer 50, and a second function main surface 81*b*, which is an upper surface, is in contact with the cover layer 82. In a case where a main surface of the main function layer 81 that is in contact with the size conversion layer 50 is defined as a boundary main surface, the first function main surface 81*a* corresponds to the boundary main surface. The main function layer 81 may be constituted by a single magnetic layer or may be a multilayer body constituted by a plurality of magnetic layers laminated in the laminating direction X. The magnetic layer is, for example, made of a resin containing metal magnetic powder.

A plurality of passive function parts 200 are provided in the main function layer 81 along a direction orthogonal to the laminating direction X. The left-right direction in FIG. 45, in which the passive function parts 200 are arranged, is referred to as a "parallel direction Y". The passive function part has at least one of passive functions of consuming, accumulating, and discharging supplied electric power. Examples of the passive function part include an inductor, a capacitor, and a resistor. Accordingly, the passive function parts 200 can be regarded as passive elements. In this case, it can be said that the passive function layer 80 includes passive elements. Specifically, it can be said that the passive function layer 80 includes a plurality of passive elements.

In the example illustrated in FIGS. 45 and 46, the passive function parts 200 are inductors. That is, each of the passive function parts 200 has an inductor wire 240 and a draw-out wire 290 connected to the inductor wire 240. A main component of the inductor wire 240 and a main component of the draw-out wire 290 are the same electrically conductive material. The electrically conductive material that is the main components of the inductor wire 240 and the draw-out wire 290 is at least one of silver, copper, aluminum, titanium, nickel, and gold. Alternatively, the electrically conductive material that is the main components of the inductor wire 240 and the draw-out wire 290 may be an alloy containing at least two of silver, copper, aluminum, titanium, nickel, and gold. Note that, for example, a component that is "80% vol %" or more as a result of energy dispersive X-ray analysis (EDX) of a conductor can be regarded as a main component.

The inductor wire 240 and the draw-out wire 290 are provided in the main function layer 81. That is, it can be said that the inductor wire 240 and the draw-out wire 290 are in contact with the magnetic layer. Accordingly, in a case where an electric current is passed through the inductor wire 240, a magnetic field is generated by consuming electric power. Therefore, in a case where a wire that exhibits a passive function when an electric current is passed therethrough is defined as a "function wire", the inductor wire 240 corresponds to the function wire.

Note that the number of turns of each inductor wire 240 is desirably "1.0 turn" or more. Note that the number of turns of each inductor wire may be less than "1.0 turn" as long as the passive function parts 200 can function as inductors. Note that definition of the number of turns has been already described in the first embodiment, and therefore description thereof is omitted.

Each draw-out wire 290 extends from a portion thereof connected to the inductor wire 240 toward the size conversion layer 50. That is, since each draw-out wire 290 extends to the first function main surface 81*a* of the main function layer 81, an end of each draw-out wire 290 that is not connected to the inductor wire 240 functions as an external terminal of the passive function part 200. The external terminal of the passive function part 200 is also referred to as a "function external terminal 300". In a case where each passive function part 200 is regarded as a passive element, the function external terminal 300 corresponds to the passive element external terminal of the passive element. In the example illustrated in FIGS. 45 and 46, each of the passive function parts 200 has two function external terminals 300. That is, four function external terminals 300 are arranged along the parallel direction Y on the first function main surface 81*a*. Note that the parallel direction Y is a direction orthogonal to the laminating direction X and is a left-right direction in FIGS. 45 and 46.

The cover layer 82 may be constituted by a single magnetic layer or may be a multilayer body constituted by a plurality of magnetic layers laminated in the laminating direction X. Note that the magnetic layer is, for example, made of a resin containing metal magnetic powder. The magnetic layer that constitutes the cover layer 82 may contain a material that is not contained in the magnetic layer that constitutes the main function layer 81. By disposing the cover layer 82 on the main function layer 81, each inductor wire 240 is covered with the cover layer 82.

Size Conversion Layer

The size conversion layer 50 is a multilayer body constituted by a plurality of insulating layers laminated in the laminating direction X. In a case where a layer that is in contact with the passive function layer 80 among the insulating layers is referred to as a boundary layer 51, it can be said that the passive function parts 200 corresponding to the passive elements are mounted on a surface of the boundary layer 51. From such a perspective, it can be said that the surface of the boundary layer 51 is an element mount surface 42E on which the passive elements are mounted. A lowermost layer in FIG. 45 among the insulating layers that constitute the size conversion layer 50 is a substrate-side superficial layer 52 that faces a mount surface of a circuit board CB when the surface-mount passive component 10E is mounted on the circuit board CB. A surface of the substrate-side superficial layer 52, that is, a lower surface in FIG. 45 can be regarded as a board-side mount surface 43E. A portion of the size conversion layer 50 that is located between the boundary layer 51 and the substrate-side superficial layer 52 in the laminating direction Xis referred to as a base layer 53.

The size conversion layer 50 is provided with first external terminals exposed on the element mount surface 42E and second external terminals exposed on the board-side mount surface 43E.

The first external terminals are electrically connected to the function external terminals 300. In the example illustrated in FIGS. 45 and 46, three first external terminals 44Ea, 44Eb, and 44Ec are disposed along the parallel direction Y. Among the first external terminals 44Ea, 44Eb, and 44Ec, the first external terminal 44Ea located in a first direction (on a left side in FIGS. 45 and 46) in the parallel direction Y is electrically connected to one of the function external terminals 300. The first external terminal 44Ec located in a second direction (on a right side in FIGS. 45 and 46) in the parallel direction Y is electrically connected to one of the function external terminals 300. The remaining first external terminal 44Eb is electrically connected to middle two of the function external terminals 300.

Although each of the first external terminals 44Ea, 44Eb, and 44Ec is constituted by a single layer in the example illustrated in FIGS. 45 and 46, this is not restrictive. For example, each of the first external terminals 44Ea, 44Eb, and 44Ec may be a multilayer body constituted by a plurality of layers that are laminated on one another.

The second external terminals are electrically connected to electrodes of the circuit board CB. In the example illustrated in FIGS. 45 and 46, two second external terminals 45Ea and 45Ec are provided. The second external terminal 45Ea is disposed at a position corresponding to the first external terminal 44Ea in the parallel direction Y. The second external terminal 45Ec is disposed at a position corresponding to the first external terminal 44Ec in the parallel direction Y. Although each of the second external terminals 45Ea and 45Ec is a multilayer body constituted by a plurality of layers that are laminated on one another in the example illustrated in FIGS. 45 and 46, this is not restrictive. For example, each of the second external terminals 45Ea and 45Ec may be constituted by a single layer.

Areas of the first external terminals 44Ea, 44Eb, and 44Ec on the element mount surface 42E are larger than areas of the function external terminals 300 electrically connected to the first external terminals 44Ea, 44Eb, and 44Ec on the first function main surface 81*a*. That is, an area of the first external terminal 44Ea on the element mount surface 42E is larger than an area of the function external terminal 300 electrically connected to the first external terminal 44Ea on the first function main surface 81*a*. An area of the first external terminal 44Ec on the element mount surface 42E is larger than an area of the function external terminal 300 electrically connected to the first external terminal 44Ec on the first function main surface 81*a*. An area of the first external terminal 44Eb on the element mount surface 42E is larger than a sum of areas of the two function external terminals 300 electrically connected to the first external terminal 44Eb on the first function main surface 81*a*. Areas of the second external terminals 45Ea and 45Ec on the board-side mount surface 43E are larger than areas of the first external terminals 44Ea and 44Ec electrically connected to the second external terminals 45Ea and 45Ec on the element mount surface 42E. Furthermore, a total area of the first external terminals 44Ea and 44Ec on the element mount surface 42E is larger than a total area of the function external terminals 300 on the first function main surface 81*a*.

In the base layer 53, a connection wire 48Ea that electrically connects the first external terminal 44Ea and the second external terminal 45Ea and a connection wire 48Ec that electrically connects the first external terminal 44Ec and the second external terminal 45Ec are provided. The connection wires 48Ea and 48Ec extend in the laminating direction X. Furthermore, an internal conductor 48Eb connected to the first external terminal 44Eb is provided in the base layer 53. The connection wires 48Ea and 48Ec penetrate the base layer 53 in the laminating direction X, but the internal conductor 48Eb does not penetrate the base layer 53.

In a case where each passive function part 200 is regarded as a passive element, it can be said that the size conversion layer 50 is for enlarging a size of the passive function part 200. That is, it can be said that the "size conversion unit 40E" on which passive elements are mounted is constituted by the size conversion layer 50, the first external terminals 44Ea, 44Eb, and 44Ec, the second external terminals 45Ea and 45Ec, the connection wires 48Ea and 48Ec, and the internal conductor 48Eb. In this case, the size conversion layer 50 corresponds to a "body of the size conversion unit 40E".

Effects

Effects of the present embodiment are described below.

(14-1) A component to be mounted on the circuit board CB, that is, the surface-mount passive component 10E can be increased in size without changing sizes of the passive function parts 200 corresponding to passive elements. It is therefore possible to prevent difficulty of mounting passive elements on the circuit board CB from becoming high.

(14-2) The total area of the second external terminals 45Ea and 45Ec is larger than the total area of the function external terminals 300. This makes it possible to bring the second external terminals 45Ea and 45Ec into contact with electrodes of the circuit board CB more easily than a case where the function external terminals 300 are brought into contact with the electrodes of the circuit board CB. Also in this respect, passive elements can be more easily mounted on the circuit board CB.

(14-3) In the size conversion layer 50, the connection wires 48Ea and 48Ec are configured so that the first external terminals 44Ea and 44Ec and the second external terminals 45Ea and 45Ec can be connected by a shortest path. This can suppress an increase in parasitic component caused by the size conversion unit 40E interposed between the passive elements and the circuit board CB.

(14-4) Since the main component of the inductor wire 240 and the main component of the draw-out wire 290 are the same, reliability of connection between the inductor wire 240 and the draw-out wire 290 can be increased.

Manufacturing Method

Next, an example of a method for manufacturing the surface-mount passive component 10E is described with reference to FIGS. 47 through 63. The manufacturing method described below is a method using a semi-additive process to form the inductor wire 240, the draw-out wire 290, the connection wires 48Ea and 48Ec, and the internal conductor 48Eb.

Figure 47:
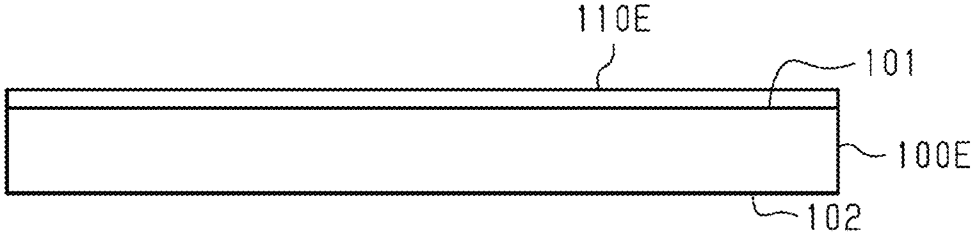
FIG. 47 is a view for explaining a method for manufacturing the surface-mount passive component.
Figure 48:
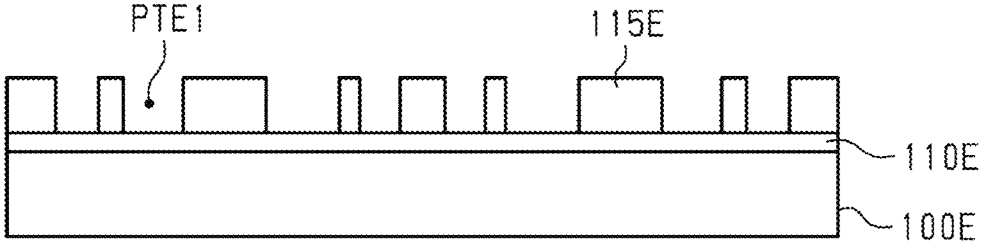
FIG. 48 is a view for explaining a method for manufacturing the surface-mount passive component.

First, the main function layer 81 of the passive function layer 80 is formed. Specifically, an electrically conductive layer made of an electrically conductive material is formed on a substrate 100E, as illustrated in FIG. 47. The substrate 100E has a substantially plate shape. The substrate 100E is made of a material such as ceramics. In FIG. 47, an upper surface of the substrate 100E is referred to as a front surface 101, and a lower surface of the substrate 100E is referred to as a rear surface 102. In the example illustrated in FIG. 47, a copper layer 110E is formed as the electrically conductive layer. For example, a copper foil is attached as the copper layer 110E onto the substrate 100E so as to cover the entire front surface 101. When the formation of the copper layer 110E is completed, a photoresist is applied onto the copper layer 110E. For example, the photoresist is applied by spin coating. Then, exposure using an exposure device is performed. This makes portions of the photoresist that correspond to positions where the inductor wires 240 are to be formed removable by development processing (described later) and cures the other portions. Then, the portions of the photoresist that correspond to the positions where the inductor wires 240 are to be formed are removed by development processing using a developer, as illustrated in FIG. 48. The cured portions of the photoresist remain as a first protection film 115E on the copper layer 110E. By thus patterning the first protection film 115E, a wiring pattern PTE1 is formed.

Figure 49:
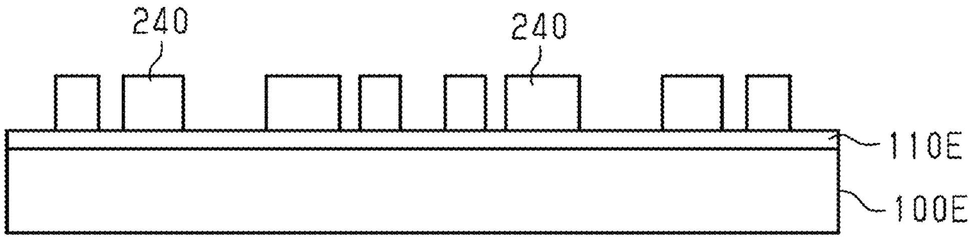
FIG. 49 is a view for explaining a method for manufacturing the surface-mount passive component.

When the formation of the wiring pattern PTE1 is completed, the inductor wires 240 are formed. For example, copper precipitates on portions of the copper layer 110E that are not covered with the first protection film 115E by electrolytic copper plating using a cupric sulfate solution. This forms the inductor wires 240, as illustrated in FIG. 49. In a case where a cupric sulfate solution is used to form the inductor wires 240, each of the inductor wires 240 contains a slight amount of sulfur. When the formation of the inductor wires 240 is completed, the first protection film 115E is removed from the copper layer 110E, for example, by wet etching.

Figure 50:
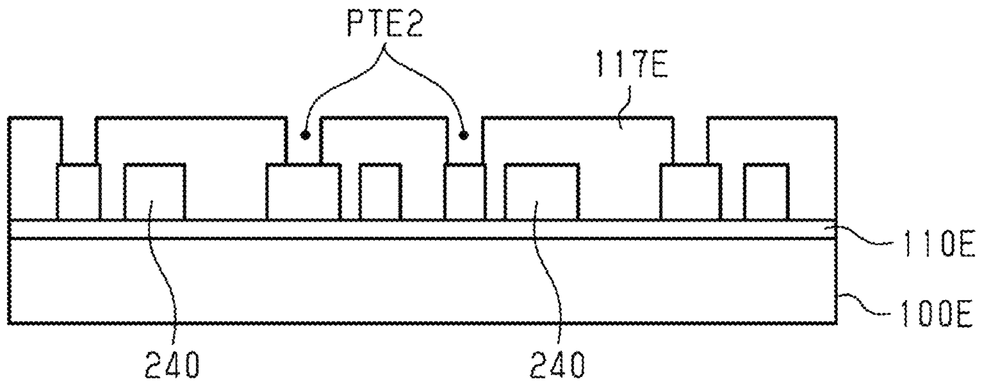
FIG. 50 is a view for explaining a method for manufacturing the surface-mount passive component.

When the removal of the first protection film 115E is completed, a photoresist is applied onto the copper layer 110E. For example, the photoresist is applied by spin coating. Then, exposure using an exposure device is performed. This makes portions of the photoresist that correspond to positions where the draw-out wires 290 are to be formed removable by development processing (described later) and cures the other portions. Then, the portions of the photoresist that correspond to the positions where the draw-out wires 290 are to be formed are removed by development processing using a developer, as illustrated in FIG. 50. The cured portions of the photoresist remain as a second protection film 117E on the copper layer 110E. By thus patterning the second protection film 117E, a wiring pattern PTE2 is formed.

Figure 51:
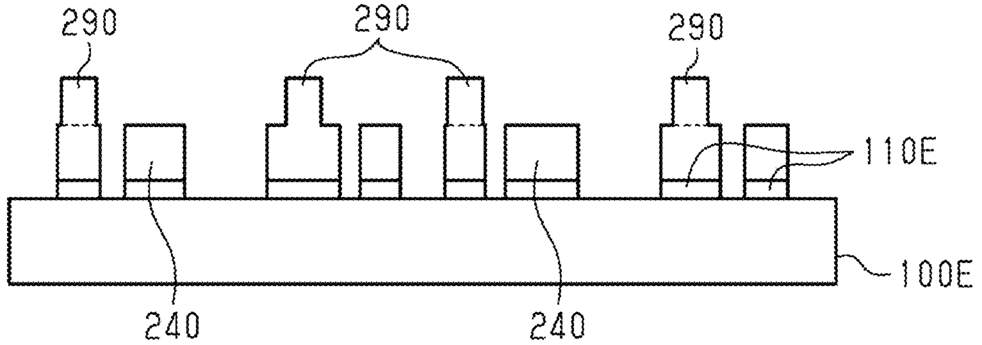
FIG. 51 is a view for explaining a method for manufacturing the surface-mount passive component.

When the formation of the wiring pattern PTE2 is completed, the draw-out wires 290 are formed. For example, copper precipitates on portions of the inductor wires 240 that are not covered with the second protection film 117E by electrolytic copper plating using a cupric sulfate solution. This forms the draw-out wires 290, as illustrated in FIG. 51. In a case where a cupric sulfate solution is used to form the draw-out wires 290, each of the draw-out wires 290 contains a slight amount of sulfur. When the formation of the draw-out wires 290 is completed, the second protection film 117E is removed, for example, by wet etching. In this process, portions of the copper layer 110E that are not in contact with the inductor wires 240 are also removed.

Figure 52:
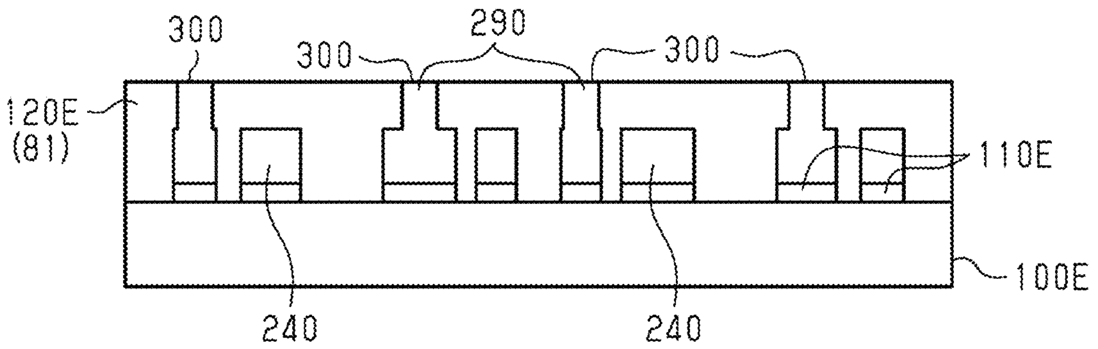
FIG. 52 is a view for explaining a method for manufacturing the surface-mount passive component.

When the removal of the portions of the copper layer 110E and the second protection film 117E is completed, a first magnetic sheet 120E illustrated in FIG. 52 is pressed from an upper side in FIG. 52. As a result, the inductor wires 240 and the draw-out wires 290 are embedded in the first magnetic sheet 120E. The first magnetic sheet 120E may be a single-layer sheet or may be a multilayer body constituted by a plurality of layers that are laminated on one another. In this case, the main function layer 81 is constituted by the first magnetic sheet 120E. The, the processing shifts from a step of forming the main function layer 81 to a step of forming the size conversion layer 50.

Figure 53:
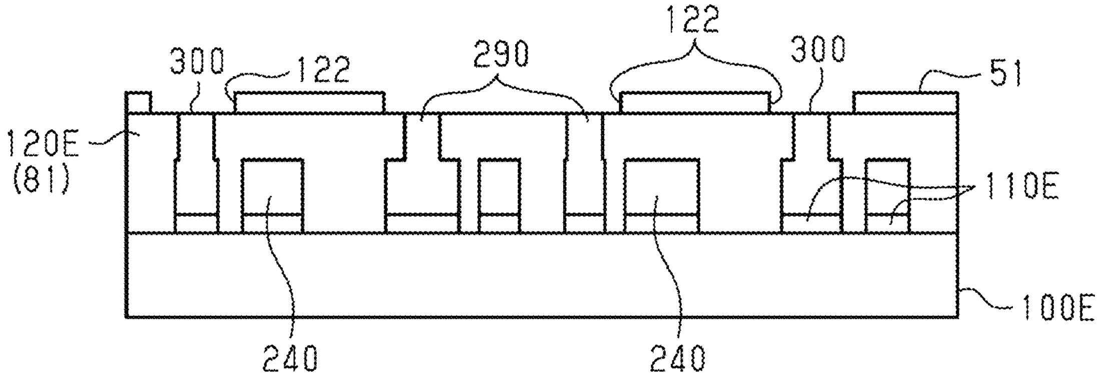
FIG. 53 is a view for explaining a method for manufacturing the surface-mount passive component.
Figure 54:
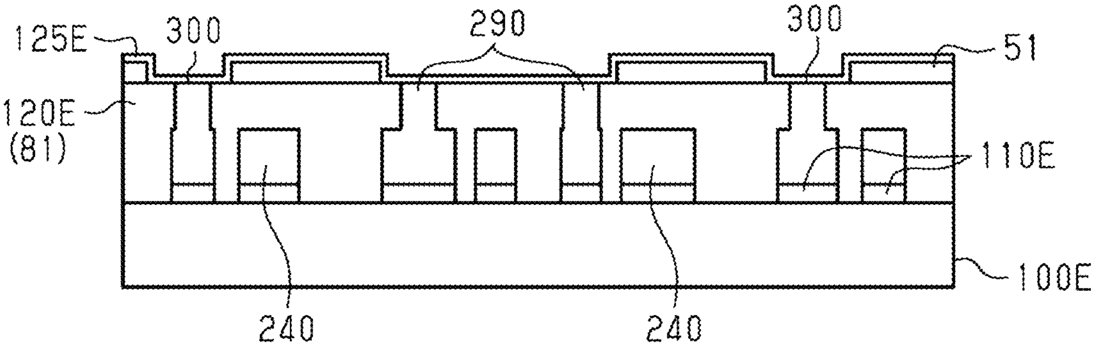
FIG. 54 is a view for explaining a method for manufacturing the surface-mount passive component.

As illustrated in FIG. 53, the boundary layer 51 of the size conversion layer 50 is formed on the main function layer 81. For example, the boundary layer 51 can be formed by patterning an insulating resin on the passive function layer 80 by photolithography. Through-holes 122 are formed in positions of the boundary layer 51 where the first external terminals 44Ea, 44Eb, and 44Ec are to be formed. Next, an electrically conductive layer 125E that covers the boundary layer 51 is formed, as illustrated in FIG. 54. The electrically conductive layer 125E is, for example, a layer containing copper. In this case, the electrically conductive layer 125E can be formed, for example, by electroless plating. By thus providing the electrically conductive layer 125E, portions of a surface of the passive function layer 80 that are not covered with the boundary layer 51 are covered with the electrically conductive layer 125E. Note that portions of the electrically conductive layer 125E that cover the surface of the main function layer 81 constitute the first external terminals 44Ea, 44Eb, and 44Ec.

Figure 55:
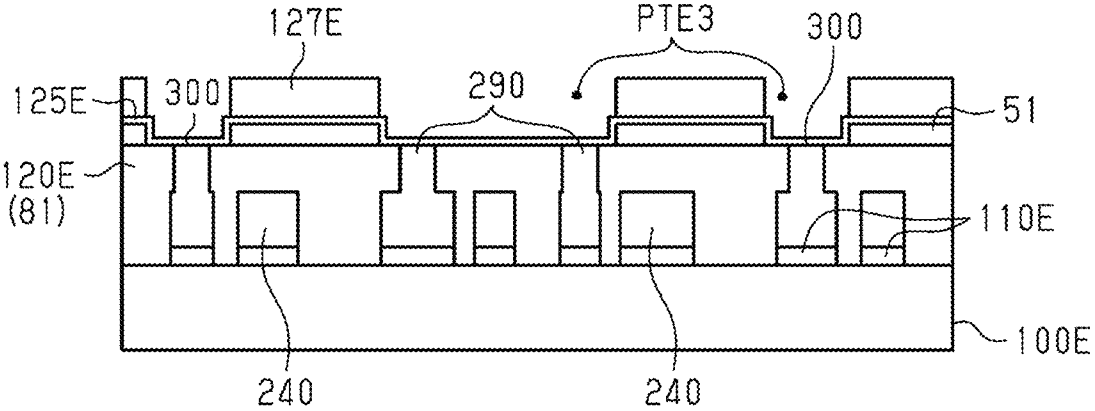
FIG. 55 is a view for explaining a method for manufacturing the surface-mount passive component.

When the formation of the electrically conductive layer 125E is completed, a photoresist is applied onto the electrically conductive layer 125E. For example, the photoresist is applied by spin coating. This covers the electrically conductive layer 125E. Then, exposure using an exposure device is performed. This makes portions of the photoresist that correspond to positions where the connection wires 48Ea and 48Ec and the internal conductor 48Eb are to be formed removable by development processing (described later) and cures the other portions. Next, the portions of the photoresist that correspond to the positions where the connection wires 48Ea and 48Ec and the internal conductor 48Eb are to be formed are removed by development processing using a developer, as illustrated in FIG. 55. The cured portions of the photoresist remain as a third protection film 127E on the electrically conductive layer 125E. By thus patterning the third protection film 127E, a wiring pattern PTE3 is formed.

Figure 56:
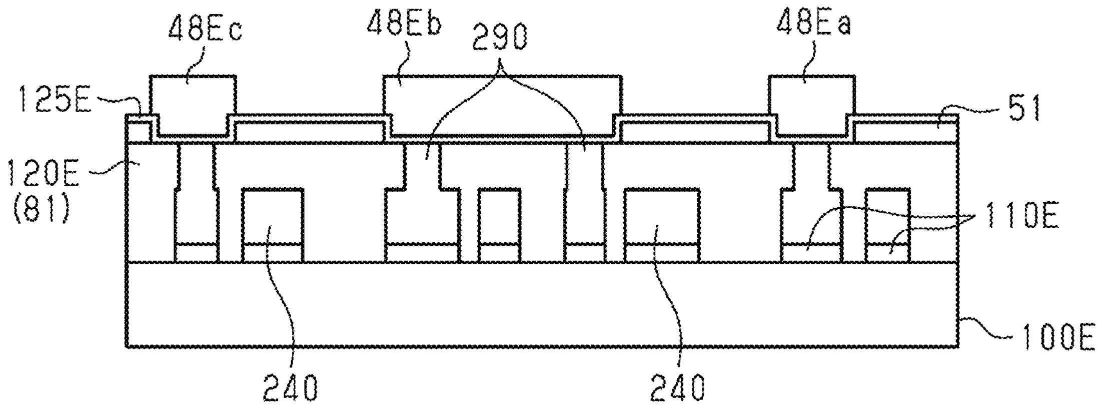
FIG. 56 is a view for explaining a method for manufacturing the surface-mount passive component.

When the formation of the wiring pattern PTE3 is completed, formation of the connection wires 48Ea and 48Ec the internal conductor 48Eb starts. For example, copper precipitates on exposed portions of the electrically conductive layer 125E by electrolytic copper plating using a cupric sulfate solution. This forms portions of the connection wires 48Ea and 48Ec and the internal conductor 48Eb, as illustrated in FIG. 56. In a case where a cupric sulfate solution is used to form the connection wires 48Ea and 48Ec and the internal conductor 48Eb, the connection wires 48Ea and 48Ec and the internal conductor 48Eb contain a slight amount of sulfur. When the portions of the connection wires 48Ea and 48Ec and the internal conductor 48Eb is completed, the third protection film 127E is removed, for example, by wet etching.

Figure 57:
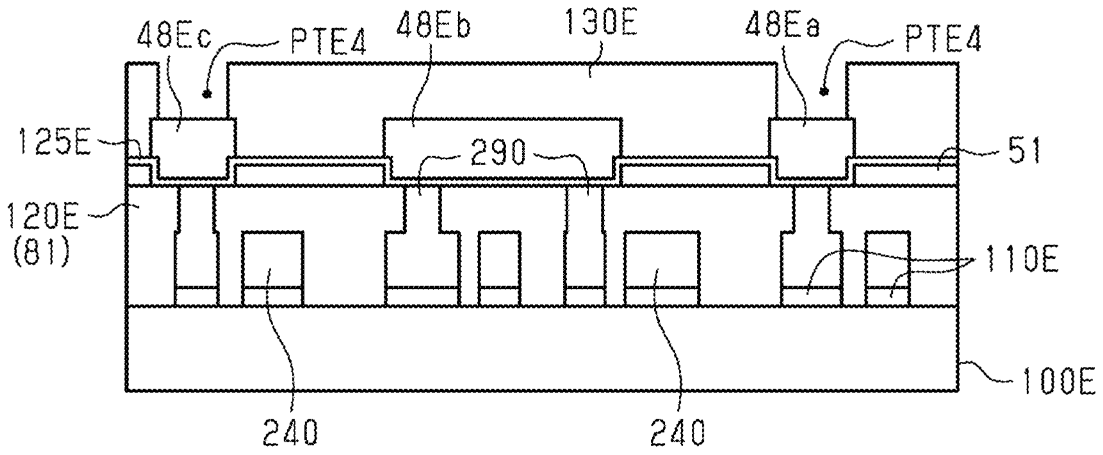
FIG. 57 is a view for explaining a method for manufacturing the surface-mount passive component.

When the removal of the third protection film 127E is completed, preparation for forming remaining portions of the connection wires 48Ea and 48Ec are made. For example, a photoresist is applied onto the electrically conductive layer 125E by spin coating. This covers the electrically conductive layer 125E. Then, exposure using an exposure device is performed. This makes portions of the photoresist that correspond to positions where the connection wires 48Ea and 48Ec are to be formed removable by development processing (described later) and cures the other portions. Next, the portions of the photoresist that correspond to the positions where the connection wires 48Ea and 48Ec are to be formed are removed by development processing using a developer, as illustrated in FIG. 57. The cured portions of the photoresist remain as a fourth protection film 130E on the electrically conductive layer 125E. By thus patterning the fourth protection film 130E, a wiring pattern PTE4 is formed.

Figure 58:
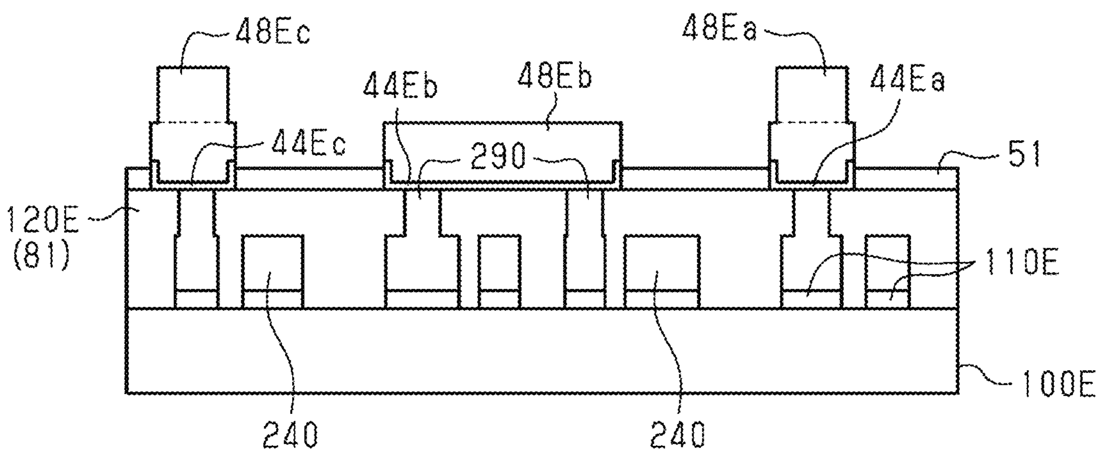
FIG. 58 is a view for explaining a method for manufacturing the surface-mount passive component.

When the formation of the wiring pattern PTE4 is completed, remaining portions of the connection wires 48Ea and 48Ec are formed. For example, copper precipitates on portions that are not covered with the fourth protection film 130E by electrolytic copper plating using a cupric sulfate solution. This forms the connection wires 48Ea and 48Ec, as illustrated in FIG. 58. In a case where a cupric sulfate solution is used to form the connection wires 48Ea and 48Ec, the connection wires 48Ea and 48Ec contain a slight amount of sulfur. When the formation of the connection wires 48Ea and 48Ec is completed, the fourth protection film 130E is removed, for example, by wet etching. In this process, portions of the electrically conductive layer 125E that are not in contact with any of the connection wires 48Ea and 48Ec and the internal conductor 48Eb are removed. This forms the first external terminals 44Ea to 44Ec.

Figure 59:
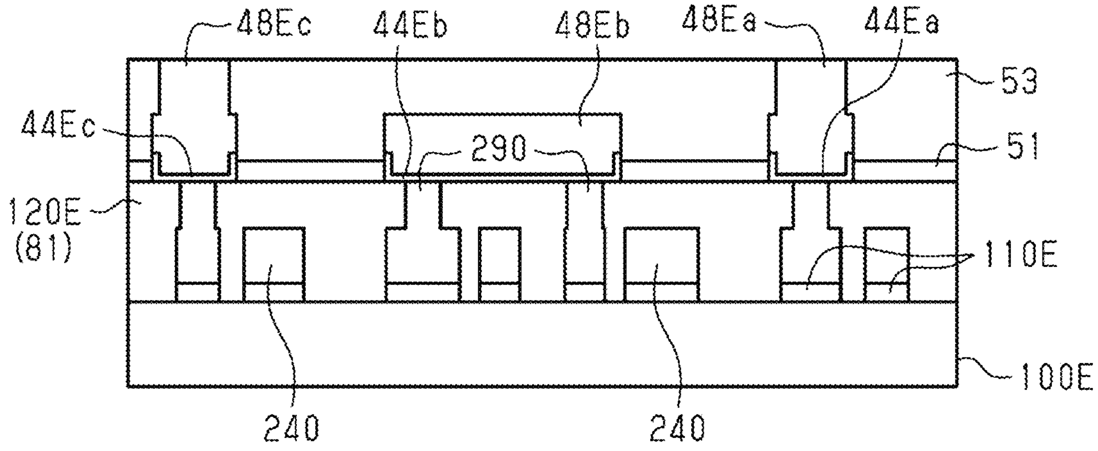
FIG. 59 is a view for explaining a method for manufacturing the surface-mount passive component.

When the removal of the fourth protection film 130E is completed, the base layer 53 of the size conversion layer 50 is formed. For example, the base layer 53 is formed by patterning an insulating resin on the boundary layer 51 by photolithography, as illustrated in FIG. 59. The insulating resin that constitutes the base layer 53 may be, for example, one containing a resin such as an epoxy resin, a polyimide resin, an acrylic resin, a phenolic resin, or a liquid crystal polymer resin and an insulating filler such as silica.

Figure 60:
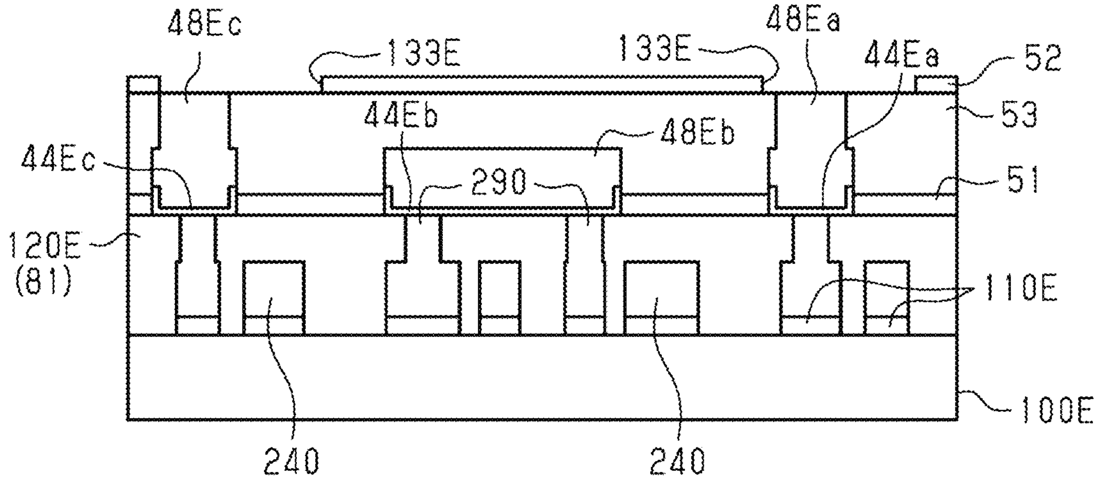
FIG. 60 is a view for explaining a method for manufacturing the surface-mount passive component.
Figure 61:
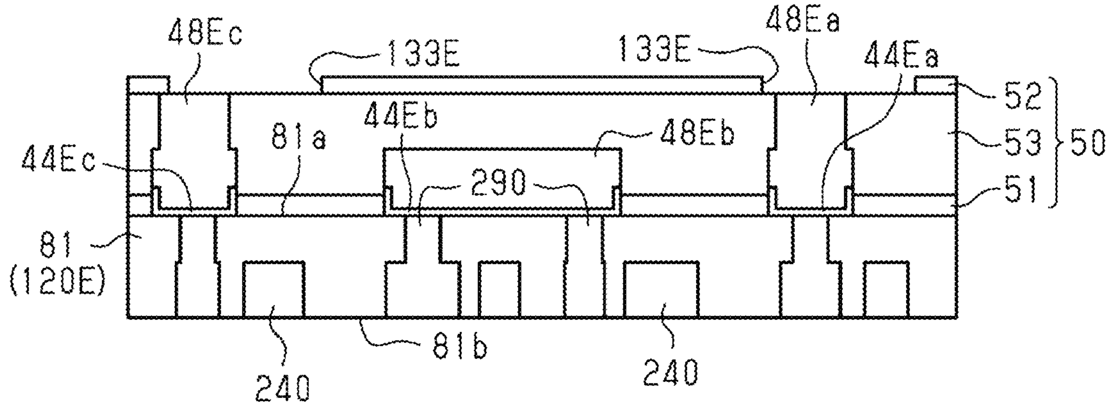
FIG. 61 is a view for explaining a method for manufacturing the surface-mount passive component.

When the formation of the base layer 53 is completed, the substrate-side superficial layer 52 of the size conversion layer 50 is formed. For example, the substrate-side superficial layer 52 can be formed by patterning an insulating resin on the base layer 53 by photolithography, as illustrated in FIG. 60. Note that through-holes 133E are formed in positions of the substrate-side superficial layer 52 where the second external terminals 45Ea and 45Ec are to be formed. When the formation of the substrate-side superficial layer 52 is completed, the substrate 100E and the copper layer 110E are removed by grinding, as illustrated in FIG. 61. Then, the processing shifts from the step of forming the size conversion layer 50 to a step of forming the cover layer 82 of the passive function layer 80.

Figure 62:
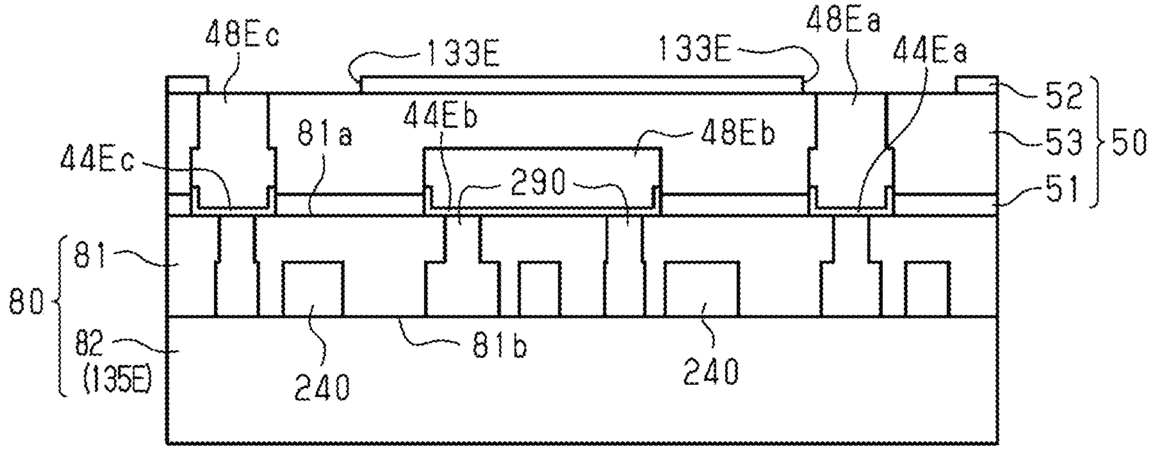
FIG. 62 is a view for explaining a method for manufacturing the surface-mount passive component.
Figure 63:
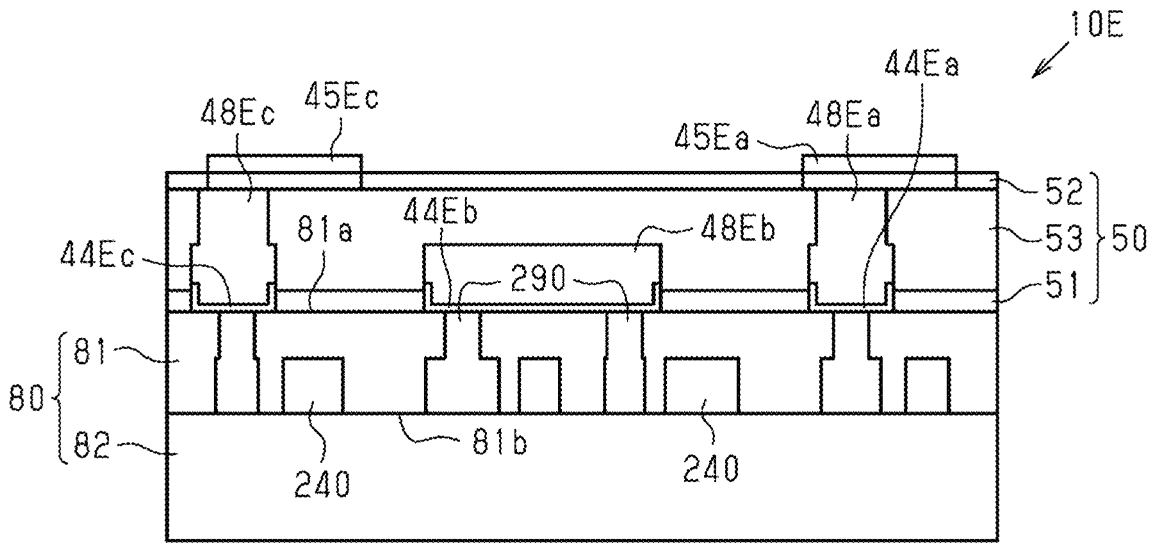
FIG. 63 is a view for explaining a method for manufacturing the surface-mount passive component.

A second magnetic sheet 135E illustrated in FIG. 62 is pressed from a lower side in FIG. 62. In this case, the cover layer 82 is constituted by the second magnetic sheet 135E. Then, the processing shifts from the step of forming the cover layer 82 to a step of forming the second external terminals 45Ea and 45Ec. The second external terminals 45Ea and 45Ec are formed, as illustrated in FIG. 63. In the example illustrated in FIG. 63, multilayer bodies each including a plurality of layers are formed as the second external terminals 45Ea and 45Ec. This completes the surface-mount passive component 10E, and therefore the series of processes that constitute the method for manufacturing the surface-mount passive component 10E is finished.

The above manufacturing method is an example of a method for manufacturing the surface-mount passive component 10E one by one. However, the method for manufacturing the surface-mount passive component 10E is not limited to this. For example, a plurality of surface-mount passive components 10E may be manufactured concurrently by forming portions that will become a plurality of surface-mount passive components 10E in rows and columns and then creating individual pieces, for example, by dicing.

Fifteenth Embodiment

Next, a fifteenth embodiment of a surface-mount passive component is described with reference to FIGS. 64 through 72. Members identical or corresponding to those in the above embodiments are given identical reference signs, and repeated description thereof is omitted.

Figure 64:
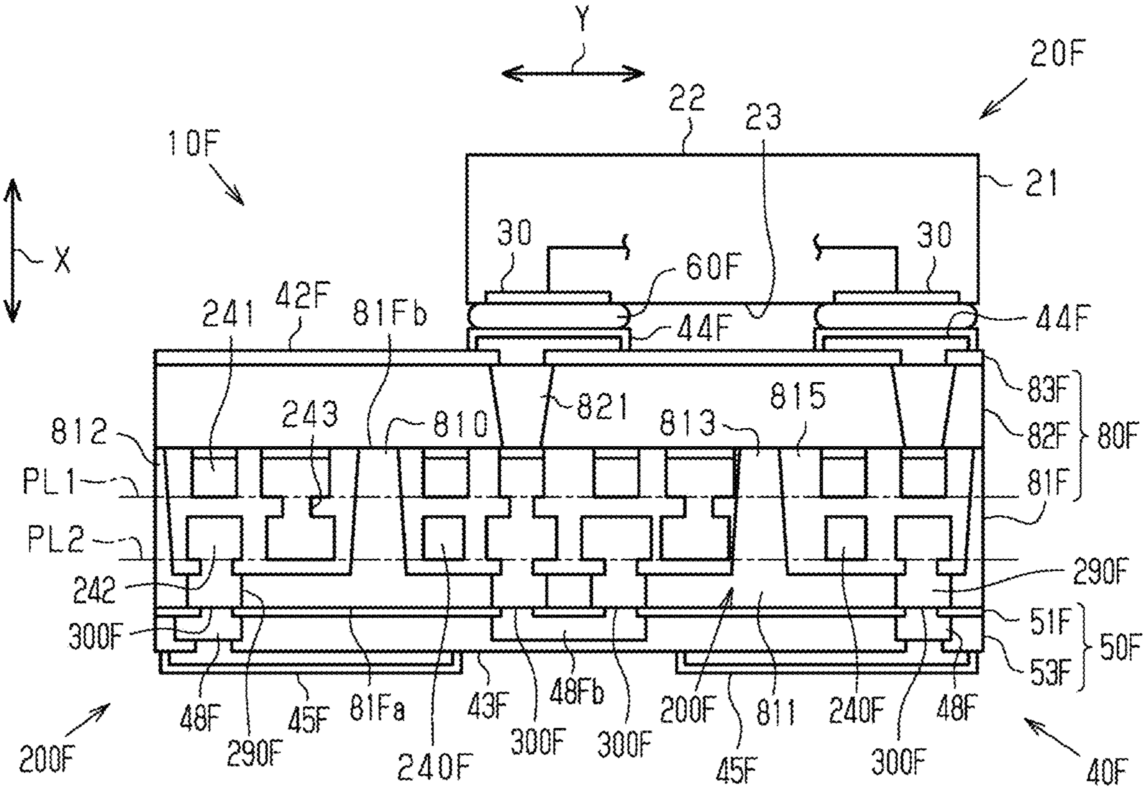
FIG. 64 is a cross-sectional view of a surface-mount passive component according to a fifteenth embodiment.
Figure 65:
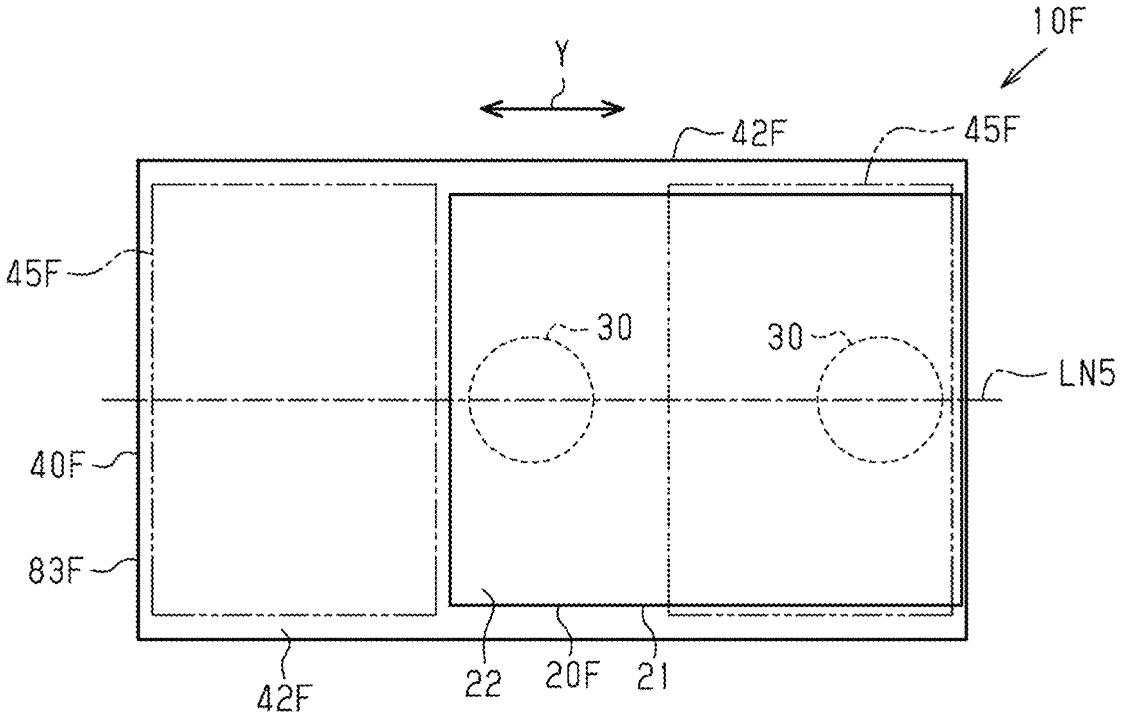
FIG. 65 is a plan view of the surface-mount passive component.

FIGS. 64 and 65 illustrate a surface-mount passive component 10F according to the present embodiment. FIG. 64 illustrates a cross section of the surface-mount passive component 10F taken along the line LN5 with alternate long and short dashes in FIG. 65. In FIG. 64, illustration of hatching is omitted for convenience of description.

The surface-mount passive component 10F includes a size conversion unit 40F and a passive element 20F mounted on the size conversion unit 40F. In the present embodiment, an up-down direction in FIG. 64, in which the size conversion unit 40F and the passive element 20F are aligned, corresponds to the laminating direction X. Among main surfaces of a body 21 of the passive element 20F, an upper main surface in FIG. 64, that is, a top surface is referred to as a "second main surface 22", and a lower main surface in FIG. 64, that is, a bottom surface is referred to as a "first main surface 23". Passive element external terminals 30 are provided on the first main surface 23.

The size conversion unit 40F includes a size conversion layer 50F and a passive function layer 80F laminated on the size conversion layer 50F. The passive element 20F is mounted on the passive function layer 80F.

Passive Function Layer

The passive function layer 80F has a main function layer 81F, a cover layer 82F located on a side opposite to the size conversion layer 50F with the main function layer 81F interposed therebetween, and an uppermost layer 83F laminated on the cover layer 82F. Among main surfaces of the main function layer 81F, a lower surface in FIG. 64 is in contact with the size conversion layer 50F, and an upper surface in FIG. 64 is in contact with the cover layer 82F.

In the main function layer 81F, a plurality of passive function parts 200F are provided along a direction orthogonal to the laminating direction X. The passive function parts 200F exhibit at least one of passive functions of consuming, accumulating, and discharging supplied electric power. Examples of the passive function parts include an inductor, a capacitor, and a resistor. A left-right direction in FIG. 64, in which the passive function parts 200F are arranged, is referred to as a "parallel direction Y".

In the example illustrated in FIGS. 64 and 65, the passive function parts 200F are inductors. That is, each of the passive function parts 200F includes an inductor wire 240F and a draw-out wire 290F connected to the inductor wire 240F. A main component of the inductor wire 240F and a main component of the draw-out wire 290F are the same electrically conductive material. The electrically conductive material that is the main components of the inductor wire 240F and the draw-out wire 290F is at least one of silver, copper, aluminum, titanium, nickel, and gold. Alternatively, for example, the electrically conductive material that is the main components of the inductor wire 240F and the draw-out wire 290F may be an alloy containing at least two of silver, copper, aluminum, titanium, nickel, and gold.

The inductor wire 240F has, for example, the following shape. Specifically, as illustrated in FIG. 64, the inductor wire 240F has a first wiring part 241 provided along the first virtual plane PL1, a second wiring part 242 provided along the second virtual plane PL2, and a connecting wiring portion 243 that electrically connects the first wiring part 241 and the second wiring part 242. The first virtual plane PL1 and the second virtual plane PL2 are planes orthogonal to the laminating direction X. Note that the virtual planes PL1 and PL2 may be planes that are not orthogonal to the laminating direction X, as long as the virtual planes PL1 and PL2 cross the laminating direction X.

The second virtual plane PL2 is disposed between the first virtual plane PL1 and the size conversion layer 50F in the laminating direction X and is parallel with the first virtual plane PL1. That is, the first wiring part 241 and the second wiring part 242 are apart from each other in the laminating direction X. The number of turns of the first wiring part 241 and the second wiring part 242 is "1.0 turn" or more. That is, the first wiring part 241 and the second wiring part 242 each have a part extending in a direction that crosses the laminating direction X. Note that the number of turns of the first wiring part 241 and the second wiring part 242 may be less than "1.0 turn" as long as the passive function parts 200F can function as inductors.

Each draw-out wire 290F extends from a portion connected to the second wiring part 242 of the inductor wire 240F toward the size conversion layer 50F. Among main surfaces of the main function layer 81F, a main surface that is in contact with the size conversion layer 50F is referred to as a first function main surface 81Fa, and a main surface that is in contact with the cover layer 82F is referred to as a second function main surface 81Fb. In this case, each draw-out wire 290F extends to the first function main surface 81Fa. That is, an end of each draw-out wire 290F that is not connected to the inductor wire 240F functions as an external terminal of the passive function part 200F. The external terminal of the passive function part 200F is also referred to as a "function external terminal 300F". In the example illustrated in FIGS. 64 and 65, each of the passive function parts 200F has two function external terminals 300F. That is, four function external terminals 300F are disposed along the parallel direction Y on the first function main surface 81Fa.

A magnetic material is present around the inductor wire 240F. This will be described in detail later. Accordingly, by passing an electric current through the inductor wire 240F, a magnetic field is generated by consuming electric power. Therefore, in a case where a wire that exhibits a passive function when an electric current is passed therethrough is defined as a "function wire", the inductor wire 240F corresponds to the function wire.

As illustrated in FIG. 65, a magnetic part 810 made of a magnetic material is provided in the main function layer 81F. The magnetic part 810 has a bottom magnetic part 811 that is located closer to the size conversion layer 50F than each inductor wire 240F in the laminating direction X. The bottom magnetic part 811 is in contact with the size conversion layer 50F. Each draw-out wires 290F penetrate the bottom magnetic part 811 in the laminating direction X. The magnetic part 810 has an annular magnetic part 812 that is connected to the bottom magnetic part 811 and surrounds the passive function parts 200F from an outer side. A front end surface (upper end surface in FIG. 64) of the annular magnetic part 812 is in contact with the cover layer 82F. The magnetic part 810 has an inner magnetic part 813 that is connected to the bottom magnetic part 811 and is disposed on an inner side of the inductor wire 240F. In the example illustrated in FIG. 65, two inductor wires 240F are provided. Accordingly, two inner magnetic parts 813 are provided along the parallel direction Y. A front end surface (upper end surface in FIG. 64) of each inner magnetic part 813 is in contact with the cover layer 82F. That is, the inductor wire 240F is disposed in a recess formed by the bottom magnetic part 811, the annular magnetic part 812, and the inner magnetic part 813.

Each inductor wire 240F is provided in the main function layer 81F while being covered with an insulating covering part 815. Accordingly, each inductor wire 240F is not in contact with the magnetic part 810, and the insulating covering part 815 that covers the inductor wire 240F is in contact with the magnetic part 810. The insulating covering part 815 contains an insulating material such as a polyimide resin, an acrylic resin, an epoxy resin, a phenolic resin, or a liquid crystal polymer.

The cover layer 82F may be constituted by a single magnetic layer or may be a multilayer body constituted by a plurality of magnetic layers laminated in the laminating direction X. The magnetic layer is, for example, made of a resin containing metal magnetic powder. The magnetic layer that constitutes the cover layer 82F may contain a material that is not contained in the magnetic part 810 of the main function layer 81F.

The uppermost layer 83F may be constituted by a single insulating layer or may be a multilayer body constituted by a plurality of insulating layers laminated in the laminating direction X. Among main surfaces of the uppermost layer 83F, an upper surface in FIG. 64, which is a main surface that is not in contact with the cover layer 82F, is an element mount surface 42F of the size conversion unit 40F. The element mount surface 42F is provided with as many first external terminals 44F as the passive element external terminals 30. The first external terminals 44F are electrically connected to the respective passive element external terminals 30 with a connection part 60F such as solder interposed therebetween.

Note that cover layer connection wires 821 that electrically connect the first external terminals 44F and the inductor wires 240F are provided in the cover layer 82F. As many cover layer connection wires 821 as the first external terminals 44F are provided in the cover layer 82F. The cover layer connection wires 821 extend in the laminating direction X. That is, the cover layer connection wires 821 penetrate the cover layer 82F in the laminating direction X. In a case where wires that electrically connect the passive element external terminals 30 of the passive element 20F and the inductor wires 240F in the passive function layer 80F are defined as "element body connection wires", the cover layer connection wires 821 correspond to the element body connection wires.

Size Conversion Layer

The size conversion layer 50F is a multilayer body constituted by a plurality of insulating layers laminated in the laminating direction X. In a case where a layer that is in contact with the passive function layer 80F among the insulating layers is a boundary layer 51F, the passive function parts 200F are disposed on a surface of the boundary layer 51F. Among the insulating layers that constitute the size conversion layer 50F, a layer located on a side opposite to the passive function layer 80F with the boundary layer 51F interposed therebetween is referred to as a base layer 53F. Among main surfaces of the base layer 53F, a lower surface in FIG. 64 is a board-side mount surface 43F. The board-side mount surface 43F is a surface that faces a circuit board CB when the surface-mount passive component 10F is mounted on the circuit board CB.

The size conversion layer 50F is provided with second external terminals 45F exposed on the board-side mount surface 43F. The second external terminals 45F are electrically connected to electrodes of the circuit board CB. In the example illustrated in FIGS. 64 and 65, two second external terminals 45F are provided. Although a multilayer body constituted by a plurality of layers laminated on one another is used as each of the second external terminals 45F in FIG. 64, each of the second external terminals 45F may be, for example, constituted by a single layer.

Connection wires 48F that electrically connect the function external terminals 300F of the passive function parts 200F and the second external terminals 45F are provided in the size conversion layer 50F. In the example illustrated in FIG. 64, two passive function parts 200F are provided in the passive function layer 80F. Accordingly, two connection wires 48F are provided in the size conversion layer 50F. Furthermore, an internal conductor 48Fb that electrically connects the inductor wires 240F of the passive function parts 200F is provided in the size conversion layer 50F.

In FIG. 65, contours of the second external terminals 45F viewed from the laminating direction X are indicated by the lines with alternate long and two short dashes, and contours of the passive element external terminals 30 viewed from the laminating direction X are indicated by the broken lines. As is clear from FIG. 65, an area of each second external terminal 45F on the board-side mount surface 43F is larger than an area of each passive element external terminal 30 on the first main surface 23. Furthermore, a total area of the second external terminals 45F on the board-side mount surface 43F is larger than a total area of the passive element external terminals 30 on the first main surface 23. In a case where an area of the passive element 20F viewed from the laminating direction Xis a "size of the passive element 20F" and an area of the size conversion unit 40F viewed from the laminating direction X is a "size of the size conversion unit 40F", the size of the size conversion unit 40F is larger than the size of the passive element 20F. The passive element 20F is disposed inside a peripheral edge of the size conversion unit 40F. That is, an area of the first main surface 23 of the passive element 20F is smaller than an area of the element mount surface 42F of the size conversion unit 40F.

Effects

Effects of the present embodiment are described below.

(15-1) A component to be mounted on the circuit board CB, that is, the surface-mount passive component 10F can be increased in size without changing the size of the passive element 20F. It is therefore possible to prevent difficulty of mounting the passive element 20F on the circuit board CB from becoming high.

(15-2) The total area of the second external terminals 45F is larger than the total area of the passive element external terminals 30. This makes it possible to bring the second external terminals 45F into contact with electrodes of the circuit board CB more easily than a case where the passive element external terminals 30 are brought into contact with the electrodes of the circuit board CB. Also in this respect, the passive elements 20F can be more easily mounted on the circuit board CB.

(15-3) Since the main component of the inductor wire 240F and the main component of the draw-out wire 290F in each of the passive function parts 200F are the same, reliability of connection between the inductor wire 240F and the draw-out wire 290F can be increased.

(15-4) In a case where the size conversion layer 50F is a multilayer body constituted by a plurality of insulating layers that are laminated on one another, coefficients of linear expansion of the insulating layers can be adjusted by adjusting kinds of materials contained in the insulating layers. As a result, it is possible to suppress warpage of the size conversion layer 50F.

(15-5) The size conversion unit 40F has the passive function parts 200F. Accordingly, a thin passive element 20F can be employed as a passive element mounted on the size conversion unit 40F.

(15-6) The function external terminals 300F of the passive function parts 200F are in direct contact with the connection wires 48F in the size conversion layer 50F. Since no solder is interposed between the function external terminals 300F and the connection wires 48F, the thickness of the surface-mount passive component 10F can be reduced.

(15-7) In the passive function layer 80F, the magnetic part 810 is provided so as to surround the inductor wire 240F. This can increase a relative magnetic permeability, allowing a reduction in size of the passive function layer 80F. Furthermore, since the magnetic part 810 exhibits a noise suppression function, a noise suppression effect of the passive function parts 200F can be increased.

(15-8) Since the passive function parts 200F have two or more wiring layers, inductance of the passive function layer 80F can be increased.

(15-9) The number of turns of each of the connection wires 48F in the size conversion layer 50F is less than “1.0 turn”. Definition of “the number of turns” is identical to the definition of the number of turns of the inductor wire described above. This can suppress occurrence of unnecessary parasitic inductance, parasitic resistance, and parasitic capacitance in the size conversion layer 50F.

Manufacturing Method

Next, an example of a method for manufacturing the surface-mount passive component 10F is described with reference to FIGS. 66 through 72. Also in FIGS. 66 through 72, illustration of hatching is omitted for convenience of description.

Figure 66:
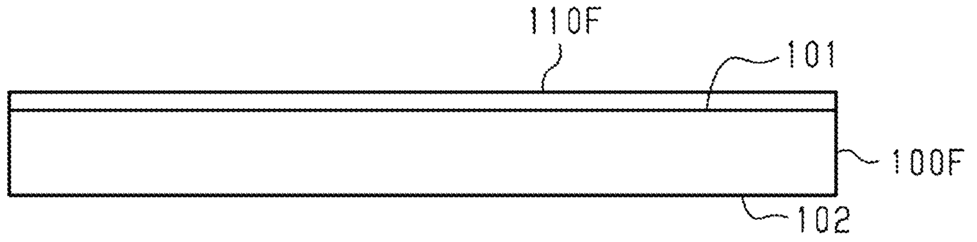
FIG. 66 is a method for manufacturing the surface-mount passive component.
Figure 67:
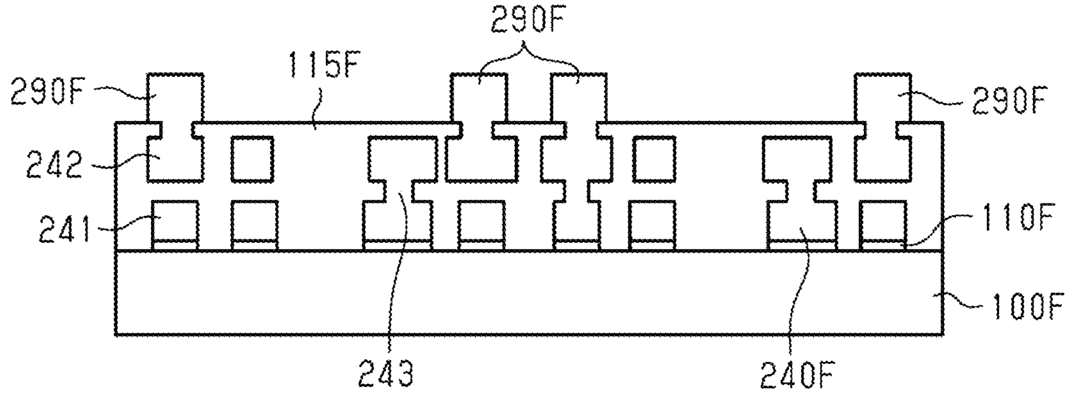
FIG. 67 is a method for manufacturing the surface-mount passive component.

First, the passive function layer 80F is formed. Specifically, an electrically conductive layer made of an electrically conductive material is formed on a substrate 100F, as illustrated in FIG. 66. The substrate 100F has a substantially plate shape. The substrate 100F contains a magnetic material. That is, the substrate 100F is a magnetic body. In FIG. 66, an upper surface of the substrate 100F is referred to as a front surface 101, and a lower surface of the substrate 100F is referred to as a rear surface 102. The cover layer 82F is formed by processing the substrate 100F. This will be described in detail later. In the example illustrated in FIG. 66, a copper layer 110F is formed as the electrically conductive layer. For example, a copper foil is attached as the copper layer 110F onto the substrate 100F so as to cover the entire front surface 101. When the formation of the copper layer 110F is completed, formation of the inductor wires 240F and the draw-out wires 290F starts. For example, the inductor wires 240F and the draw-out wires 290F are formed as illustrated in FIG. 67 by repeating application of a photoresist, patterning of a protection film by exposure using an exposure device, supply of an electrically conductive material, for example, by electrolytic copper plating using a cupric sulfate solution, removal of the protection film, for example, by wet etching, and supply of an insulating material. In the state illustrated in FIG. 67, the inductor wires 240F are covered with an insulating material, but the draw-out wires 290F are not covered with an insulating material. A portion that covers the inductor wires 240F in this state is referred to as an insulating covering layer 115F. Portions of the insulating covering layer 115F become the insulating covering parts 815.

Figure 68:
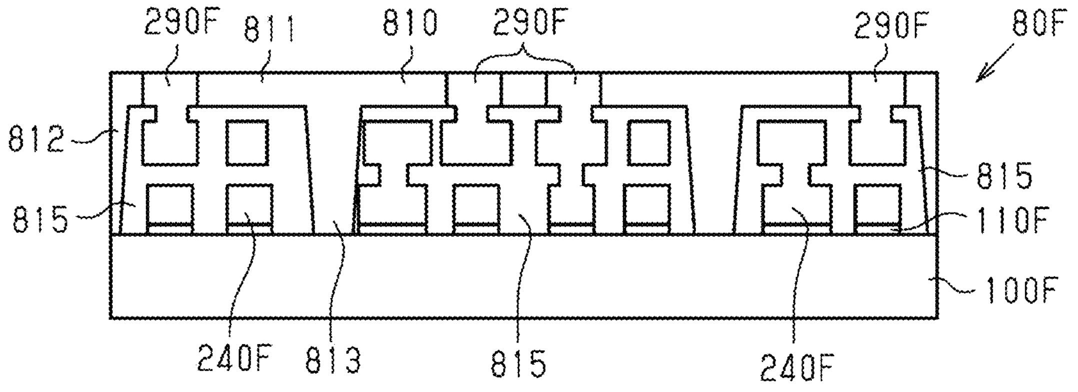
FIG. 68 is a method for manufacturing the surface-mount passive component.

Next, portions of the insulating covering layer 115F are ground, for example, by laser. That is, positions where the annular magnetic parts 812 and the inner magnetic parts 813 of the magnetic parts 810 are to be formed are ground. Then, a magnetic material is supplied to positions where the magnetic parts 810 are to be formed, as illustrated in FIG. 68. The magnetic parts 810 are formed by grinding portions of the supplied magnetic material and portions of the supplied electrically conductive material. This completes formation of the passive function layer 80F.

Figure 69:
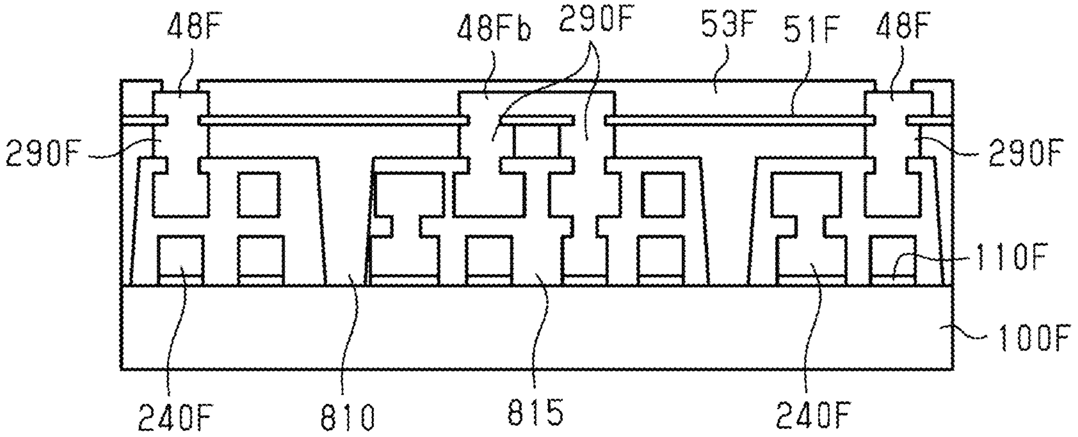
FIG. 69 is a method for manufacturing the surface-mount passive component.

Next, the size conversion layer 50F is formed. For example, portions of the connection wires 48F that make contact with the draw-out wires 290F and portions of the internal conductor 48Fb that make contact with the draw-out wires 290F are formed as illustrated in FIG. 69 by application of a photoresist, patterning of a protection film by exposure using an exposure device, supply of an electrically conductive material, for example, by electrolytic copper plating using a cupric sulfate solution, and removal of the protection film, for example, by wet etching. Then, the boundary layer 51F is formed as illustrated in FIG. 69 by supplying an insulating material. When the formation of the boundary layer 51F is completed, remaining portions of the connection wires 48F and a remaining portion of the internal conductor 48Fb are formed. For example, the remaining portions of the connection wires 48F and the remaining portion of the internal conductor 48Fb can be formed as illustrated in FIG. 69 by application of a photoresist, patterning of a protection film by exposure using an exposure device, supply of an electrically conductive material, for example, by electrolytic copper plating using a cupric sulfate solution, and removal of the protection film, for example, by wet etching. After the connection wires 48F and the internal conductor 48Fb are formed, the base layer 53F is formed. For example, the base layer 53F can be formed by supplying an insulating material around the connection wires 48F and the internal conductor 48Fb. Then, through-holes 117F are formed in portions of the base layer 53F where the connection wires 48F and the second external terminal 45F are connected, for example, by laser. This forms the size conversion layer 50F.

Figure 70:
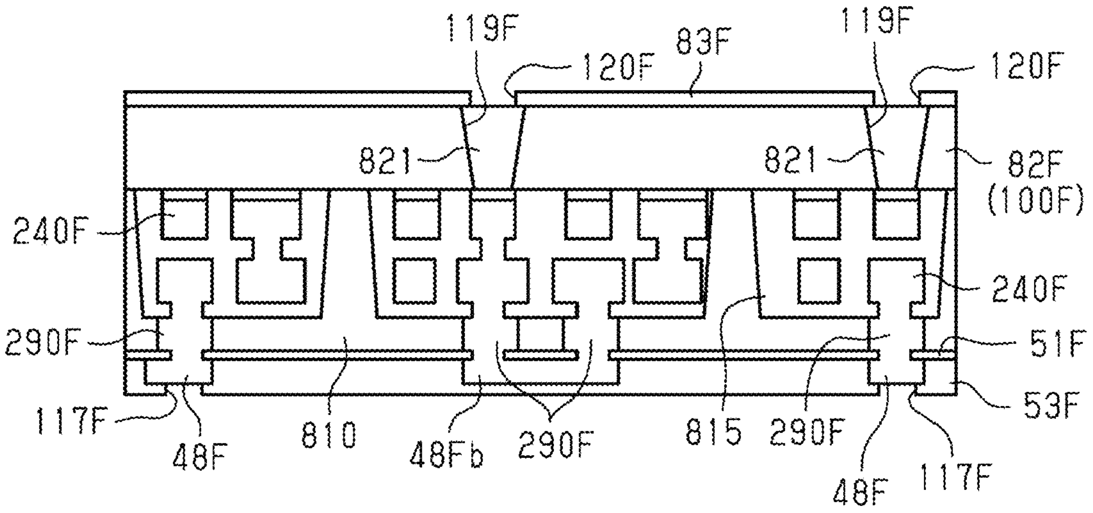
FIG. 70 is a method for manufacturing the surface-mount passive component.

Then, the cover layer connection wires 821 are formed in the cover layer 82F, which is the substrate 100F, as illustrated in FIG. 70, for example, by filling plating. That is, vias 119F are formed at positions of the cover layer 82F where the cover layer connection wires 821 are to be formed, for example, by laser. Then, the cover layer connection wires 821 are formed by applying copper plating in the vias 119F.

Figure 71:
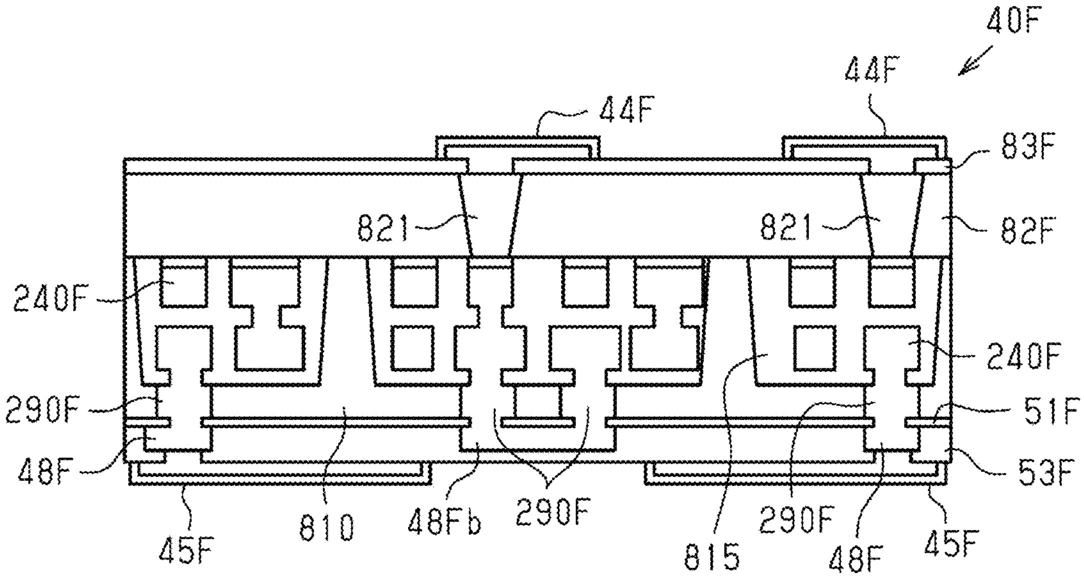
FIG. 71 is a method for manufacturing the surface-mount passive component.
Figure 72:
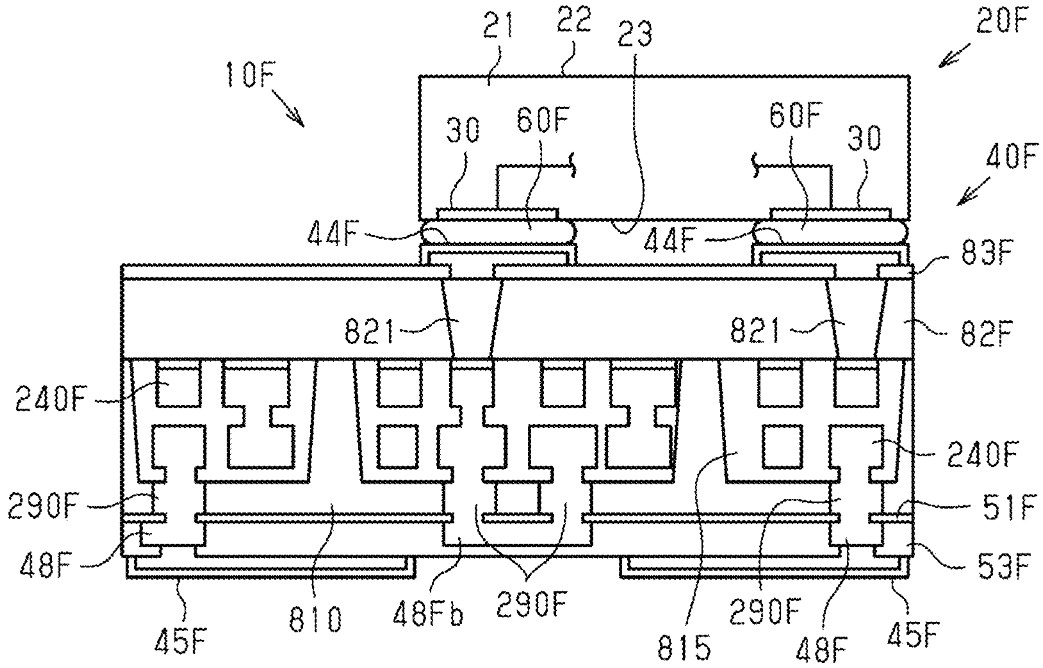
FIG. 72 is a method for manufacturing the surface-mount passive component.

When the formation of the cover layer connection wires 821 is completed, the uppermost layer 83F is formed. For example, the uppermost layer 83F can be formed by supplying an insulating material onto the cover layer 82F. In this step, through-holes 120F are formed at positions of the uppermost layer 83F where the first external terminals 44F are to be formed. Then, the first external terminals 44F are formed, as illustrated in FIG. 71. In the example illustrated in FIG. 71, multilayer bodies each including a plurality of layers are formed as the first external terminals 44F. Next, the second external terminals 45F are formed. In the example illustrated in FIG. 71, multilayer bodies each including a plurality of layers are formed as the second external terminals 45F. This completes the formation of the size conversion unit 40F. After the size conversion unit 40F is formed, the passive element 20F is mounted on the size conversion unit 40F. That is, the connection part 60F such as solder is attached to each of the first external terminals 44F of the size conversion unit 40F, as illustrated in FIG. 72. The passive element 20F is mounted on the size conversion unit 40F by bringing the passive element external terminals 30 into contact with the respective connection parts 60F. This completes the surface-mount passive component 10F, and as a result the series of processes that constitute the method for manufacturing the surface-mount passive component 10F is finished.

The above manufacturing method is an example of a method for manufacturing the surface-mount passive component 10F one by one. However, the method for manufacturing the surface-mount passive component 10F is not limited to this. For example, a plurality of surface-mount passive components 10F may be manufactured concurrently by forming portions that will become a plurality of size conversion units 40F in rows and columns and then creating individual pieces, for example, by dicing.

Sixteenth Embodiment

Next, a sixteenth embodiment of a surface-mount passive component is described with reference to FIGS. 73 and 74. The following mainly describes differences from the fifteenth embodiment. Members identical or corresponding to those in the above embodiments are given identical reference signs, and repeated description thereof is omitted.

Figure 73:
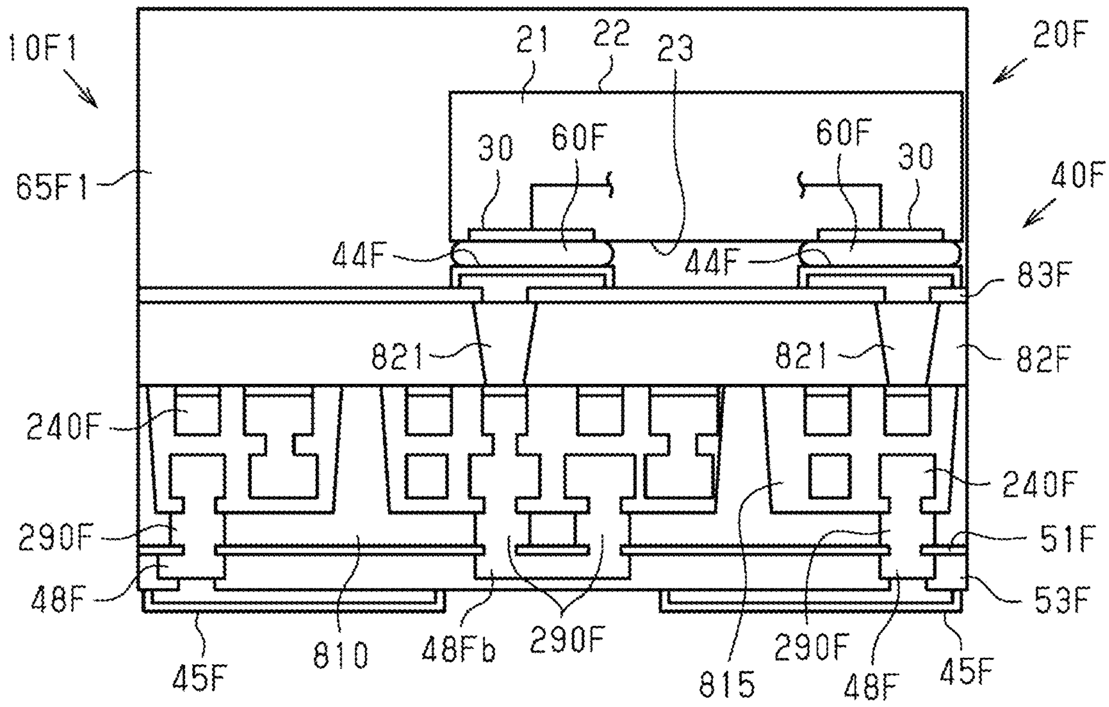
FIG. 73 is a cross-sectional view of a surface-mount passive component according to a fifteenth embodiment.
Figure 74:
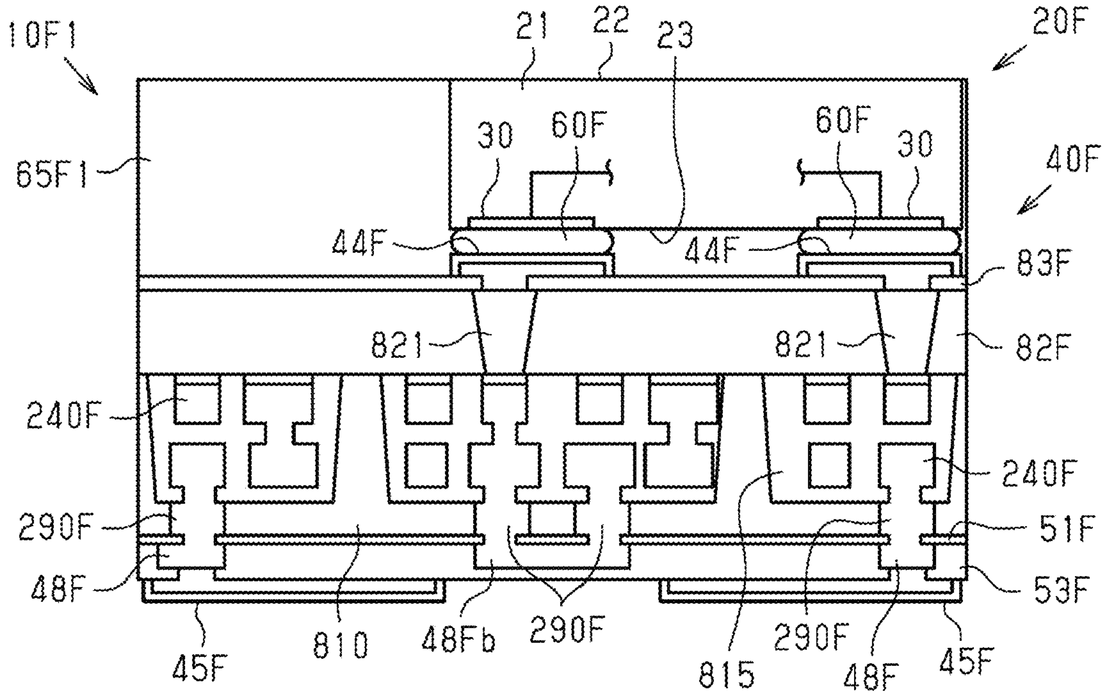
FIG. 74 is a cross-sectional view illustrating a modification of the surface-mount passive component according to the fifteenth embodiment.

As illustrated in FIG. 73, a surface-mount passive component 10F1 according to the present embodiment includes a sealing part 65F1 that seals a passive element 20F. The sealing part 65F1 contains a sealing resin. The sealing resin may be, for example, a mold material, an undercoat material, or an underfill material. Specifically, the sealing resin may be one containing a resin such as an epoxy resin, a polyimide resin, an acrylic resin, a phenolic resin, or a liquid crystal polymer resin and an insulating filler such as silica. In the example illustrated in FIG. 73, a second main surface 22 of the passive element 20F is also covered with the sealing part 65F1. This can increase strength of the surface-mount passive component 10F1.

Note that a configuration for sealing the passive element 20F with a resin is not limited to the one illustrated in FIG. 73. For example, the surface-mount passive component 10F1 may be configured such that the sealing part 65F1 is provided so as not to cover the second main surface 22 of the passive element 20F, as illustrated in FIG. 74.

Modifications

The above embodiments can be modified as follows. The above embodiments and the following modifications can be combined unless technical inconsistency occurs.

Figure 75:
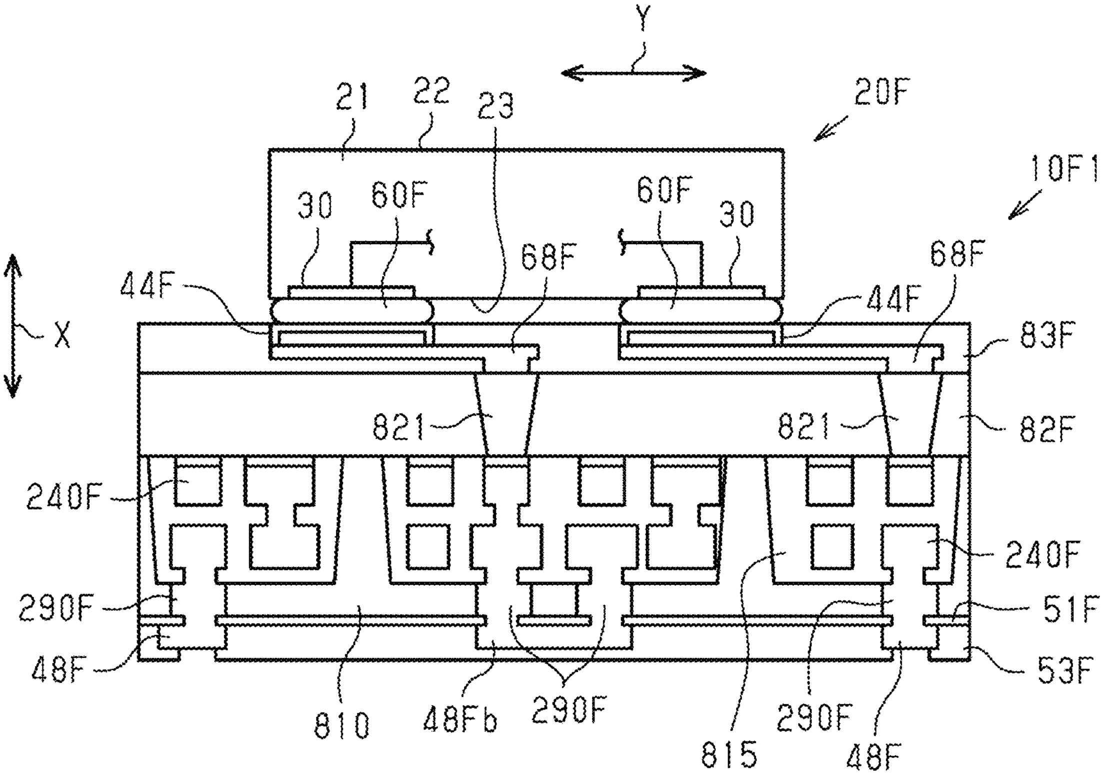
FIG. 75 is a cross-sectional view illustrating a modification of the surface-mount passive component according to the fifteenth embodiment.

In the fifteenth embodiment, the passive element 20F may be disposed at a position different from an end in the first direction of the size conversion unit 40F in the parallel direction Y. For example, the passive element 20F may be disposed at a center of the size conversion unit 40F in the parallel direction Y, as illustrated in FIG. 75. In this case, positions of the first external terminals 44F connected to the passive element external terminals 30 and position of the cover layer connection wires 821 are deviated from each other in the parallel direction Y. Therefore, wires 68F that electrically connect the first external terminals 44F and the cover layer connection wires 821 are preferably provided in the uppermost layer 83F of the size conversion unit 40F, as illustrated in FIG. 75.

In the fifteenth embodiment, a plurality of passive elements may be disposed on the element mount surface 42F of the size conversion unit 40F.

Although the inductor wire 240F of each of the passive function parts 200F has two layers in the fifteenth embodiment, an inductor wire having three or more layers may be provided as the inductor wire 240F of each of the passive function parts 200F. Alternatively, an inductor wire having a single layer may be provided as the inductor wire 240F of each of the passive function parts 200F.

In the fifteenth embodiment, three or more passive function parts 200F may be provided in the passive function layer 80F. In this case, all of the passive function parts 200F may be inductors, all of the passive function parts 200F may be resistors, or all of the passive function parts 200F may be capacitors. Alternatively, passive functions of the passive function parts 200F may be different from one another.

In the fifteenth embodiment, the inductor wire 240F may be in contact with the magnetic material in the passive function layer 80F. For example, the insulating covering part 815 need not be provided in the passive function layer 80F. In this case, the entire inductor wire 240F makes contact with the magnetic material.

In the fifteenth embodiment, the passive element external terminals 30 of the passive element 20F and the first external terminals 44F may be directly connected to each other.

In the fifteenth embodiment, the surface-mount passive component may be configured such that another passive element is mounted on the passive element 20F.

In the fourteenth embodiment, the fifteenth embodiment, and the sixteenth embodiment, the passive function parts may be capacitors or may be resistors.

In the sixth embodiment, the seventh embodiment, and the eighth embodiment, a size of one second passive element 20C2 may be different from a size of another second passive element 20C2. A thickness of one second passive element 20C2 may be different from a thickness of another second passive element 20C2.

In the above embodiments, in a case where a plurality of passive elements are mounted on an element mount surface, an area of a first main surface of one or some passive elements may be different from an area of a first main surface of the other passive elements.

A thickness of a size conversion unit may be equal to a thickness of a passive element or a thickness of a size conversion unit may be larger than a thickness of a passive element.

In the first embodiment, the size conversion unit 40 may be configured to have, as dummy conductors, either the dummy internal conductors 47 or the dummy external terminals 46.

In the first embodiment, connection wires that electrically connect the first external terminals 44 and the second external terminals 45 may be configured to have a conductor exposed on a main surface of the body 21.

In the first embodiment, a resistor may be mounted as the passive element 20 on the element mount surface 42. In this case, DC electric resistance of the minimum interval portion of the size conversion unit 40 is desirably “1000 times” as high as DC electric resistance of the resistor (the passive element 20) mounted on the element mount surface 42 or higher.

In a case where a plurality of passive elements are mounted on an element mount surface, an interval between adjacent passive elements may be equal to or larger than about "500 μm". Alternatively, the interval may be less than about "10 μm" as long as occurrence of short circuit between conductors of the passive elements can be suppressed. For example, adjacent passive elements may be in contact with each other.

In the embodiments, an area of one or some of a plurality of second external terminals may be equal to or smaller than an area of a passive element external terminal (maximum passive element external terminal).

Although the sealing part 65B1 is not in contact with the second main surfaces 22 of the passive elements 20A1 and 20A2 in the fifth embodiment, this is not restrictive. For example, it is also possible to employ a configuration in which the sealing part 65B1 is in contact with a portion of the second main surface 22 of the passive element 20A1 but is not in contact with a remaining portion. Furthermore, for example, it is also possible to employ a configuration in which the sealing part 65B1 is in contact with a portion of the second main surface 22 of the passive element 20A2 but is not in contact with a remaining portion.

Figure 76:
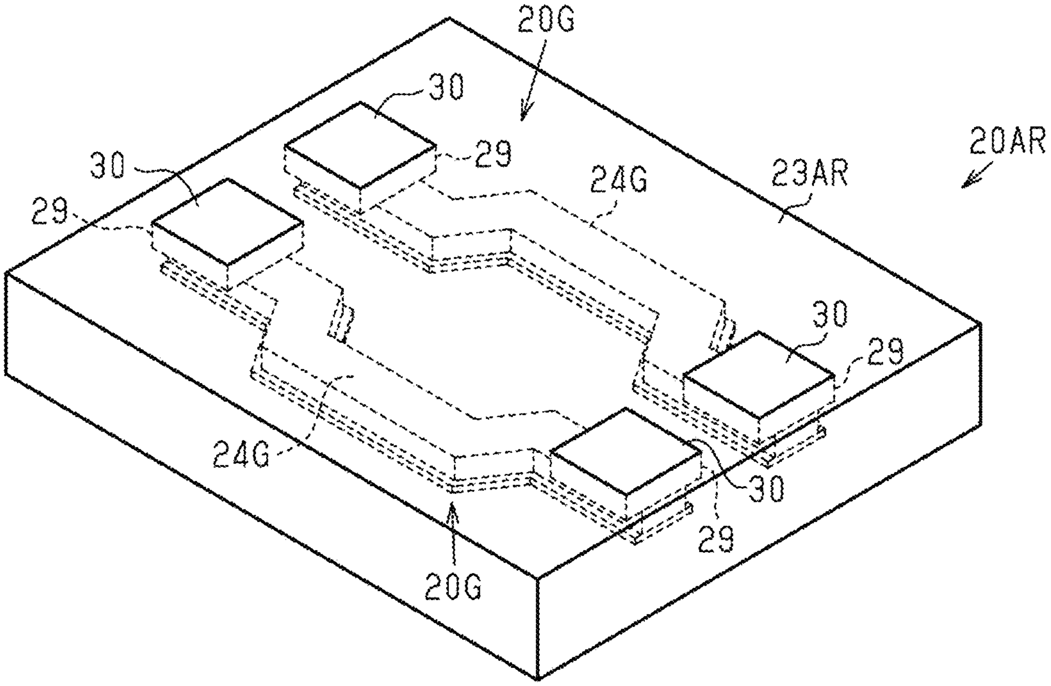
FIG. 76 is a perspective view schematically illustrating a passive member mounted on a size conversion unit in the surface-mount passive component according to the modification.

A passive component 20AR such as the one illustrated in FIG. 76 may be mounted on a size conversion unit. The passive component 20AR is an array component in which a plurality of passive element 20G are aligned. In a case where the passive elements 20G are inductors, each passive component 20AR includes an inductor wire 24G that generates inductance and a vertical wire 29 that is connected to the inductor wire 24G and extends from a portion connected to the inductor wire 24G to a passive element external terminal 30. Also in this case, an area of a board-side mount surface of a size conversion unit is preferably set larger than an area of one passive element 20G on a first main surface. In a case where the passive component 20AR has two passive elements 20G as illustrated in FIG. 76, a half of an area of a main surface 23AR of the passive component 20AR can be regarded as a main surface of one passive element 20G.

In the above embodiments, a passive element external terminal is exposed on a first main surface but is not exposed on a non-main surface of a body connected to the first main surface. However, this is not restrictive. For example, a passive element external terminal may be exposed across a first main surface and a non-main surface of a body connected to the first main surface. In this case, an area of the passive element external terminal on the first main surface is an area of a portion of the passive element external terminal that is exposed on the first main surface.

In the above embodiments, a first external terminal is exposed on an element mount surface of a body of a size conversion unit but is not exposed on a non-main surface of the body connected to the element mount surface. However, this is not restrictive. For example, a first external terminal may be exposed across an element mount surface and a non-main surface of a body connected to the element mount surface. In this case, an area of the first external terminal on the element mount surface is an area of a portion of the first external terminal that is exposed on the element mount surface.

In the above embodiments, a second external terminal is exposed on a board-side mount surface of a body of a size conversion unit but is not exposed on a non-main surface of the body connected to the board-side mount surface. However, this is not restrictive. For example, a second external terminal may be exposed across a board-side mount surface and a non-main surface of a body connected to the board-side mount surface. In this case, an area of the second external terminal on the board-side mount surface is an area of a portion of the second external terminal that is exposed on the board-side mount surface.

Figure 77:
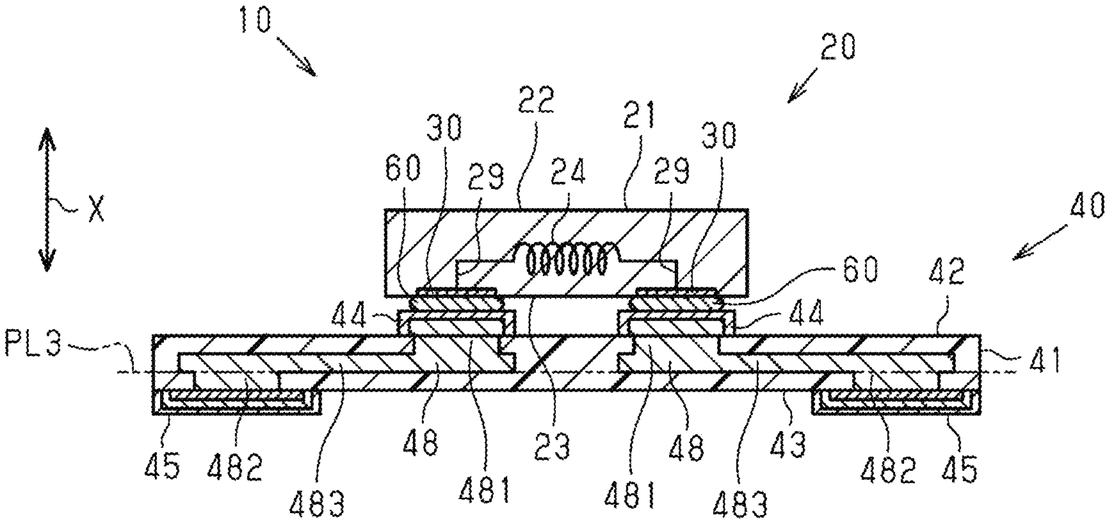
FIG. 77 is a cross-sectional view of the surface-mount passive component according to the modification.

In the first embodiment, the positions of the first external terminals 44 may be deviated from the positions of the second external terminals 45 in a direction orthogonal to the laminating direction X. In this case, connection wires 48 illustrated in FIG. 77 may be provided in the body 41 of the size conversion unit 40. Specifically, each of the connection wires 48 has a planar connection wire 483 disposed on a predetermined plane PL3. The predetermined plane PL3 is a virtual plane located between the board-side mount surface 43 and the element mount surface 42 in the laminating direction X. The predetermined plane PL3 is preferably a plane parallel with the board-side mount surface 43 as illustrated in FIG. 77, but the predetermined plane PL3 need not be parallel with the board-side mount surface 43. Furthermore, each of the connection wires 48 has a first connecting wiring portion 481 that connects the first external terminal 44 and the planar connection wire 483 and a second connecting wiring portion 482 that connects the second external terminal 45 and the planar connection wire 483. With this configuration, the first external terminals 44 and the second external terminals 45 can be electrically connected to each other even in a case where the positions of the first external terminals 44 are deviated from the positions of the second external terminals 45 in a direction orthogonal to the laminating direction X.

The number of turns of the planar connection wires 483 on the predetermined plane PL3 is preferably less than "1.0 turn". This can prevent a length of the connection wires 48 from becoming long, thereby suppressing an increase in parasitic resistance caused by the connection wires 48.

More preferably, each of the planar connection wires 483 is formed so that the first connecting wiring portion 481 and the second connecting wiring portion 482 are connected by a shortest path. That is, the length of the planar connection wire 483 can be minimized by making the planar connection wire 483 linear.

Figure 78:
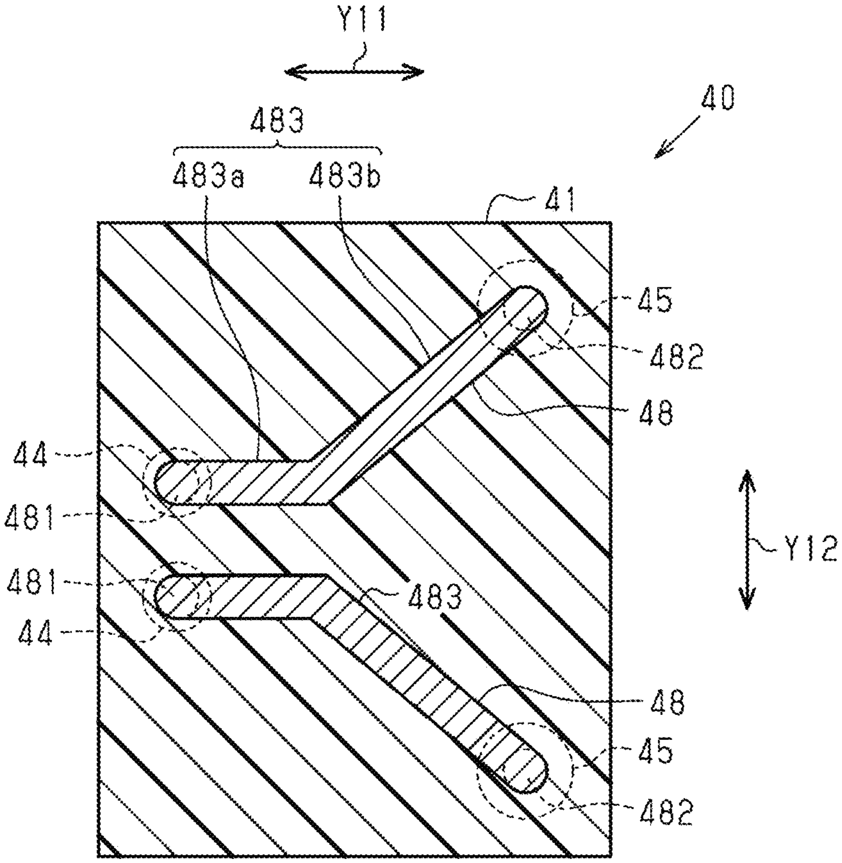
FIG. 78 is a cross-sectional view of a size conversion unit in the surface-mount passive component according to the modification.

Assume that one of two directions orthogonal on the predetermined plane PL3 is referred to as a first direction Y11 the other one of the two directions is referred to as a second direction Y12. FIG. 78 illustrates an example of a cross-sectional view of the size conversion unit 40 obtained in a case where the planar connection wires 483 are cut along a direction orthogonal to the laminating direction X. As illustrated in FIG. 78, the positions of the first external terminals 44 are deviated from the positions of the second external terminals 45 in the first direction Y11 and are also deviated from the positions of the second external terminals 45 in the second direction Y12. In such a case, the planar connection wires 483 may have a shape illustrated in FIG. 78. Specifically, each of the planar connection wires 483 includes a first wiring part 483*a* connected to the first connecting wiring portion 481 and a second wiring part 483*b* that connects the first wiring part 483*a* and the second connecting wiring portion 482. The first wiring part 483*a* is a straight wire that extends in the first direction Y11. That is, the first wiring part 483*a* is a straight connection wire that extends from the first external terminal 44 toward the second external terminal 45 so as not to extend away from the second external terminal 45. In the example illustrated in FIG. 78, the second wiring part 483*b* extends in a straight line from a portion connected to the first wiring part 483*a* toward a portion connected to the second connecting wiring portion 482. Even in this case, it can be said in a broad sense that the planar connection wire 483 electrically connects the first external terminal 44 and the second external terminal 45 by a shortest path. Note that the second wiring part 483*b* may be, for example, a substantially arc shape.

A size conversion unit may be manufactured by another manufacturing method that does not use a semi-additive method. For example, a size conversion unit may be manufactured by a method such as a sheet lamination method or a printing lamination method.

The present disclosure encompasses configurations of the additional aspects described below.

Additional Aspect 1

A surface-mount passive component including a passive element that has a first main surface and a second main surface located on a side opposite to the first main surface and has a plurality of passive element external terminals exposed on the first main surface; and a size conversion unit on which the passive element is mounted. The passive element is mounted on the size conversion unit so that the first main surface is located closer to the size conversion unit than the second main surface, and the size conversion unit has a body having an element mount surface, which is a main surface on which the passive element is mounted, and a board-side mount surface, which is a main surface located on a side opposite to the element mount surface, a plurality of first external terminals each of which is exposed on the element mount surface and is electrically connected to a corresponding one of the plurality of passive element external terminals, a plurality of second external terminals exposed on the board-side mount surface, and connection wires that electrically connect the first external terminals and the second external terminals. Also, an area of the board-side mount surface is larger than an area of the first main surface, and a total area of the plurality of second external terminals on the board-side mount surface is larger than a total area of the plurality of passive element external terminals on the first main surface.

Additional Aspect 2

The surface-mount passive component according to Additional Aspect 1, wherein a plurality of passive elements are mounted as the passive element on the element mount surface.

Additional Aspect 3

The surface-mount passive component according to Additional Aspect 2, wherein an interval between adjacent ones of the plurality of passive elements is equal to or larger than 10 μm and equal to or smaller than 500 μm.

Additional Aspect 4

The surface-mount passive component according to Additional Aspect 2 or 3, wherein areas of the first main surfaces of the plurality of passive elements are same.

Additional Aspect 5

The surface-mount passive component according to Additional Aspect 2 or 3, wherein in a case where one of the plurality of passive elements that is smallest in area of the first main surface is a minimum passive element, the area of the board-side mount surface is two times as large as the area of the first main surface of the minimum passive element or larger.

Additional Aspect 6

The surface-mount passive component according to any one of Additional Aspects 1 through 5, wherein DC electric resistivity of the connection wires is lower than DC electric resistivity of the first external terminals and is lower than DC electric resistivity of the second external terminals.

Additional Aspect 7

The surface-mount passive component according to any one of Additional Aspects 1 through 6, wherein each of the connection wires includes a planar connection wire disposed on a predetermined plane parallel with the board-side mount surface, and the number of turns of the planar connection wire is less than 1 turn.

Additional Aspect 8

The surface-mount passive component according to Additional Aspect 7, wherein each of the connection wires includes a first connecting wiring portion that connects the planar connection wire to a corresponding one of the first external terminals and a second connecting wiring portion that connects the planar connection wire to a corresponding one of the second external terminals; and the planar connection wire connects the first connecting wiring portion and the second connecting wiring portion by a shortest path.

Additional Aspect 9

The surface-mount passive component according to any one of Additional Aspect 1 through 8, wherein the DC electric resistivity of the body is 1 MΩ·cm or more.

Additional Aspect 10

The surface-mount passive component according to any one of Additional Aspects 1 through 9, wherein at least one of an inductor and a resistor is mounted as the passive element(s) on the element mount surface; and in a case where a portion of the size conversion unit where an interval between the connection wires is minimum is a minimum interval portion, DC electric resistance of the minimum interval portion is 1000 times as high as DC electric resistance of the at least one of the inductor and the resistor mounted as the passive element(s) on the element mount surface or higher.

Additional Aspect 11

The surface-mount passive component according to any one of Additional

Aspects 1 through 9, wherein a capacitor is mounted as the passive element on the element mount surface; and in a case where a portion of the size conversion unit where an interval between the connection wires is minimum is a minimum interval portion, DC electric resistance of the minimum interval portion is 1 time as high as DC electric resistance of the capacitor or higher.

Additional Aspect 12

The surface-mount passive component according to any one of Additional Aspects 1 through 11, wherein the size conversion unit has a dummy conductor that is not electrically connected to the passive element external terminals of the passive element.

Additional Aspect 13

The surface-mount passive component according to Additional Aspect 12, wherein the size conversion unit has, as the dummy conductor, a dummy external terminal, which is an external terminal that is exposed on the board-side mount surface and is not electrically connected to the first external terminals.

Additional Aspect 14

The surface-mount passive component according to any one of Additional Aspects 1 through 13, wherein in a case where one of the plurality of passive element external terminals that is largest in area of the first main surface is a maximum passive element external terminal, an area of at least one of the plurality of second external terminals on the board-side mount surface is larger than the area of the maximum passive element external terminal on the first main surface.

Additional Aspect 15

The surface-mount passive component according to any one of Additional Aspects 1 through 14, wherein an interval between the board-side mount surface and the element mount surface of the size conversion unit is smaller than an interval between the first main surface and the second main surface of the passive element.

Additional Aspects 16

The surface-mount passive component according to any one of Additional

Aspects 1 through 15, further including a sealing part that contains a sealing resin and is in contact with both of the element mount surface and the passive element.

Additional Aspect 17

The surface-mount passive component according to Additional Aspect 16, wherein at least a portion of the second main surface is exposed to an outside.

Additional Aspect 18

The surface-mount passive component according to Additional Aspect 16, wherein the plurality of passive elements are mounted on the element mount surface; the plurality of passive elements are sealed by the sealing part; and a portion of the sealing part that is located between adjacent ones of the plurality of passive elements has a recess.

Additional Aspect 19

The surface-mount passive component according to Additional Aspect 18, wherein in a case where a direction in which the plurality of passive elements are aligned is a parallel direction, the recess is disposed between passive elements that are adjacent in the parallel direction; and in a case where of the two passive elements located on both sides of the recess in the parallel direction, a passive element having a smaller dimension in the parallel direction is a narrow passive element, a dimension of the recess in the parallel direction is equal to or smaller than a half of the dimension of the narrow passive element in the parallel direction.

Additional Aspect 20

The surface-mount passive component according to Additional Aspect 19, wherein a depth of the recess is equal to or smaller than a half of a thickness of the narrow passive element.

Additional Aspect 21

The surface-mount passive component according to any one of Additional Aspects 16 through 19, wherein the sealing part includes a first sealing part that contains a first sealing resin and a second sealing part that is laminated on the first sealing part and contains a second sealing resin.

Additional Aspect 22

The surface-mount passive component according to Additional Aspect 1, further comprising a second passive element mounted on the passive element.

Additional Aspect 23

The surface-mount passive component according to Additional Aspect 22, wherein a plurality of passive elements are provided as the passive element; and areas of the first main surfaces of the plurality of passive elements are same.

Additional Aspect 24

The surface-mount passive component according to Additional Aspect 22 or 23, wherein a plurality of second passive elements are provided as the second passive element; and areas of main surfaces of the plurality of second passive elements located closer to the passive element(s) are same.

Additional Aspect 25

The surface-mount passive component according to any one of Additional Aspects 22 through 24, further including a sealing part that contains a sealing resin, wherein the sealing part seals only one or some passive elements selected from among the passive element(s) and the second passive element(s).

Additional Aspect 26

The surface-mount passive component according to Additional Aspect 25, wherein wires that electrically connect the passive element external terminals of the passive element(s) and external terminals of the second passive element(s) are provided in the sealing part.

Additional Aspect 27

The surface-mount passive component according to Additional Aspect 25 or 26, wherein the plurality of passive elements are provided; and a wire that electrically connects the passive element external terminals of adjacent ones of the plurality of passive elements is provided in the sealing part.

Additional Aspect 28

The surface-mount passive component according to any one of Additional Aspects 22 through 27, wherein in a case where a direction in which the size conversion unit, the passive element, and the second passive element are aligned is a laminating direction, a portion where the passive element is located in the laminating direction is a first mount layer, a portion where the second passive element is located in the laminating direction is a second mount layer, and a virtual line extending in the laminating direction and passing a center of gravity of the size conversion unit is a predetermined axis line, the predetermined axis line does not pass a center of gravity of the first mount layer nor a center of gravity of the second mount layer.

Additional Aspect 29

The surface-mount passive component according to any one of Additional Aspects 22 through 27, wherein in a case where a direction in which the size conversion unit, the passive element, and the second passive element are aligned is a laminating direction, a portion where the passive element is located in the laminating direction is a first mount layer, a portion where the second passive element is located in the laminating direction is a second mount layer, and a virtual line extending in the laminating direction and passing a center of gravity of the size conversion unit is a predetermined axis line, the predetermined axis line passes only a center of gravity of the first mount layer or the second mount layer.

Additional Aspect 30

The surface-mount passive component according to any one of Additional Aspect 22 through 27, wherein in a case where a direction in which the size conversion unit, the passive element, and the second passive element are aligned is a laminating direction, a portion where the passive element is located in the laminating direction is a first mount layer, a portion where the second passive element is located in the laminating direction is a second mount layer, and a virtual line extending in the laminating direction and passing a center of gravity of the size conversion unit is a predetermined axis line, the predetermined axis line passes both of a center of gravity of the first mount layer and a center of gravity of the second mount layer.

Additional Aspect 31

The surface-mount passive component according to Additional Aspect 1, wherein a passive element body including the passive element is disposed on the element mount surface of the size conversion unit.

Additional Aspect 32

The surface-mount passive component according to Additional Aspect 1, wherein the size conversion unit has a size conversion layer including an insulating layer and a passive element body laminated on the size conversion layer; a passive function part that exhibits at least one of passive functions of consuming, accumulating, and discharging supplied electric power is provided in the passive element body; and a main surface of the passive element body that is located on a side opposite to the size conversion layer with the passive function part interposed therebetween is the element mount surface.

Additional Aspect 33

The surface-mount passive component according to Additional Aspect 32, wherein in a case where a main surface of the passive element body that is in contact with the size conversion layer is a boundary main surface, the passive element body has a function wire that exhibits the passive function when an electric current is passed therethrough and a draw-out wire that is connected to the function wire and extends from a portion thereof connected to the function wire to the boundary main surface, and the draw-out wire contains an electrically conductive material contained in the function wire.

Additional Aspect 34

The surface-mount passive component according to Additional Aspect 33, wherein the passive element body includes a magnetic layer; the passive function part is an inductor; and the function wire is in contact with the magnetic layer.

Additional Aspect 35

The surface-mount passive component according to Additional Aspect 34, wherein in a case where a direction orthogonal to the board-side mount surface is a predetermined direction, the passive function part has, as the function wire, a first wiring part and a second wiring part that are disposed at different positions in the predetermined direction and a connecting wiring portion that electrically connects the first wiring part and the second wiring part; and the first wiring part and the second wiring part each have a portion that extends in a direction crossing the predetermined direction.

Additional Aspect 36

The surface-mount passive component according to Additional Aspect 34 or 35, wherein an element body connection wire that electrically connects the passive element external terminals of the passive element and the function wires is provided in the passive element body.

Additional Aspect 37

The surface-mount passive component according to Additional Aspect 36, wherein the element body connection wire contains an electrically conductive material different from an electrically conductive material of which the draw-out wire is made.

Additional Aspect 38

The surface-mount passive component according to Additional Aspect 36 or 37, wherein the element body connection wire contains an electrically conductive material different from an electrically conductive material of which the passive element external terminals are made.

Additional Aspect 39

The surface-mount passive component according to any one of Additional Aspects 36 through 38, wherein the element body connection wire is in contact with the magnetic layer.

Additional Aspect 40

The surface-mount passive component according to any one of Additional Aspects 36 through 39, wherein the passive element body has a main function layer disposed on the size conversion layer, a cover layer disposed on the main function layer, and an uppermost layer disposed on the cover layer; the uppermost layer includes an insulating layer, and one of main surfaces of the uppermost layer that is not in contact with the cover layer is the element mount surface; and the element body connection wire penetrates the cover layer.

Additional Aspect 41

The surface-mount passive component according to Additional Aspect 40, wherein the number of turns of a portion of the element body connection wire that is parallel with the board-side mount surface is less than 1 turn.

Additional Aspect 42

The surface-mount passive component according to any one of Additional Aspects 33 through 41, wherein a plurality of passive function parts are provided as the passive function part in the passive element body.

Additional Aspects 43

The surface-mount passive component according to any one of Additional Aspect 32 through 42, wherein the passive element body is a multilayer body constituted by a plurality of insulating layers that contain different insulating materials and are laminated on one another.

Additional Aspect 44

The surface-mount passive component according to any one of Additional Aspects 1 through 42, wherein the passive element is an inductor.

Additional Aspect 45

The surface-mount passive component according to Additional Aspect 44, wherein a passive member is mounted on the element mount surface; the passive member is an array component in which a plurality of passive elements each of which is the passive element are aligned; and each of the plurality of passive elements includes an inductor wire that generates inductance and a vertical wire that is connected to the inductor wire and extends from a portion thereof connected to the inductor wire to a corresponding one of the passive element external terminals.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A surface-mount passive component comprising:

at least one passive element that has a first main surface and a second main surface located on a side opposite to the first main surface and has a plurality of passive element external terminals exposed on the first main surface; and a size conversion unit on which the passive element is mounted, wherein the passive element is mounted on the size conversion unit so that the first main surface is located closer to the size conversion unit than the second main surface, the size conversion unit includes a body having an element mount surface, which is a main surface on which the passive element is mounted, and a board-side mount surface, which is a main surface located on a side opposite to the element mount surface, a plurality of first external terminals, each of which is exposed on the element mount surface and is electrically connected to a corresponding one of the plurality of passive element external terminals, a plurality of second external terminals exposed on the board-side mount surface, and connection wires that electrically connect the first external terminals and the second external terminals, the size conversion unit has a dummy internal conductor that is not electrically connected to the passive element external terminals of the passive element, the dummy internal conductor does not extend beyond the element mount surface of the body, an area of the board-side mount surface is larger than an area of the first main surface, and a total area of the plurality of second external terminals on the board-side mount surface is larger than a total area of the plurality of passive element external terminals on the first main surface.

2. The surface-mount passive component according to claim 1, wherein a plurality of passive elements are mounted on the element mount surface; and an interval between adjacent ones of the plurality of passive elements is from 10 μm to 500 μm.

3. The surface-mount passive component according to claim 1, wherein each of the connection wires includes a planar connection wire disposed on a predetermined plane parallel with the board-side mount surface, and the number of turns of the planar connection wire is less than 1 turn.

4. The surface-mount passive component according to claim 3, wherein each of the connection wires includes a first connecting wiring portion that connects the planar connection wire to a corresponding one of the first external terminals and a second connecting wiring portion that connects the planar connection wire to a corresponding one of the second external terminals; and the planar connection wire connects the first connecting wiring portion and the second connecting wiring portion by a shortest path.

5. The surface-mount passive component according to claim 1, wherein

DC electric resistivity of the body is 1 MΩ·cm or more.

6. The surface-mount passive component according to claim 1, wherein at least one of an inductor and a resistor is mounted as the passive element on the element mount surface; and in a case where a portion of the size conversion unit where an interval between the connection wires is minimum is a minimum interval portion, DC electric resistance of the minimum interval portion is 1000 times or higher as high as DC electric resistance of the inductor or the resistor.

7. The surface-mount passive component according to claim 1, wherein the size conversion unit has a dummy conductor that is not electrically connected to the passive element external terminals of the passive element;

the dummy conductor is a dummy external terminal; and the size conversion unit has the dummy external terminal which is exposed on the board-side mount surface and is not electrically connected to the first external terminals.

8. The surface-mount passive component according to claim 1, wherein an interval between the board-side mount surface and the element mount surface of the size conversion unit is smaller than an interval between the first main surface and the second main surface of the passive element.

9. The surface-mount passive component according to claim 1, further comprising:

a sealing part that contains a sealing resin and is in contact with both of the element mount surface and the passive element, wherein at least a portion of the second main surface is exposed from the sealing part.

10. The surface-mount passive component according to claim 1, further comprising:

a sealing part that contains a sealing resin and is in contact with both of the element mount surface and the passive element, wherein a plurality of passive elements are mounted on the element mount surface;

the plurality of passive elements are sealed by the sealing part; and a portion of the sealing part that is located between adjacent ones of the plurality of passive elements has a recess.

11. The surface-mount passive component according to claim 10, wherein in a case where a direction in which the plurality of passive elements are arranged is a parallel direction, the recess is disposed between the passive elements that are adjacent in the parallel direction; and in a case where of the two passive elements located on both sides of the recess in the parallel direction, a passive element having a smaller dimension in the parallel direction is a narrow passive element, a dimension of the recess in the parallel direction is equal to or smaller than a half of the dimension of the narrow passive element in the parallel direction.

12. The surface-mount passive component according to claim 11, wherein a depth of the recess is equal to or smaller than a half of a thickness of the narrow passive element.

13. The surface-mount passive component according to claim 9, wherein the sealing part includes a first sealing part that contains a first sealing resin and a second sealing part that is provided on the first sealing part and contains a second sealing resin.

14. The surface-mount passive component according to claim 1, further comprising:

a sealing part that contains a sealing resin, wherein a plurality of passive elements are mounted on the element mount surface, and the sealing part seals only a portion of the plurality of passive elements.

15. The surface-mount passive component according to claim 1, further comprising:

a second passive element mounted on the passive element, wherein in a case where a direction in which the size conversion unit, the passive element, and the second passive element are stacked is a laminating direction, a layer in which the passive element is located in the laminating direction is a first mount layer, and a layer in which the second passive element is located in the laminating direction is a second mount layer, a center of gravity of the first mount layer and a center of gravity of the second mount layer do not overlap when viewed from the laminating direction.

16. The surface-mount passive component according to claim 1, wherein the size conversion unit has a size conversion layer including an insulating layer and a passive element body laminated on the size conversion layer;

a passive function part that exhibits at least one of passive functions of consuming, accumulating, and discharging supplied electric power is provided in the passive element body; and a main surface of the passive element body that is located on a side opposite to the size conversion layer with the passive function part interposed therebetween is the element mount surface.

17. The surface-mount passive component according to claim 1, wherein the passive element is an inductor;

a passive member is mounted on the element mount surface;

the passive member is an array component in which a plurality of passive elements are arranged; and each of the plurality of passive elements includes an inductor wire that generates inductance and a vertical wire that is connected to the inductor wire and extends from a portion thereof connected to the inductor wire to a corresponding one of the passive element external terminals.

18. The surface-mount passive component according to claim 10, wherein the sealing part includes a first sealing part that contains a first sealing resin and a second sealing part that is provided on the first sealing part and contains a second sealing resin.

19. The surface-mount passive component according to claim 11, wherein the sealing part includes a first sealing part that contains a first sealing resin and a second sealing part that is provided on the first sealing part and contains a second sealing resin.

20. The surface-mount passive component according to claim 12, wherein the sealing part includes a first sealing part that contains a first sealing resin and a second sealing part that is provided on the first sealing part and contains a second sealing resin.

21. A surface-mount passive component comprising:

at least one passive element that has a first main surface and a second main surface located on a side opposite to the first main surface and has a plurality of passive element external terminals exposed on the first main surface;

a size conversion unit on which the passive element is mounted; and a second passive element mounted on the passive element, wherein the passive element is mounted on the size conversion unit so that the first main surface is located closer to the size conversion unit than the second main surface, the size conversion unit includes a body having an element mount surface, which is a main surface on which the passive element is mounted, and a board-side mount surface, which is a main surface located on a side opposite to the element mount surface, a plurality of first external terminals, each of which is exposed on the element mount surface and is electrically connected to a corresponding one of the plurality of passive element external terminals, a plurality of second external terminals exposed on the board-side mount surface, and connection wires that electrically connect the first external terminals and the second external terminals, an area of the board-side mount surface is larger than an area of the first main surface, a total area of the plurality of second external terminals on the board-side mount surface is larger than a total area of the plurality of passive element external terminals on the first main surface, and in a case where a direction in which the size conversion unit, the passive element, and the second passive element are stacked is a laminating direction, a layer in which the passive element is located in the laminating direction is a first mount layer, and a layer in which the second passive element is located in the laminating direction is a second mount layer, a center of gravity of the first mount layer and a center of gravity of the second mount layer do not overlap when viewed from the laminating direction.

* * * * *